(12) United States Patent
Ogawa et al.

(10) Patent No.: US 7,293,867 B2
(45) Date of Patent: **\*Nov. 13, 2007**

(54) INK FOR INK JET RECORDING, PROCESS FOR THE PRODUCTION OF INK AND INK JET RECORDING PROCESS

(75) Inventors: Manabu Ogawa, Shizuoka (JP); Toshiki Taguchi, Shizuoka (JP); Takashi Ozawa, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 198 days.

This patent is subject to a terminal disclaimer.

(21) Appl. No.: 10/502,393

(22) PCT Filed: Jan. 23, 2003

(86) PCT No.: PCT/JP03/00603

§ 371 (c)(1),
(2), (4) Date: Jul. 26, 2004

(87) PCT Pub. No.: WO03/062329

PCT Pub. Date: Jul. 31, 2003

(65) Prior Publication Data

US 2005/0076807 A1     Apr. 14, 2005

(30) Foreign Application Priority Data

| Jan. 24, 2002 | (JP) | 2002-015663 |
| Jan. 24, 2002 | (JP) | 2002-015664 |
| Jan. 25, 2002 | (JP) | 2002-017433 |
| Feb. 8, 2002 | (JP) | 2002-032842 |
| Feb. 12, 2002 | (JP) | 2002-034387 |
| Feb. 13, 2002 | (JP) | 2002-035278 |

(51) Int. Cl.
*G01D 11/00*    (2006.01)

(52) U.S. Cl. ............ 347/100; 347/95; 106/31.27
(58) Field of Classification Search ............ 347/100, 347/95, 96, 101; 106/31.27, 31.13, 31.6; 523/160
See application file for complete search history.

(56) References Cited

U.S. PATENT DOCUMENTS 3,287,470 A    11/1966   Geigy (Continued)

FOREIGN PATENT DOCUMENTS

JP    7-188595 A    7/1995

(Continued)

*Primary Examiner*—Manish S. Shah
(74) *Attorney, Agent, or Firm*—Sughrue Mion, PLLC

(57) ABSTRACT

An ink for ink jet recording having a phthalocyanine dye dissolved and/or dispersed in an aqueous medium, characterized in that the aforementioned phthalocyanine dye is a water-soluble dye having an oxidation potential of more positive than 1.0 and the conductivity of the aforementioned ink is from not 0.01 S/m to not greater than 10 S/m. A process for the production of the aforementioned ink for ink jet recording which includes a step of applying ultrasonic vibration and/or a step of filtering using a filter having pores of an effective diameter of not greater than 1 μm and defoaming the ink and an ink jet recording process using these inks. In accordance with such a constitution, an ink for ink jet recording and an ink jet recording process can be provided which exhibit a high ejection stability, give an image having an excellent hue and preservability (weathering resistance, water resistance) and provide an image with a high quality.

16 Claims, 2 Drawing Sheets

U.S. PATENT DOCUMENTS

| | | |
|---|---|---|
| 5,704,969 A | 1/1998 | Kanaya et al. |
| 5,882,390 A * | 3/1999 | Nagai et al. ............. 106/31.49 |
| 6,440,203 B2 * | 8/2002 | Kato ........................ 106/31.6 |
| 2003/0217671 A1 * | 11/2003 | Ozawa ....................... 347/100 |
| 2004/0010052 A1 * | 1/2004 | Ishizuka et al. ............. 522/75 |
| 2004/0066438 A1 * | 4/2004 | Taguchi et al. ............. 347/100 |

FOREIGN PATENT DOCUMENTS

JP   2000-239584 A   9/2000

* cited by examiner

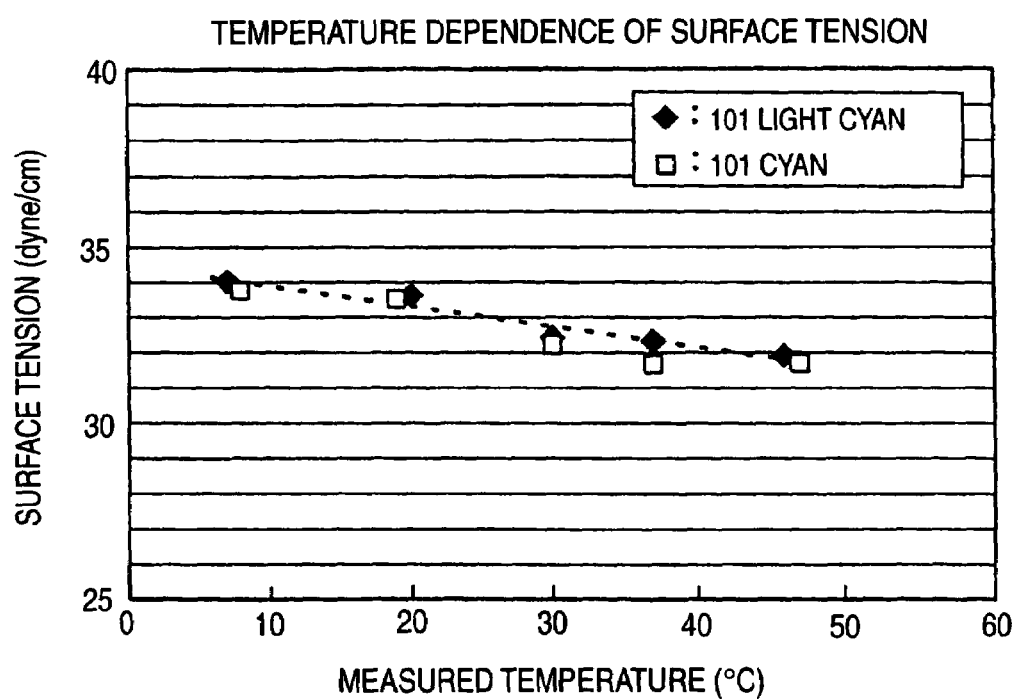

INK FOR INK JET RECORDING, PROCESS FOR THE PRODUCTION OF INK AND INK JET RECORDING PROCESS

TECHNICAL FIELD

This invention relates to an ink for ink jet recording which gives a recorded image having a high quality, exhibits an excellent ejection stability and provides an image with an excellent preservability, a process for the production of said ink and an ink jet recording process using said ink.

BACKGROUND ART

In recent years, with the spread of computers, ink jet printers have been widely used to print on paper, film, cloth, etc. at offices as well as at home.

Examples of ink jet recording method include a method which allows a piezoelectric element to give pressure that causes a droplet to be ejected, a method which comprises heating the ink to generate bubbles, causing a droplet to be ejected, a method involving the use of ultrasonic wave, and a method which uses electrostatic force to suck and discharge a droplet. As inks for these ink jet recording methods there are used aqueous inks, oil-based inks and solid (melt type) inks. Among these inks, aqueous inks are mainly used from the standpoint of producibility, handleability, odor, safety, etc.

The dyes to be incorporated in these inks for ink jet recording are required to exhibit a high solubility in solvents, allow a high density recording and have a good hue and an excellent fastness to light, heat, air, water and chemical, a good fixability to image-receiving materials, difficulty in running, an excellent preservability, no toxicity and a high purity and be available at a low cost.

However, it is extremely difficult to seek dyes meeting these requirements to a high extent. In particular, dyes having a good cyan hue and an excellent weathering resistance have been keenly desired.

Various dyes and pigments have been already proposed for ink jet recording and have been actually used. However, no dyes meeting all these requirements have been found yet. Known dyes and pigments provided with color index (C.I.) can difficultly satisfy both the hue and fastness requirements for inks for ink jet recording. As dyes which enhance fastness there have been proposed azo dyes derived from aromatic amines and 5-membered heterocyclic amines in JP-A-55-161856. However, these dyes are disadvantageous in that they assume an undesirable hue in the yellow and cyan ranges and thus cause deterioration of color reproducibility. Inks for ink jet recording which are intended to satisfy requirements for both hue and light-fastness are disclosed in JP-A-61-36362 and JP-A-2-212566. However, the dyes used in these patents, if used as water-soluble inks, leave something to be desired in solubility in water. Further, when the dyes described in these patents are used as water-soluble inks for ink jet, problems arise with moist heat fastness as well. As a means for solving these problems there has been proposed the use of the compound and ink described in JP-T-11-504958 (the term "JP-T" as used herein means a published Japanese translation of a PCT patent application). Further, reference has been made to inks for ink jet recording comprising pyrazolylaniline azo for improving hue or light-fastness (Japanese Patent Application No. 2000-80733). However, these inks for ink jet recording leave something to be desired in both color reproducibility and fastness of outputted image.

It has been further made obvious that images recorded on an ink jet photographic grade gloss paper sometimes show a remarkably poor preservability when posted indoor. The inventors presume that this phenomenon is attributed to some oxidizing gas in the air such as ozone. This phenomenon no longer occurs when the flow of air is blocked by some measure such as putting in glass-fronted frame.

This phenomenon occurs remarkably with ink jet photographic grade gloss paper and thus brings forth a great problem with the related art ink jet recording process featuring photographic grade as one of its important advantages.

Therefore, an aim of the present invention is to provide an ink for ink jet recording comprising an aqueous ink which allows ejection with a high stability and gives an image having a good hue, an excellent light-fastness and water resistance, no defects in image quality such as running of fine line and a good preservability under severe conditions from the standpoint of handleability, odor, safety, etc. Another aim of the present invention is to provide an ink set which allows ejection of even an ink aged over an extended period of time or under severe conditions with a high stability.

Disclosure of the Present Invention

The characteristic of the ink for ink jet recording of this invention is that an ink for ink jet recording having the following phthalocyanine dye dissolved or dispersed in an aqueous medium has at least one of the following properties. Preferred is an ink that satisfies all the following requirements (1) to (4).

(1) The viscosity of the aforementioned ink at 25° C. is from 1 to 50 mPa·sec, preferably from 1 to 20 mPa·sec.
(2) The conductivity of the aforementioned ink is from not smaller than 0.01 S/m to not greater than 10 S/m.
(3) The static surface tension of the aforementioned ink at 25° C. is from 25 to 50 mN/m.
(4) The percent change of viscosity and surface tension of the aforementioned ink from at 25° C. to at 10° C. is not greater than 250% and not greater than 130%, respectively.

The characteristic of the process for the production of an ink for ink jet recording of this invention is that the process for the production of an ink for ink jet recording comprises at least a step of applying ultrasonic vibration and/or in the process for the production of an ink for ink jet recording, the ink for ink jet recording thus prepared is filtered through a filter having pores of an effective diameter of not greater than 1 μm and defoamed before use.

The aforementioned aims of this invention were solved by the following desirable means.

1. An ink for ink jet recording, comprising a aqueous medium and a phthalocyanine dye dissolved or dispersed in the aqueous medium, wherein the phthalocyanine dye is a water-soluble dye having an oxidation potential of more positive than 1.0 and the ink has a conductivity of 0.01 S/m to 10 S/m.

2. The ink for ink jet recording according to the preceding Paragraph 1, which has a viscosity of 1 to 20 mPa·sec at 25° C.

3. The ink for ink jet recording according to the preceding Paragraph 1 or 2, which has a static surface tension of 25 to 50 mN/m at 25° C.

4. The ink for ink jet recording according to the preceding Paragraph 2 or 3, wherein a viscosity of the ink has a viscosity ratio of not greater than 250% from at 25° C. to at 10° C., and a static surface tension has a static surface tension ratio of not greater than 130% from at 25° C. to at 10° C.

5. The ink for ink jet recording according to any one of the preceding Paragraphs 1 to 4, which has a pH value of 4 to 12 at 25° C.

6. The ink for ink jet recording according to any one of the preceding Paragraphs 1 to 5, which has a dye remaining ratio(density after fading/initial density×100) of not smaller than 60% (preferably 80%) after 24 hours of storage in an atmosphere of 5 ppm ozone in a monochromatic area that is obtained by printing with a monochromatic ink(cyan) in such a manner a cyan reflection density through a status A filer is from 0.9 to 1.1.

7. The ink for ink jet recording according to any one of the preceding Paragraphs 1 to 6, wherein the ink has Cu ions that are eluted with water in an amount of not greater than 20% of a total amount of the dye after an ozone fading under the conditions defined in 6.

8. The ink for ink jet recording according to any one of the preceding Paragraphs 1 to 7, wherein the phthalocyanine dye is the water-soluble dye having an electron-withdrawing group at β-position of a benzene ring in the phthalocyanine.

9. The ink for ink jet recording according to any one of the preceding Paragraphs 1 to 8, wherein the phthalocyanine dye is the water-soluble dye that is produced by a process which doesn't pass through a sulfonati ozone fading on of an unsubstituted phthalocyanine.

10. The ink for ink jet recording according to any one of the preceding Paragraphs 1 to 9, wherein the phthalocyanine dye is represented by the following formula (I):

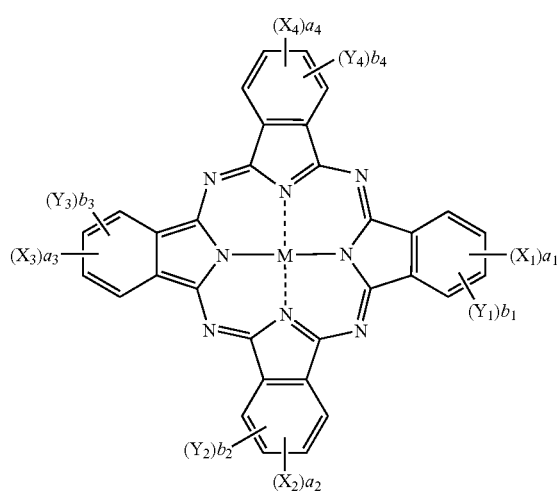

(I)

wherein $X_1$, $X_2$, $X_3$ and $X_4$ each independently represent —SO-Z, —SO$_2$-Z, —SO$_2$NR$_1$R$_2$, sulfo group, —CONR$_1$R$_2$ or —CO$_2$R$_1$; Z represents a substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group; $R_1$ and $R_2$ each independently represent a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group; and when there are a plurality of Z's, they may be the same or different;

$Y_1$, $Y_2$, $Y_3$ and $Y_4$ each independently represent a monovalent substituent; and when there are a plurality of any of $X_1$ to $X_4$ and $Y_1$ to $Y_4$, they may be the same or different;

$a_1$ to $a_4$ and $b_1$ to $b_4$ represent the number of substituents $X_1$ to $X_4$ and $Y_1$ to $Y_4$, respectively; $a_1$ to $a_4$ each independently represent an integer of from 0 to 4 and are not 0 at the same time; and $b_1$ to $b_4$ each independently represent an integer of 0 to 4; and M represents a hydrogen atom, metal atom or oxide, hydroxide or halide thereof.

11. The ink for ink jet recording according to the preceding Paragraph 10, wherein the dye represented by the formula (I) is a dye represented by the following formula (II):

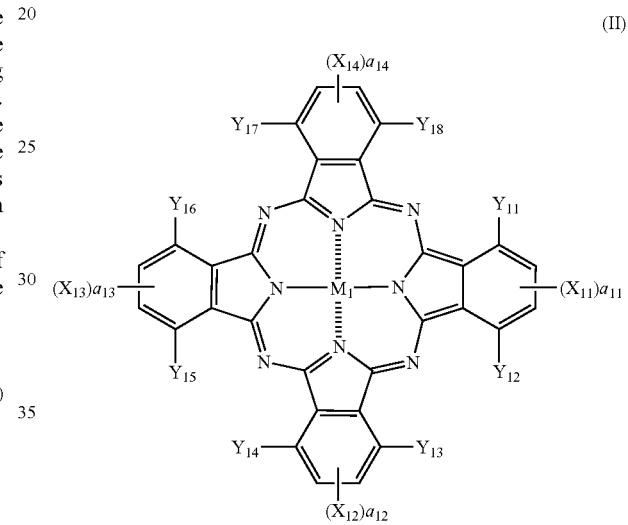

(II)

wherein $X_{11}$ to $X_{14}$, $Y_{11}$ to $Y_{18}$ and $M_1$ each have the same meaning as those in the formula (I); and $a_{11}$ to $a_{14}$ each independently represent an integer of 1 to 2.

12. A method for ink jet recording, comprising using the ink for ink jet recording according to the preceding Paragraphs 1 to 11.

13. A method for recording an image on an image-receiving material, comprising ejecting an ink droplet onto the image-receiving material including an image-receiving layer containing an inorganic white particulate pigment on a support according to a record signal, wherein the ink droplet comprises the ink for ink jet recording described in the preceding Paragraphs 1 to 11.

14. A method for producing the ink for ink jet recording according to the preceding Paragraphs 1 to 11, which comprises at least applying a ultrasonic vibration.

15. A method for producing the ink for ink jet recording according to the preceding Paragraphs 1 to 11, wherein the ink for ink jet recording prepared is filtered through a filter having pores of an effective diameter of not greater than 1 µtm and defoamed before use.

BRIEF DESCRIPTION OF THE DRAWINGS

FIG. 2 is a diagram illustrating the temperature dependence of surface tension of light cyan ink and cyan ink of ink set 101 of Example 5.

BEST MODE FOR CARRYING OUT THE PRESENT INVENTION

Figure 1:
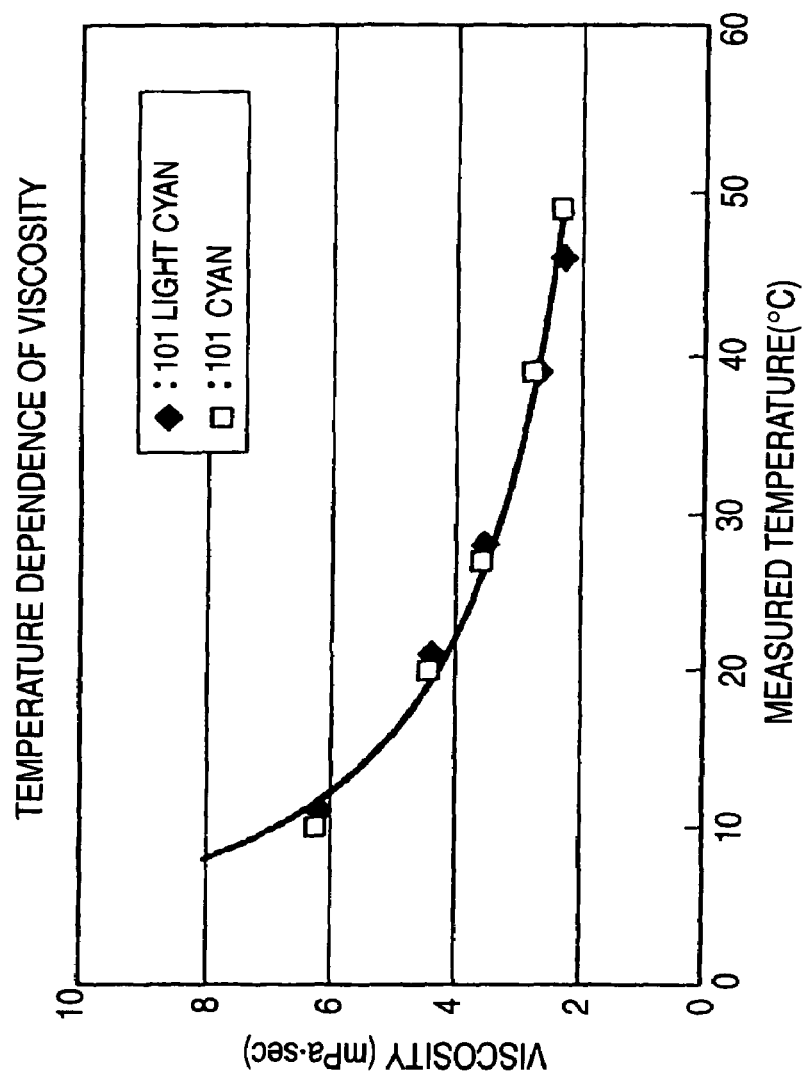
FIG. 1 is a diagram illustrating the temperature dependence of viscosity of light cyan ink and cyan ink of ink set 101 of Example 5.

The present invention will be further described hereinafter.

The present applicant made extensive studies of ink for ink jet recording and, as a result, found that the requirements for the dye are 1) good hue and no hue change (solvate), 2) excellent 1 resistance (light, ozone, NOx, solvent, oil, water), 3) safety (Ames, no carcinogenecity, no skin stimulation, good decomosability), 4) low cost, 5) high ε, 6) high solubility, and 7) high fixability to media.

Next, the requirements for ink physical properties and concentrated ink physical properties are 1) uniform regardless of temperature and elapsed time, 2) little stainability, 3) good penetration in media, 4) uniform size of droplet, 5) applicability to any kind of paper, 6) easy preparation, 7) no misejection, low foamability and quick disappearance of foam, and 8) stable ejection.

The requirements for image are 1) no running, discoloration and high cleaness without peeding, 2) scratch resistance, 3) high gloss and uniformity, 4) good image preservability and excellent discoloration balance, 5) good dryability, 6) high speed of printing, and 7) no image density dependence of percent discoloration. The physical properties required for ink for ink jet recording are that the ink is excellent both in light-resistance and ozone resistance and shows a small change of hue and surface conditions (difficulty in the occurrence of bronze and the separation of dyes). Referring to light-resistance (OD1.0), it is desired that the ink show a light-resistance of not smaller than 90% as calculated in terms of dye remaining ratio (density after discoloration/initial density×100) in 3 days when exposed to light from a Xenon lamp at 1.1 W/m (intermittent) through a TAC filter on a PM photographic image-receiving paper produced by EPSON CO., LTD. It is also desired that the ink show a dye remaining ratio of not smaller than 85% in 14 days. Referring to ozone resistance, it is desired that the ink show an ozone resistance of not smaller than 60% as calculated in terms of dye remaining ratio in 1 day in an ozone atmosphere of not greater than 5 ppm. It is further desired that the ink show an ozone resistance of not smaller than 70%, particularly not smaller than 80%, as calculated in terms of dye remaining ratio in 1 day. It is also desired that the ink show an ozone resistance of not smaller than 25%, preferably not smaller than 40%, particularly not smaller than 50%, as calculated in terms of dye remaining ratio in 5 days. Samples having different spreads of dye were prepared by GTC, and these samples were each measured for Cu content in dye by fluorescent X-ray.

When the phthalocyanine dye decomposes, Cu ion occurs in the form of phthalate. It is desired that the amount of phthalate existing in the actual print as calculated in terms of Cu ion be not greater than 10 mg/m². For the determination of the amount of Cu eluted from the print, a cyan solid image having a phthalate content of not greater than 20 mg/m² as calculated in terms of Cu ion was formed. This image was ozone-faded, and the amount of ions eluted with water was then analyzed. Before fading, all the Cu compounds are trapped by the image-receiving material. It is desired that the amount of ions eluted with water be not greater than 20% based on the total amount of the dyes.

It was found in the present invention that a phthalocyanine dye having the aforementioned physical properties is accomplished by 1) faising the oxidation potential, 2) raising the associatability, 3) introducing association-accelerating groups and strengthening the hydrogen bond during π-π stacking, 4) preventing substituents from being substituted in α-position, that is, facilitating stacking, and effecting other measures.

The characteristic of the dye to be used in the ink for ink jet recording of the present invention is that a phthalocyanine dye having a specifiable number and position of substituents is used while the phthalocyanine dye used in the related art ink jet recording ink is one derived from an unsubstituted phthalocyanine by sulfonation and thus is a mixture having an unspecifiable number and position of substituents. A first structural characteristic is that the phthalocyanine dye of the present invention is a water-soluble phthalocyanine dye which is not derived via sulfonation of unsubstituted phthalocyanine. A second structural characteristic is that the phthalocyanine has an electron-withdrawing group on some, preferably all of its benzene rings in its α-position. In some detail, those substituted by a sulfonyl group (Japanese Patent Application No. 2001-47013, Japanese Patent Application No. 2001-190214), those substituted generally by a sulfamoyl group (Japanese Patent Application No. 2001-24352, Japanese Patent Application No. 2001-189982), those substituted by a heterocyclic sulfamoyl group (Japanese Patent Application No. 2001-96610, Japanese Patent Application No. 2001-190216), those substituted by a heterocyclic sulfonyl group (Japanese Patent Application No. 2001-76689, Japanese Patent Application No. 2001-190215), those substituted by a specific sulfamoyl group (Japanese Patent Application No. 2001-57063), those substituted by a carbonyl group (Japanese Patent Application No. 2002-012869), and those having a specific substituent for enhancing solubility and ink stability and preventing bronze are preferred. Specific useful examples of these compounds include those having asymmetric carbon atoms (Japanese Patent Application No. 2002-012868) and those in the form of lithium salt (Japanese Patent Application No. 2002-012864).

A first physical characteristic of the dye to be used in the ink for ink jet recording of the present invention is that it has a positive oxidation potential. The oxidation potential is preferably more positive than 1.00 V, more preferably more positive than 1.1 V, most preferably more positive than 1.2 V. A second physical characteristic of the dye is that it has a high associatability. Specific examples of such a dye include oil-soluble dyes having a defined associatability (Japanese Patent Application No. 2001-64413) and water-soluble dyes having a defined associatability (Japanese Patent Application No. 2001-117350).

Referring to the relationship between the number of associating group and the properties (absorbance of ink), the incorporation of associating groups causes easy occurrence of deterioration of absorbance or shift of λmax to shorter wavelength even in a dilute solution. Referring to the number of associating groups and the properties (reflectance OD on PM920 image-receiving paper produced by EPSON CO., LTD.), the more the number of associating groups is, the lower is reflectance OD at the same ion intensity. In other words, association proceeds on the image-receiving paper. Referring to the relationship between the number of associating groups and the properties (ozone resistance, light-resistance), the more the number of associating groups is, the better is ozone resistance. A dye having a large number of associating groups tends to have an improvement in light-resistance as well. In order to provide ozone resistance, it is necessary that the aforementioned substituent X (which represents $X_1$ to $X_4$) be provided. Since there is a trade-off relationship between reflectance OD and fastness, it is necessary that light-resistance be raised without deteriorating association.

Preferred examples of the ink of the present invention include:
1) cyan ink having a light-resistance of not smaller than 90% as calculated in terms of dye remaining ratio in 3 days when exposed to light from a xenon lamp at 1.1 W/m (intermittent) through a TAC filter on a PM photographic image-receiving paper produced by EPSON CO., LTD.;
2) cyan ink having a dye remaining ratio (density after discoloration/initial density×100) of not lower than 60% (preferably 80%) after 24 hours of storage in a 5 ppm ozone atmosphere on a monochromatic area on which printing has been made with said monochromatic ink (cyan) such that the cyan reflection density through a status A filter reaches a range of from 0.9 to 1.1;
3) cyan ink which has Cu ions eluted with water in an amount of not greater than 20% based on the total amount of dyes after ozone fading under the conditions 2; and
4) cyan ink which can penetrate a specific image-receiving paper to a depth of not smaller than 30% of the upper part of the image-receiving layer.

The dye to be incorporated in the ink for ink jet recording of the present invention is a phthalocyanine dye which is preferably a water-soluble dye having an oxidation potential of more positive than 1.0. More preferably, the water-soluble dye satisfies the aforementioned requirements for fastness to ozone gas. Even more desirable among these dyes is the phthalocyanine dye represented by the aforementioned formula (I).

A phthalocyanine dye has been known as a fast dye but has been known to have a deteriorated fastness to ozone gas when used as a recording dye for ink jet.

In the present invention, it is desired that an electron-withdrawing group be incorporated in the phthalocyanine skeleton to keep its oxidation potential more positive than 1.0 V (vs SCE) in order to lower the reactivity with ozone, which is an electrophilic agent. It is desired that the oxidation potential be as high as possible. The oxidation potential is more preferably more positive than 1.1 V (vs SCE), most preferably more positive than 1.2 V (vs SCE).

The value of oxidation potential (Eox) can be easily measured by those skilled in the art. For the details of this method, reference can be made to P. Delahay, "New Instrumental Methods in Electrochemistry", interscience Publishers, 1954, A. J. Bards et al, "Electrochemical Methods", John Wiley & Sons, 1980, Akira Fujishima et al, "Denki Kagaku Sokuteiho (Method for Electrochemical Measurement)", Gihodo Shuppansha, 1984, etc.

In some detail, for the measurement of oxidation potential, the test specimen is dissolved in a solvent such as dimethyl formamide and acetonitrile containing a supporting electrolyte such as sodium perchlorate and tetrapropylammonium perchlorate in a concentration of from $1 \times 10^{-4}$ to $1 \times 10^{-6}$ mol/l. The solution is then measured for oxidation potential with respect to SCE (saturated calomel electrode) by cyclic voltametry or DC polarography. This value may deviate by a score of millivolts when affected by the difference in potential between liquids or the resistivity of sample solution, but the reproducibility of potential can be assured by putting a standard sample (e.g., hydroquinone) in the sample solution.

In order to unequivocally define oxidation potential, in the present invention, the value (vs SCE) measured by DC polarography in dimethyl formamide containing 0.1 mol $dm^{-3}$ of tetrapropylammonium perchlorate as a supporting electrolyte (dye concentration: 0.001 mol $dm^{-3}$) is defined as oxidation potential of dye.

The value of Eox (oxidation potential) represents the transferability of electron from the sample to the electrode. the greater the value of Eox is (the more positive the oxidation potential is), the more difficultly can be transferred electron from the sample to the electrode, that is, the more difficultly can be oxidized the sample. Referring to the relation with the structure of the compound, the oxidation potential is made more positive by incorporating an electron-withdrawing group and lower by incorporating an electron-donating group. In the present invention, in order to reduce the reactivity with ozone, which is an electrophilic agent, it is desired that the oxidation potential be made more positive by incorporating an electron-withdrawing group in the phthalocyanine skeleton. Accordingly, it can be said that when Hammett's substituent constant σp value, which is an electron-withdrawing or electron-donative measure of substituent, is used, the oxidation potential can be made more positive by incorporating a substituent having a great σp value such as sulfinyl group, sulfonyl group and sulfamoyl group.

For the reason of adjustment of potential as well, a phthalocyanine dye represented by the aforementioned formula (I) is preferably used.

The fact that the phthalocyanine dye having the aforementioned oxidation potential is a cyan dye excellent both in light-resistance and ozone resistance is made obvious from the fact that the phthalocyanine dye satisfies the aforementioned requirements for light-resistance and ozone resistance.

The phthalocyanine dye to be used in the present invention (preferably phthalocyanine dye represented by the formula (I)) will be further described hereinafter.

In the formula (I), $X_1$, $X_2$, $X_3$ and $X_4$ each independently represent —SO-Z, —$SO_2$-Z, —$SO_2NR_1R_2$, sulfo group, —$CONR_1R_2$ or —$CO_2R_1$. Preferred among these substituents are —SO-Z, —$SO_2$-Z, —$SO_2NR_1R_2$ and —$CONR_1R_2$, particularly —$SO_2$-Z and —$SO_2NR_1R_2$, most preferably —$SO_2$-Z. When any of a1 to a4, which each indicate the number of substituents, represents a number not smaller than 2, those which are present in a plurality among $X_1$ to $X_4$ may be the same or different and each independently represent any of the aforementioned groups. $X_1$, $X_2$, $X_3$ and $X_4$ may be the same substituent or may be altogether a substituent of the same kind but having different moieties, e.g., —$SO_2$-Z in which Z differs among $X_1$ to $X_4$ or each may contain different substituents, e.g., —S $O_2$— Z and —$SO_2NR_1R_2$.

The aforementioned Z groups each independently represent a substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group. Preferred among these groups are substituted or unsubstituted alkyl group, substituted or unsubstituted aryl group or substituted or unsubstituted heterocyclic group, most preferably substituted alkyl group, substituted aryl group and substituted heterocyclic group.

The aforementioned $R_1$ and $R_2$ groups each independently represent a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group. Preferred among these groups are hydrogen atom, substituted or unsubstituted alkyl group, substituted or unsubstituted aryl group or substituted or unsubstituted heterocyclic group, more preferably hydrogen atom, substituted alkyl group, substituted aryl group or substituted heterocyclic group. However, it is not desired that both $R_1$ and $R_2$ be a hydrogen atom.

The substituted or unsubstituted alkyl group represented by $R_1$, $R_2$ and Z is preferably an alkyl group having from 1 to 30 carbon atoms. In particular, for the reason of enhancement of solubility of dye or stability of ink, the alkyl group is preferably branched, and an alkyl group having asymmetric carbon atoms (used in the form of racemate) is particularly preferred. Examples of the substituents include the same substituents as used in the case where Z, $R_1$, $R_2$, $Y_1$, $Y_2$, $Y_3$ and $Y_4$ can further have substituents as described later. Particularly preferred among these substituents are hydroxyl group, ether group, ester group, cyano group, amide group and sulfonamide group because they enhance the associatability and hence the fastness of dye. Further, halogen atom or ionic hydrophilic group may be included. The number of carbon atoms in the alkyl group doesn't include that of carbon atoms in the substituents. This applies to the other groups.

The substituted or unsubstituted cycloalkyl group represented by $R_1$, $R_2$ and Z is preferably a cycloalkyl group having from 5 to 30 carbon atoms. In particular, for the reason of enhancement of solubility of dye or stability of ink, a cycloalkyl group having asymmetric carbon atoms (used in the form of racemate) is particularly preferred. Examples of the substituents include the same substituents as used in the case where Z, $R_1$, $R_2$, $Y_1$, $Y_2$, $Y_3$ and $Y_4$ can further have substituents as described later. Particularly preferred among these substituents are hydroxyl group, ether group, ester group, cyano group, amide group and sulfonamide group because they enhance the associatability and hence the fastness of dye. Further, halogen atom or ionic hydrophilic group may be included.

The substituted or unsubstituted alkenyl group represented by $R_1$, $R_2$ and Z is preferably an alkenyl group having from 2 to 30 carbon atoms. In particular, for the reason of enhancement of solubility of dye or stability of ink, the alkenyl group is preferably branched, and an alkenyl group having asymmetric carbon atoms (used in the form of racemate) is particularly preferred. Examples of the substituents include the same substituents as used in the case where Z, $R_1$, $R_2$, $Y_1$, $Y_2$, $Y_3$ and $Y_4$ can further have substituents as described later. Particularly preferred among these substituents are hydroxyl group, ether group, ester group, cyano group, amide group and sulfonamide group because they enhance the associatability and hence the fastness of dye. Further, halogen atom or ionic hydrophilic group may be included.

The substituted or unsubstituted aralkyl group represented by $R_1$, $R_2$ and Z is preferably an aralkyl group having from 7 to 30 carbon atoms. In particular, for the reason of enhancement of solubility of dye or stability of ink, the aralkyl group is preferably branched, and an aralkyl group having asymmetric carbon atoms (used in the form of racemate) is particularly preferred. Examples of the substituents include the same substituents as used in the case where Z, $R_1$, $R_2$, $Y_1$, $Y_2$, $Y_3$ and $Y_4$ can further have substituents as described later. Particularly preferred among these substituents are hydroxyl group, ether group, ester group, cyano group, amide group and sulfonamide group because they enhance the associatability and hence the fastness of dye. Further, halogen atom or ionic hydrophilic group may be included.

The substituted or unsubstituted aryl group represented by $R_1$, $R_2$ and Z is preferably an aralkyl group having from 6 to 30 carbon atoms. Examples of the substituents include the same substituents as used in the case where Z, $R_1$, $R_2$, $Y_1$, $Y_2$, $Y_3$ and $Y_4$ can further have substituents as described later. Particularly preferred among these substituents are electron-withdrawing groups because they make the oxidation potential of dye and thus enhance the fastness thereof. Examples of the electron-withdrawing groups include those the Hammett's substituent constant σp value of which is positive. Preferred among these substituents are halogen atom, heterocyclic group, cyano group, carboxyl group, acylamino group, sulfonamide group, sulfamoyl group, carbamoyl group, sulfonyl group, imide group, acyl group, sulfo group, and quaternary ammonium group, more preferably cyano group, carboxyl group, sulfamoyl group, carbamoyl group, sulfonyl group, imide group, acyl group, sulfo group, and quaternary ammonium group.

The heterocyclic group represented by $R_1$, $R_2$ and Z is preferably a 5- or 6-membered heterocyclic group which may be further condensed. The heterocyclic group may also be an aromatic heterocyclic group or nonaromatic heterocyclic group. The heterocyclic group represented by $R_1$, $R_2$ and Z will be hereinafter exemplified in the form of heterocyclic ring with the substitution position omitted but the substitution position is not limited. For example, pyridine can be substituted in 2-, 3- and 4-positions. Examples of the heterocyclic group represented by $R_1$, $R_2$ and Z include pyridine, pyrazine, pyrimidine, pyridazine, triazine, quinoline, isoquinoline, quinazoline, cinnoline, phthaladine, quinoxaline, pyrrole, indole, furane, benzofurane, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, etc. Preferred among these substituents are aromatic heterocyclic groups. Exemplifying these aromatic heterocyclic groups as in the aforementioned case, pyridine, pyrazine, pyrimidine, pyridazine, triazine, pyrazole, imidazole, benzimidazole, triazole, thiazole, benzothiazole, isothiazole, benzisothiazole, and thiadiazole. These substituents may have substituents. Examples of the substituents include the same substituents as used in the case where Z, $R_1$, $R_2$, $Y_1$, $Y_2$, $Y_3$ and $Y_4$ can further have substituents as described later. Preferred examples of these substituents are the same as those in the aforementioned aryl group. Even more desirable examples of these substituents are the same as those in the aforementioned aryl group.

$Y_1$ $Y_2$, $Y_3$ and $Y_4$ each independently represent a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, acylamino group, arylamino group, ureide group, sulfamoylamino group, alkylthio group, arylthio group, alkoxycarbonylamino group, sulfonamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group or sulfo group which may further have substituents.

Preferred among these groups are hydrogen atom, halogen atom, alkyl group, aryl group, cyano group, alkoxy group, amide group, ureide group, sulfonamide group, carbamoyl group, sulfamoyl group, alkoxycarbonyl group, carboxyl group, and sulfo group. Particularly preferred among these groups are hydrogen atom, halogen atom, cyano group, carboxyl group, and sulfo group, most preferably hydrogen atom.

When Z, $R_1$, $R_2$, $Y_1$, $Y_2$, $Y_3$ and $Y_4$ each are a group which can further have substituents, they may further have the following substituents.

Examples of these substituents include straight-chain or branched alkyl group having from 1 to 12 carbon atoms, straight-chain or branched aralkyl group having from 7 to 18 carbon atoms, straight-chain or branched alkenyl group having from 2 to 12 carbon atoms, straight-chain or branched alkinyl group having from 2 to 12 carbon atoms, straight-chain or branched cycloalkyl group having from 3 to 12 carbon atoms, straight-chain or branched cycloalkyl group having from 3 to 12 carbon atoms (These groups each preferably have branches, particularly asymmetric carbon atoms, for the reason of enhancement of solubility of dye and stability of ink. Specific examples of these groups: methyl, ethyl, propyl, isopropyl, sec-butyl, t-butyl, 2-ethylhexyl, 2-methylsulfonylethyl, 3-phenoxypropyl, trifluoromethyl, cyclopentyl), halogen atom (e.g., chlorine atom, bromine atom), aryl group (e.g., phenyl, 4-t-butylphenyl, 2,4-di-t-amylphenyl), heterocyclic group (e.g., imidazolyl, pyrazolyl, triazolyl, 2-furyl, 2-chenyl, 2-pyrimidinyl, 2-benzothiazolyl), cyano group, hydroxyl group, nitro group, carboxyl group, amino group, alkyloxy group (e.g., methoxy, ethoxy, 2-methoxyethoxy, 2-methanesulfonylethoxy), aryloxy group (e.g., phenoxy, 2-methylphenoxy, 4-t-butylphenoxy, 3-nitrophenoxy, 3-t-butyloxycarbamoylphenoxy, 3-methoxycarbamoyl), acylamio group (e.g., acetamide, benzamide, 4-(3-t-butyl-4-hydroxyphenoxy) butanamide), alkylamino group (e.g., methylamino, butylamino, diethylamino, methylbutylamino), anilino group (e.g., phenylamino, 2-chloroanilino), ureide group (e.g., phenylureide, methylureide, N,N-dibutylureide), sulfamoylamino group (e.g., N,N-dipropylsulfamoylamino), alkylthio group (e.g., methylthio, octylthio, 2-phenoxyethylthio), arylthio group (e.g., phenylthio, 2-butoxy-5-t-octylphenylthio, 2-carboxyphenylthio), alkyloxycarbonylamino group (e.g., methoxycarbonylamino), sulfonamide group (e.g., methanesulfonamide, benzenesulfonamide, p-toluenesulfonamide), carbamoyl group (e.g., N-ethylcarbamoyl, N,N-dipropylsulfamoyl, N-phenylsulfamoyl), sulfonyl group (e.g., methanesulfonyl, octanesulfonyl, benzenesulfonyl, toluenesulfonyl), alkyloxycarbonyl group (e.g., methoxycarbonyl, butyloxycarbonyl), heterocyclic oxy group (e.g., 1-phenyltetrazole-5-oxy, 2-tetrahydropyeranyloxy), azo group (e.g., phenylazo, 4-methoxyphenylazo, 4-pivaloylaminophenylazo, 2-hydroxy-4-propanylphenylazo), acyloxy group (e.g., acetoxy), carbamoyloxy group (e.g., N-methylcarbamoyloxy, N-phenylcarbamoyloxy), silyloxy group (e.g., trimethylsilyloxy, dibutylmethylsilyloxy), aryloxycarbonylamino group (e.g., phenoxycarbonylamino), imide group (e.g., N-succinimide, N-phthalimide), heterocyclic thio group (e.g., 2-benzothiazolylthio, 2,4-di-phenoxy-1,3, 5-triazole-6-thio, 2-pyridylthio), sulfinyl group (e.g., 3-phenoxypropylsulfinyl), phosphonyl group (e.g., phenoxyphosphonyl, octyloxyphosphonyl, phenylphosphonyl), aryloxycarbonyl group (e.g., phenoxycarbonyl), acyl group (e.g., acetyl, 3-phenylpropanoyl, benzoyl), and ionically hydrophilic group (e.g., carboxyl group, sulfo group, phosphono group and quaternary ammonium group).

The phthalocyanine dye represented by the aforementioned formula (I), if it is water-soluble, preferably has an ionically hydrophilic group. Examples of the ionically hydrophilic group include sulfo group, carboxyl group, phosphono group, quaternary ammonium group, etc. Preferred among the aforementioned ionically hydrophilic groups are carboxyl group, phosphono group, and sulfo group, particularly carboxyl group and sulfo group. The carboxyl group, phosphono group and sulfo group may be in the form of salt. Examples of the counter ion forming the salt include ammonium ions, alkaline metal ions (e.g., lithium ion, sodium ion, potassium ion), and organic cations (e.g., tetramethylammonium ion, tetramethylguanidium ion, tetramethylphosphonium). Preferred among these counter ions are alkaline metal salts. In particular, lithium salts are preferred because they enhance solubility of dye and stability of ink.

Referring to the number of ionically hydrophilic groups, it is desired that at least two ionically hydrophilic groups be contained per molecule of phthalocyanine-based dye. It is particularly desired that at least two sulfo groups and/or carboxyl groups be contained per molecule of phthalocyanine-based dye.

The suffixes a1 to a4 and b1 to b4 represent the number of substituents $X_1$ to $X_4$ and $Y_1$ to $Y_4$, respectively. The suffixes a1 to a4 each independently represent an integer of from 0 to 4 but are not 0 at the same time. The suffixes b1 to b4 each independently represent an integer of from 0 to 4. When any of a1 to a4 and any of b1 to b4 are an integer of not smaller than 2, any of X1 to X4 and any of Y1 to Y4 are present in plurality. They may be the same or different.

The suffixes a1 and b1 satisfy the equation a1+b1=4. In a particularly preferred combination of a1 and b1, a1 represents 1 or 2 and b1 represents 3 or 2. In the best combination, a1 represents 1 and b1 represents 3.

The various combinations of a1 and b1, a1 and b1 and a1 and b1 have the same relationship as combination of a1 and b1. This applies also to preferred combinations.

M represents a hydrogen atom, metal element or oxide, hydroxide or halide thereof.

Preferred examples of M include metal elements such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi beside hydrogen atom. Preferred examples of the oxide include VO, GeO, etc. Preferred examples of the hydroxide include $Si(OH)_2$, $Cr(OH)_2$, $Sn(OH)_2$, etc. Further, examples of the halide include AlCl, $SiCl_2$, VCl, $VCl_2$, VOCl, FeCl, GaCl, ZrCl, etc. Preferred among these metal elements are Cu, Ni, Zn, Al, etc., most preferably Cu.

Further, Pc (phthalocyanine ring) may form a dimer (e.g., Pc-M-L-M-Pc) or a trimer via L (divalent connecting group) wherein M's may be the same or different.

Preferred examples of the divalent connecting group represented by L include oxy group-O—, thio group-S—, carbonyl group-CO—, sulfonyl group-$SO_2$—, imino group-NH—, methylene group-$CH_2$—, and groups formed by combination thereof.

Referring to a preferred combination of substituents on the compound represented by the formula (I), at least one of the various substituents is preferably a compound which is a preferred group as mentioned above. More preferably, more of the various substituents are compounds which are preferred groups as mentioned above. Most preferably, all the various substituents are compounds which are preferred groups as mentioned above.

Even more desired among the phthalocyanine dyes represented by the aforementioned formula (I) is the phthalocyanine dye having a structure represented by the aforementioned formula (II). The phthalocyanine dye represented by the aforementioned formula (II) of the present invention will be further described hereinafter.

In the aforementioned formula (II), $X_{11}$ to $X_{14}$ and $Y_{11}$ to $Y_{18}$ have the same meaning as $X_1$ to $X_4$ and $Y_1$ to $Y_4$ in the formula (I), respectively. Preferred examples of $X_{11}$ to $X_{14}$ and $Y_{11}$ to $Y_{18}$ include those listed with reference to the formula (I). $M_1$ has the same meaning as M in the formula (I). Preferred examples of $M_1$ include those listed with reference to the formula (I).

In the formula (II), $a_{11}$ to $a_{14}$ each independently represent an integer of 1 or 2. Preferably, the sum of $a_{11}$, $a_{12}$, $a_{13}$ and $a_{14}$ is from not smaller than 4 to not greater than 6.

It is particularly preferred that $a_{11}$, $a_{12}$, $a_{13}$ and $a_{14}$ each are 1.

$X_{11}$, $X_{12}$, $X_{13}$ and $X_{14}$ may be the same substituent. Alternatively, $X_{11}$, $X_{12}$, $X_{13}$ and $X_{14}$ each may be —$SO_2$-Z in which Z differs among $X_1$, $X_2$, $X_3$ and $X_4$. Thus, $X_{11}$, $X_{12}$, $X_{13}$ and $X_{14}$ each may be a substituent of the same kind but partially different. Alternatively, $X_{11}$, $X_{12}$, $X_{13}$ and $X_{14}$ may be different substituents, e.g., —$SO_2$-Z, —$SO_2NR_1R_2$.

Particularly preferred examples of the combination of substituents among the phthalocyanine dyes represented by the formula (II) will be given below.

Preferably, $X_{11}$ to $X_{14}$ each independently represent —SO-Z, —SO$_2$-Z, —SO$_2$NR$_1$R$_2$ or —CONR$_1$R$_2$, particularly —SO$_2$-Z or —SO$_2$NR$_1$R$_2$, most preferably —SO$_2$-Z.

Z each independently represents a substituted or unsubstituted alkyl group, substituted or unsubstituted aryl group or substituted or unsubstituted heterocyclic group. Most desirable among these groups are substituted alkyl group, substituted aryl and substituted heterocyclic group. Particularly for the reason of enhancement of dye solubility or ink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$R_1$ and $R_2$ each independently represent a hydrogen atom, substituted or unsubstituted alkyl group, substituted or unsubstituted aryl group or substituted or unsubstituted heterocyclic group, particularly a hydrogen atom, substituted alkyl group, substituted aryl group or substituted heterocyclic group. However, it is not preferred that $R_1$ and $R_2$ each are a hydrogen atom at the same time. Particularly for the reason of enhancement of dye solubility or ink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$Y_{11}$ to $Y_{18}$ each independently represent a hydrogen atom, halogen atom, alkyl group, aryl group, cyano group, alkoxy group, amide group, ureide group, sulfonamide group, carbamoyl group, sulfamoyl group, alkoxycarbonyl group, carboxyl group or sulfo group, particularly hydrogen atom, halogen atom, cyano group, carboxyl group or sulfo group, most preferably hydrogen atom.

The suffixes a11 to a14 each independently represent 1 or 2. It is particularly preferred that a11 to a14 each be 1 at the same time.

$M_1$ represents a hydrogen atom, metal element or oxide, hydroxide or halide thereof, particularly Cu, Ni, Zn or Al, most preferably Cu.

The phthalocyanine dye represented by the formula (II), if it is water-soluble, preferably has an ionically hydrophilic group. Examples of the ionically hydrophilic group include sulfo group, carboxyl group, phosphono group, and quaternary ammonium group. Preferred among these ionically hydrophilic groups are carboxyl group, phosphono group, and sulfo group. Particularly preferred among these ionically hydrophilic groups are carboxyl group and sulfo group. The carboxyl group, phosphono group and sulfo group may be used in the form of salt. Examples of the counter ion forming the salt include ammonium ion, alkalinemetal ion (e.g., lithiumion, sodiumion, potassium ion), and organic cation (e.g., tetramethylammonium ion, tetramethylguanidium ion, tetramethylphosphonium ion). Preferred among these counter ions are alkaline metal ions. Particularly preferred among these counter ions is lithium ion because it enhances the dye solubility and hence the ink stability.

The number of ionically hydrophilic groups is preferably at least 2 per molecule of phthalocyanine-based dye. It is particularly preferred that there be contained at least two sulfo groups and/or carboxyl groups in the phthalocyanine-based dye.

Referring to preferred combination of substituents on the compound represented by the formula (II), the compound of the formula (II) preferably has various substituents at least one of which is one of the preferred groups listed above. More preferably, more of the various substituents are the preferred groups listed above. Most preferably, all of the various substituents are the preferred groups listed above.

Referring to the chemical structure of the phthalocyanine dye according to the present invention, it is preferred that at least one electron-withdrawing group such as sulfinyl group, sulfonyl group and sulfamoyl group be incorporated in each of four benzene rings in the phthalocyanine such that σp value of the substituents in the entire phthalocyanine skeleton totals not smaller than 1.6.

The Hammett's substituent constant σp as used herein will be somewhat described hereinafter. Hammett's rule is an empirical rule which L. P. Hammett proposed in 1935 to quantitatively discuss the effect of substituents on the reaction or equilibrium of benzene derivatives. The validity of this empirical rule has been widely accepted today. Substituent constants required in Hammett's rule are σp value and σm value. These values are found in many general literatures. For the details of these values, reference can be made to J. A. Dean, "Lange's Handbook of Chemistry", 12th ed., 1979 (Mc Graw-Hill), and "Kagaku no Ryoiki (Region of Chemistry)", extra edition, No. 122, pp. 96-103, 1979 (Nankodo).

The phthalocyanine derivative represented by the formula (I) is normally a mixture of analogues which are unavoidably different in introduction sites of substituents Xn (n=1 to 4) and Ym (m=1 to 4) and introduced number of these substituents by synthesis method. Accordingly, the formula of the phthalocyanine dye is mostly a statistically averaged representation of these analogous mixtures. In the present invention, it was found that the classification of these analogous mixtures into the following three classes gives a specific mixture which is particularly preferred. In other words, mixtures of phthalocyanine-based dye analogues represented by the formulae (I) and (II) are classified into the following classes for definition. In some detail, mixture of phthalocyanine-based dye analogues represented by the aforementioned formulae (I) and (II) will be defined in the following three classifications. In the formula (II), $Y_{11}$, $Y_{12}$, $Y_{13}$, $Y_{14}$, $Y_{15}$, $Y_{16}$, $Y_{17}$, and $Y_{18}$ are in 1-position, 4-position, 5-position, 8-position, 9-position, 12-position, 13-position and 16-position, respectively.

(1) β-position substitution type: Phthalocyanine dye having a specific substituent on 2- and/or 3-position, 6- and/or 7-position, 10- and/or 11-position, or 14- and/or 15-position (2) α-position substitution type: Phthalocyanine dye having a specific substituent on 1- and/or 4-position, 5- and/or 8-position, 9- and/or 12-position, or 13- and/or 16-position (3) α,β-position mixed substitution type: Phthalocyanine dye having a specific substituent irregularly on 1- to 16-position.

In the specification, in order to describe phthalocyanine dye derivatives having different structures (particularly different substitution positions), the aforementioned β-position substitution type, α-position substitution type and α,β-position mixed substitution type are used.

The phthalocyanine derivative to be used in the present invention can be synthesized by, e.g., methods described or cited in Shirai and Kobayashi, "Phthalocyanine—Chemistry and Function—", IPC Co., Ltd., pp. 1 to 62, C. C. Leznoff-A.B.P. Lever, "Phthalocyanines—Properties and Applications", VCH, pp. 1-54, etc. or analogous methods in combination.

The phthalocyanine compound represented by the formula (I) to be used in the present invention can be synthesized by, e.g., sulfonation reaction, sulfonylchloration reaction and amidation reaction of unsubstituted phthalocyanine compound as disclosed in World Patents 00/17275, 00/08103, 00/08101 and 98/41853 and JP-A-10-36471. In this case, since sulfonation can occur on any position of the phthalocyanine nucleus, it is difficult to control the sulfonated number of substituents. Accordingly, when sulfo groups are incorporated under such a reaction condition, the position and number of sulfo groups incorporated in the reaction product cannot be predetermined, unavoidably giving a mixture of products having different numbers of substituents or substitution positions. Thus, since when this mixture is used as a starting material to synthesize the compound of the present invention, a α,β-mixed substitution type mixture comprising some compounds having different numbers of substituents or substitution positions is obtained as a compound of the present invention because the number of heterocyclic group-substituted sulfamoyl groups or the substitution position cannot be predetermined.

As previously mentioned, when many electron-withdrawing groups such as sulfamoyl group are incorporated in the phthalocyanine nucleus, the phthalocyanine dye is provided with a more positive oxidation potential and hence an enhanced ozone fastness. When synthesized according to the aforementioned method, it is unavoidable that the reaction mixture contains a phthalocyanine dye having a small number of electron-withdrawing groups incorporated therein, i.e., lower oxidation potential. Accordingly, in order to enhance the ozone fastness of the phthalocyanine dye, a synthesis method capable of inhibiting the production of a compound having a lower oxidation potential is preferably employed.

The phthalocyanine compound represented by the formula (II) can be derived from a tetrasulfophthalocyanine compound obtained by, e.g., reacting a phthalonitrile derivative (compound P) represented by the following formula and/or a diiminoisoindoline derivative (compound Q) represented by the following formula with a metal compound represented by the formula (III) or reacting a 4-sulfophthalocyanine derivative (compound R) represented by the following formula with a metal compound represented by the formula (III).

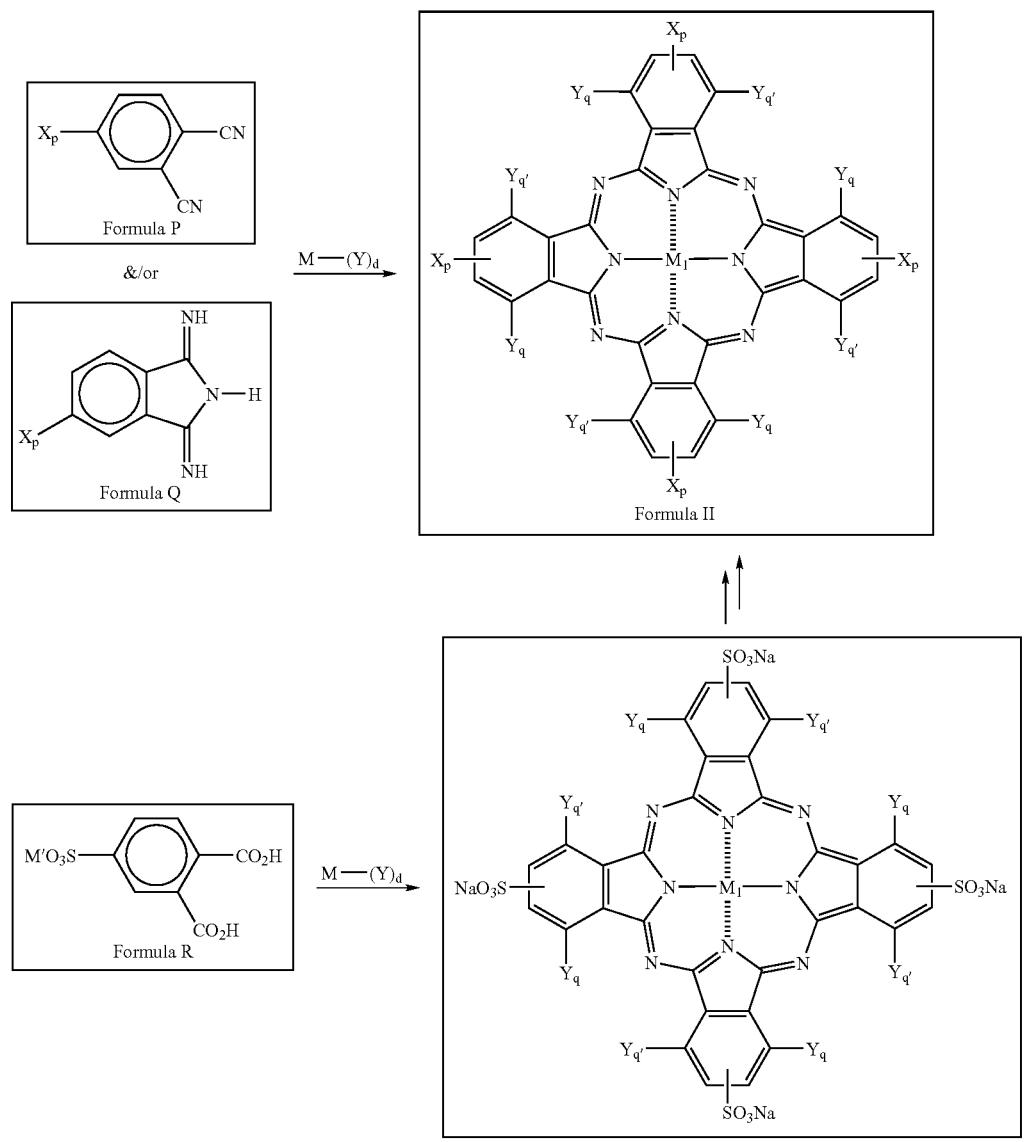

In these formulae, Xp corresponds to $X_{11}$, $X_{12}$, $X_{13}$ or $X_{14}$ in the formula (II). Yq and Yq' each correspond to $Y_{11}$, $Y_{12}$, $Y_{13}$, $Y_{14}$, $Y_{15}$, $Y_{16}$, $Y_{17}$ or $Y_{18}$ in the formula (II). In the compound R, M' represents a cation.

Examples of the cation represented by M' include alkaline metal ions such as Li, Na and K ions and organic cations such as triethylammonium ion and pyridinium ion.

$$M-(Y)d \quad (III)$$

wherein M is as defined in the formulae (I-b) and (II); Y represents a monovalent or divalent ligand such as halogen atom, acetate anion, acetyl acetonate and oxygen; and d represents an integer of from 1 to 4.

In other words, when synthesized according to the aforementioned method, desired substituents can be incorporated by a predetermined number. In particular, in order to introduce many electron-withdrawing groups to make the oxidation potential more positive as in the present invention, the aforementioned synthesis method can be used because it is extremely excellent as compared with the aforementioned method for synthesis of the phthalocyanine compound of the formula (I).

The phthalocyanine compound represented by the formula (II) thus obtained is a mixture of compounds represented by the following formulae (a)-1 to (a)-4 which are isomeric with the substitution position on Xp, i.e., β-position substitution type mixture.

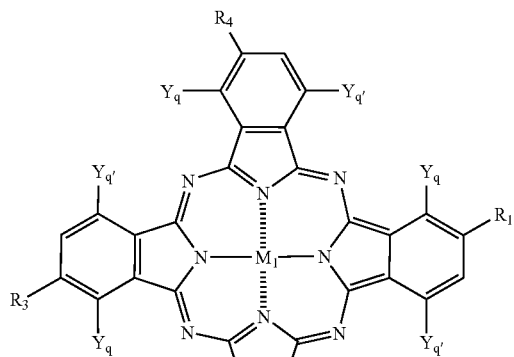

(a)-1

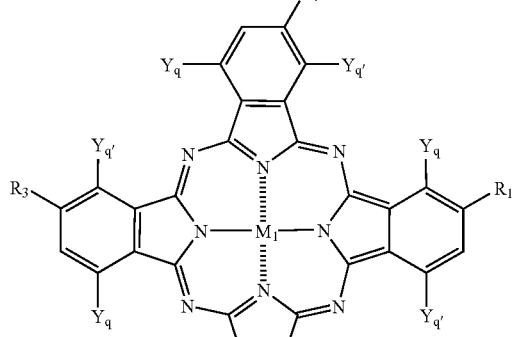

(a)-2

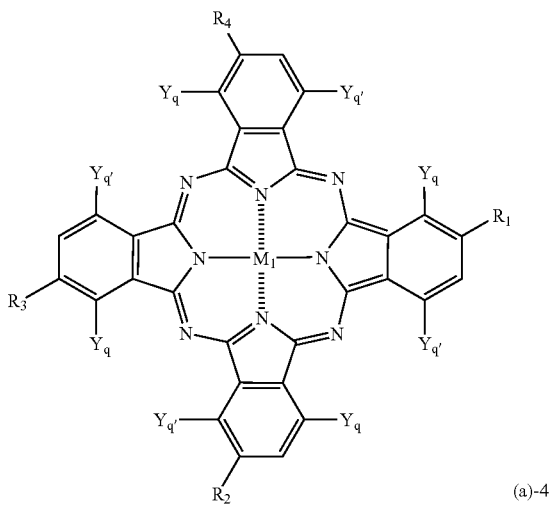

(a)-3

(a)-4

In the foregoing synthesis method, when the same compound is used as Xp, a β-position substitution type phthalocyanine dye wherein $X_{11}$, $X_{12}$, $X_{13}$ and $X_{14}$ are the same substituent can be obtained. On the contrary, when different materials are used in combination as Xp, a dye having substituents of the same kind but partially different or a dye having different substituents can be synthesized. Among the dyes of the formula (II), these dyes having different electron-withdrawing substituents are particularly desirable because they can adjust the solubility and association of the dye, the age stability of the ink, etc.

In the present invention, it was found very important for the enhancement of fastness that any of these substitution types has an oxidation potential of more positive than 1.0 V (vs SCE). The degree of this effect could not be expected from the related art. Although its mechanism is not known in detail, a tendency was given that β-position substitution type is obviously better than α,β-position mixed substitution type in hue, light fastness, ozone fastness, etc.

Specific examples of the phthalocyanine dyes represented by the formulae (I) and (II) (exemplary compounds I-1 to I-12 and exemplary compounds 101 to 190) will be given below, the phthalocyanine dye to be used in the present invention is not limited thereto.

Exemplary Compound
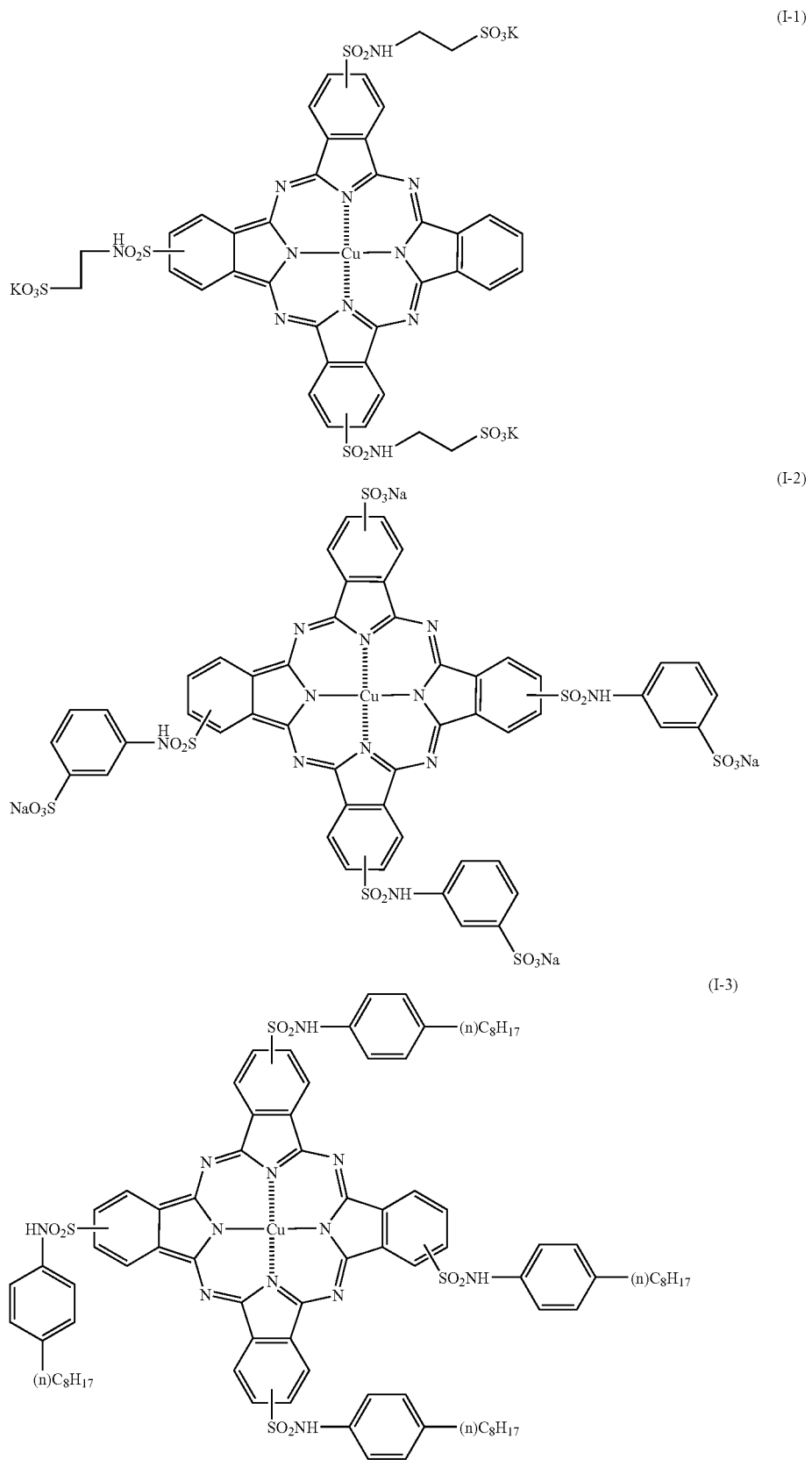

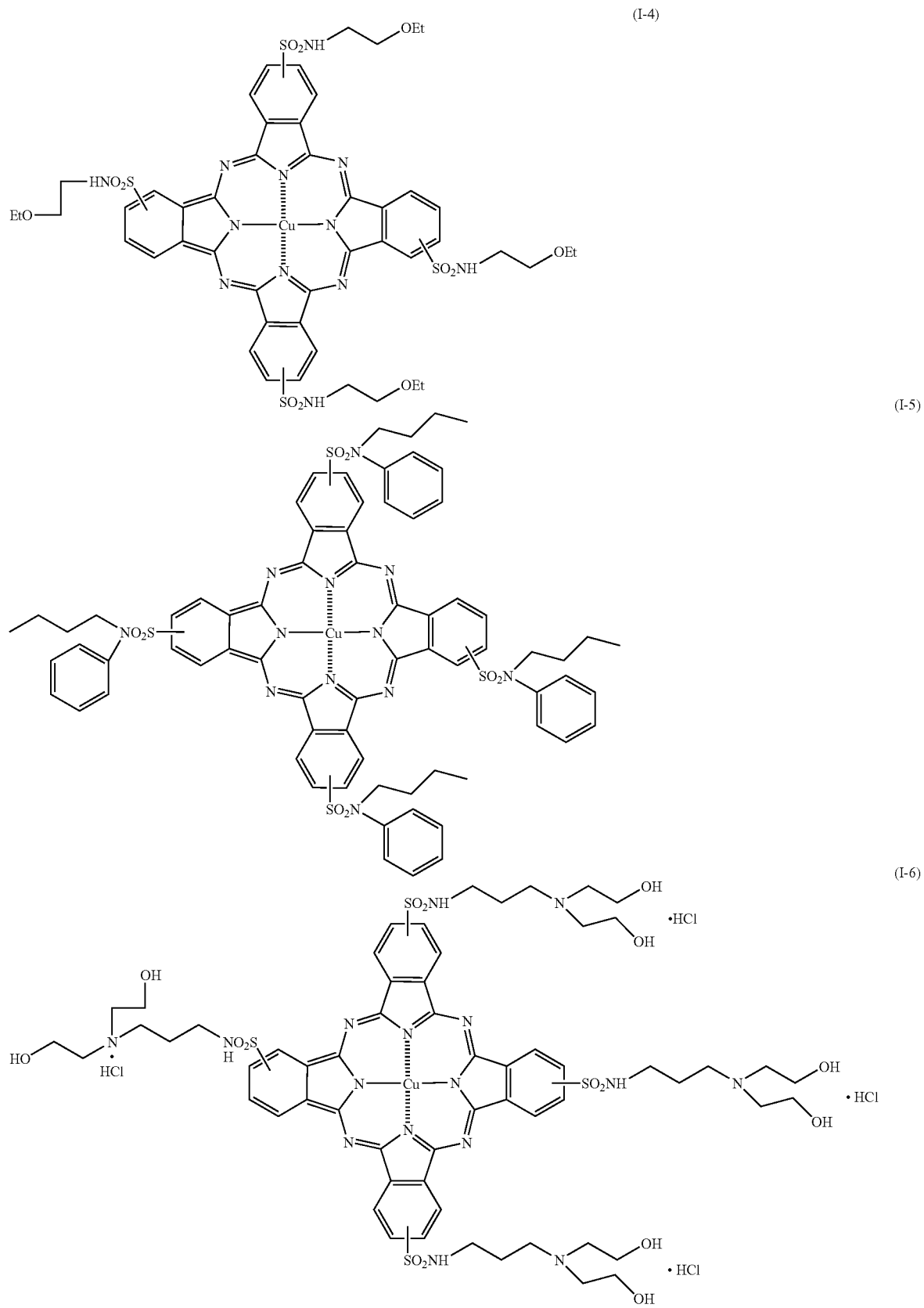

-continued
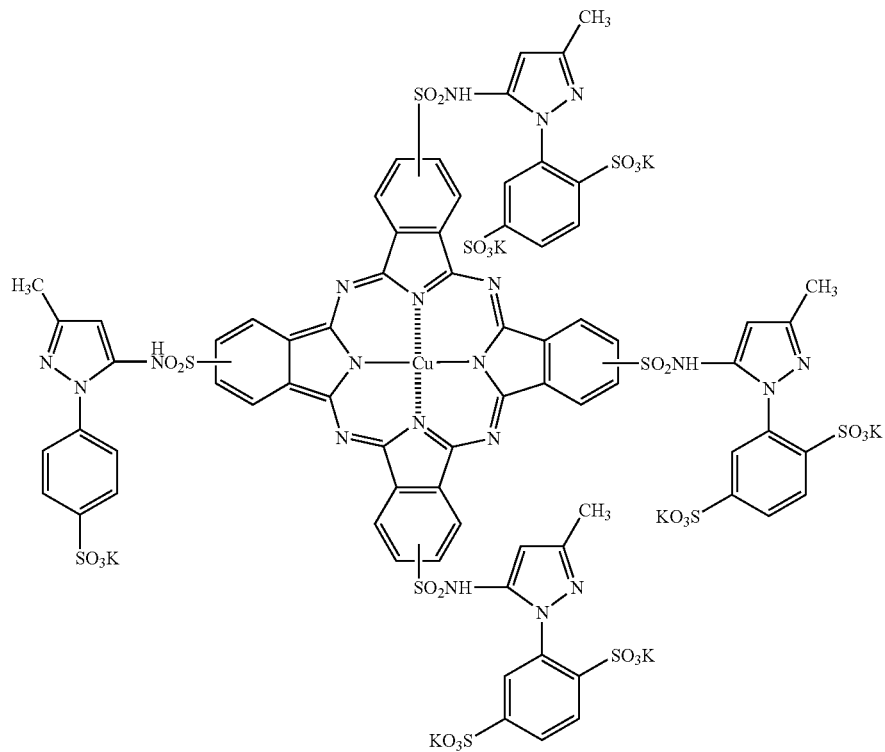
(I-7)
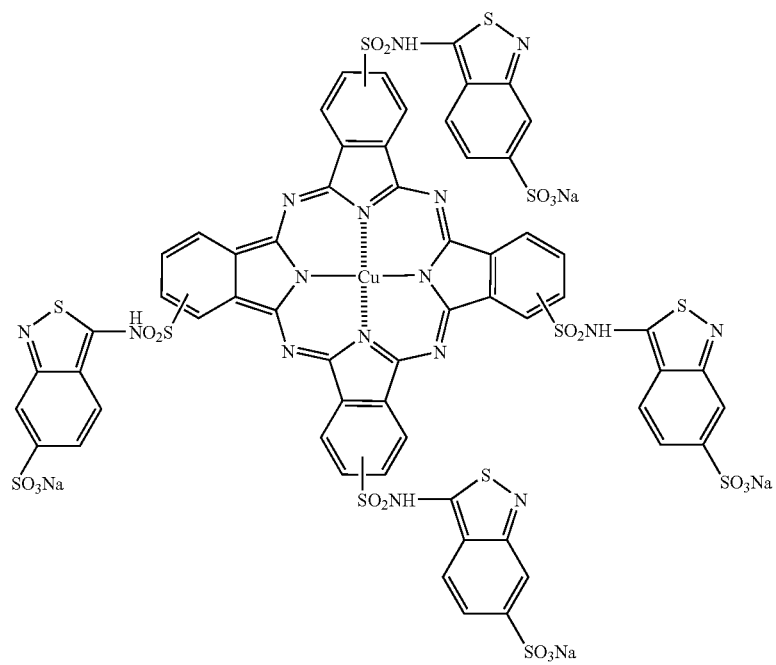
(I-8)

-continued
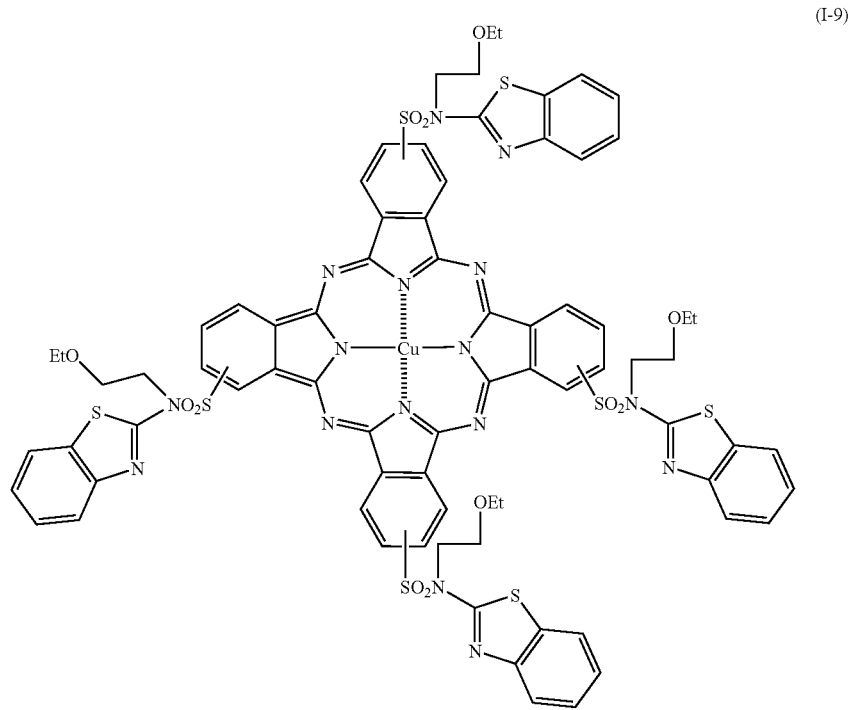
(I-9)
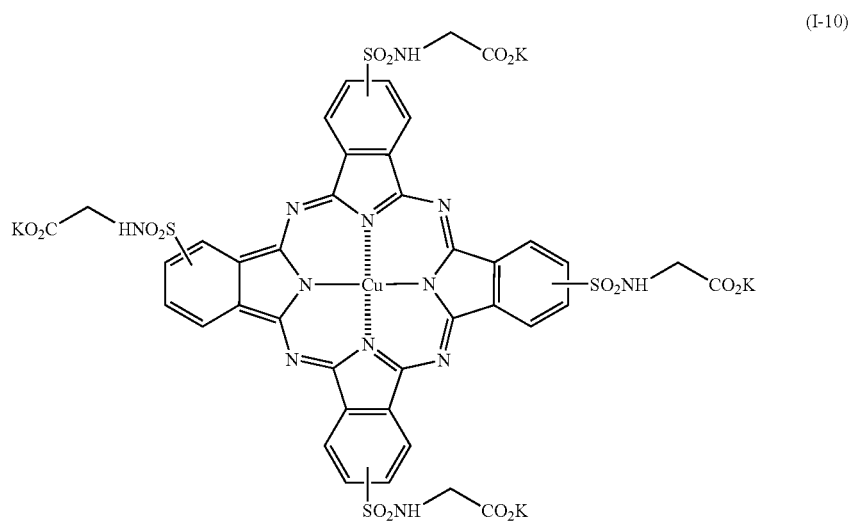
(I-10)

-continued
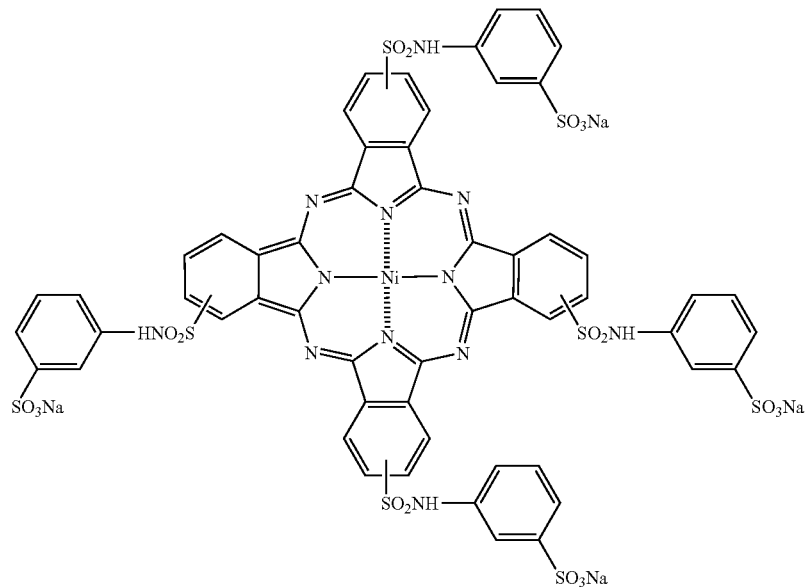
(I-11)
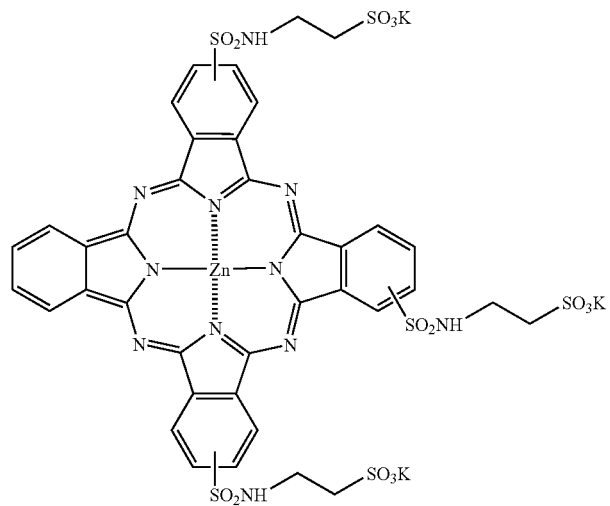
(I-12)

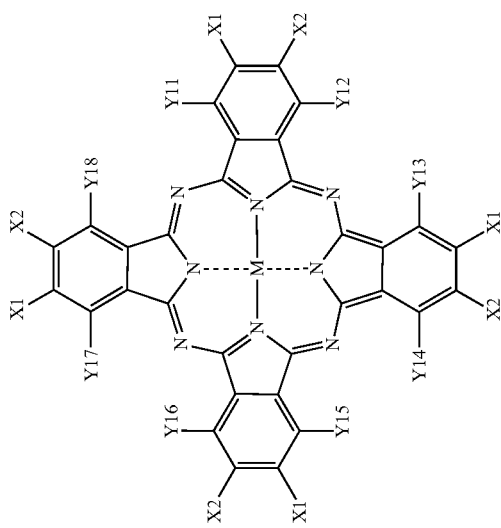

Specific examples of various combinations of $(X_1, X_2)$, $(Y_{11}, Y_{12})$, $(Y_{13}, Y_{14})$, $(Y_{15}, Y_{16})$, and $(Y_{17}, Y_{18})$ are each independently not in order.

| Compound No | M | X1 | X2 | Y11, Y12 | Y13, Y14 | Y15, Y16 | Y17, Y18 |
|---|---|---|---|---|---|---|---|
| 101 | Cu | —SO₂—NH—CH₂—CH₂—SO₃Li | —H | —H, —H | —H, —H | —H, —H | —H, —H |
| 102 | Cu | —SO₂—NH—CH₂—CH(OH)—CO—NH—CH₂CH₂—SO₃Na | —H | —Cl, —H | —Cl, —H | —Cl, —H | —Cl, —H |
| 103 | Cu | —SO₂—NH—CH₂—CH₂—SO₂NH—CH₂CH(OH)—SO₃Li | —H | —H, —H | —H, —H | —H, —H | —H, —H |
| 104 | Cu | —SO₂—NH—C₆H₄—SO₂NH—CH₂CH₂—SO₃Li | —H | —H, —H | —H, —H | —H, —H | —H, —H |
| 105 | Ni | —SO₂—NH—CH₂—CH₂—CO—NH—CH(CH₂—COONa)—COONa | —H | —Cl, —H | —Cl, —H | —Cl, —H | —Cl, —H |
| 106 | Cu | —SO₂—NH—CH₂—CH₂—SO₂—NH—CH₂—COONa | —CN | —H, —H | —H, —H | —H, —H | —H, —H |

| | | | | | | | | |
|---|---|---|---|---|---|---|---|---|
| 107 | Cu | —SO$_2$—CH$_2$—CH$_2$—SO$_2$—NH—CH(CH$_2$—OH)—COOLi | —H | —H, —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H | —H, —H |
| 111 | Cu | —SO$_2$—NH—CH$_2$—CH$_2$—CH$_2$—SO$_2$—NH—CH$_2$CH—CH$_2$—SO$_3$Li with OH | —H | —H, —H | —H, —H | —H, —H | —H, —H | —H, —H |
| 112 | Cu | —SO$_2$—NH—CH$_2$—CH$_2$—CH$_2$—SO$_2$NH—CH$_2$—CH—CH$_3$ with OH and CH$_3$ | —SO$_3$Li | —H, —H | —H, —H | —H, —H | —H, —H | —H, —H |
| 113 | Cu | —SO$_2$—CH$_2$—CH—CH$_2$SO$_3$K with OH | —H | —H, —H | —H, —H | —H, —H | —H, —H | —H, —H |
| 114 | Cu | —SO$_2$—CH$_2$—CH—CH$_3$ with OH | —SO$_3$Li | —H, —H | —H, —H | —H, —H | —H, —H | —H, —H |
| 115 | Cu | —SO$_2$NH(CH$_2$)$_3$N$^{\oplus}$(CH$_2$CH$_2$OH)$_2$·CH$_3$ with CH$_3$ and C$_6$H$_4$-SO$_3^{\ominus}$ | —H | —H, —H | —H, —H | —H, —H | —H, —H | —H, —H |
| 116 | Cu | —CO—NH—CH$_2$—CH—CH$_2$SO$_3$K with OH | —H | —H, —H | —H, —H | —H, —H | —H, —H | —H, —H |
| 117 | Cu | —CO—NH—CH$_2$CH$_2$SO$_3$Li with COOLi | —H | —H, —H | —H, —H | —H, —H | —H, —H | —H, —H |
| 118 | Cu | —SO$_2$CH$_2$CH$_2$CH—CH with CH$_3$ and SO$_3$Li | —H | —H, —H | —H, —H | —H, —H | —H, —H | —H, —H |
| 119 | Cu | —SO$_2$—CH$_2$—CH—CH$_2$—SO$_3$Na with OH | —H | —H, —H | —H, —H | —H, —H | —H, —H | —H, —H |

-continued

| No. | Metal | R | | | | | |
|---|---|---|---|---|---|---|---|
| 120 | Cu | —SO₂—CH₂—CH₂—CH(CH₃)—COOLi | —H | —H | —H | —H | —H, —H |
| 121 | Cu | —SO₂(CH₂)₃SO₂NHCH₂—CH(OH)—CH₂—SO₃Li | —H | —H | —H | —H | —H, —H |
| 122 | Cu | —CO₂CH₂CH₂CH₂SO₂—NH—CH₂—CH(OH)—CH₂—SO₃Li | —H | —H | —H | —H | —H, —H |
| 123 | Cu | —SO₂NH—C₈H₁₇(t) | —H | —H | —H | —H | —H, —H |
| 124 | Cu | —SO₂—NH—CH₂—CH(CH₂CH₃)—CH₂CHCH₂—CH₃ | —H | —H | —H | —H | —H, —H |
| 125 | Cu | —SO₂CH₂CH₂CH₂SO₂—NH—CH₂—CH(CH₃)—CH₂—CH₂—CH₃ | —H | —H | —H | —H | —H, —H |
| 126 | Cu | —SO₂—CH₂—CH₂—CO₂—CH(CH₃)—CH₂—O—CH₃ | —H | —H | —H | —H | —H, —H |
| 127 | Cu | —SO₂CH₂CH₂CH₂SO₂NHCH₂CH₂O—CH(CH₃)(CH₃) | —H | —H | —H | —H | —H, —H |
| 128 | Zn | —SO₂—CH₂—CH(O—CH₃)—CH₂—O—CH₂ | —CN | —H | —H | —H | —H | —H, —H |
| 129 | Cu | —CO—NH—CH₂—CH(CH₂CH₃)—CH₂—CH₂—CH₂CH₃ | —H | —Cl | —Cl | —Cl | —Cl | —Cl, —H |
| 130 | Cu | —CO₂—CH(CH₃)—CH₂—O—C₄H₉(t) | —H | —H | —H | —H | —H | —H, —H |

-continued

| | | | | | | | | |
|---|---|---|---|---|---|---|---|---|
| 131 | Cu | ![SO2-CH2-CH2-CH(CH3)-SO2-NH-phenyl(SO3Li)(SO3Li)] | H | H, H | H, H | H, H | H, H | H, H |
| 132 | Cu | ![SO2NH-phenyl(CO2C6H13(n))2] | H | H, H | H, H | H, H | H, H | H, H |
| 133 | Cu | ![SO2NH-phenyl(OCH2CH2OCH3)(SO2NHCH2CH(C2H5)C4H9)] | H | H, H | H, H | H, H | H, H | H, H |
| 134 | Cu | ![SO2NH-phenyl-SO2NH-CH2-CH(CH2CH3)-CH2CH2-CH2-CH3] | H | H, H | H, H | H, H | H, H | H, H |
| 135 | Cu | ![SO2-phenyl-CO2Na] | H | H, H | H, H | H, H | H, H | H, H |
| 136 | Cu | ![SO2N(C4H9(n))(phenyl)] | H | H, H | H, H | H, H | H, H | H, H |
| 137 | Cu | ![SO2-benzothiazole-SO3Li] | H | H, H | H, H | H, H | H, H | H, H |

-continued

| | | | | | | |
|---|---|---|---|---|---|---|
| 138 | Cu | ![structure with CH3, pyrazole, SO3Li, SO2NH, LiO3S] | —H | —H, —H | —H, —H | —H, —H |
| 139 | Cu | —SO2(CH2)3—NH—C(O)— (3,4-di-CO2Li-phenyl) | —Cl | —H, —H | —H, —H | —H, —H |
| 140 | Cu | —CO2—CH2CH2CH2—NH—(triazine)—NH—CH2CH2—CH(CH3)—SO3Li (×2) | —H | —H, —H | —H, —H | —H, —H |
| 141 | Cu | —SO2NH—CH(COONa)—CH2—CO—N(CH2CH2OH)2 | —H | —H, —H | —H, —H | —H, —H |
| 142 | Cu | —SO2NH—(3-SO3Li-phenyl)—NHC(O)—(3-position phenyl)—SO2NH— | —H | —H, —H | —H, —H | —H, —H |
| 143 | Cu | —CO—NH—CH(COOK)—CH(OH)—CO—NH—CH(CH2CH2—SO3K)—CH2CH2—SO3K | —H | —H, —H | —H, —H | —H, —H |

-continued

| 144 | Cu | —SO$_2$—CH$_2$CH$_2$CH$_2$—NH—CO— | ![benzene with COOLi and CO—NH—CH—CH$_2$—COOLi] | —H | —H, —H | —H, —H |
|---|---|---|---|---|---|---|
| 145 | Cu | —SO$_2$CH$_2$CH$_2$OCH$_2$CH$_2$OCH$_2$CH$_2$SO$_3$Li | | —H | —H, —H | —H, —H |

M-Pc(Xp$_1$)$_m$(Xp$_2$)$_n$ In the table, the introduction sites of the substituents (Xp1) and (Xp2) in the β-position substituents are not in order.

| Compound No. | M | Xp$_1$ | m | Xp$_2$ | n |
|---|---|---|---|---|---|
| 146 | Cu | —SO$_2$—NH—CH$_2$—CH(CH$_3$)—SO$_3$Li | 3 | —SO$_2$—NH—CH$_2$—CH(OH)—CH$_3$ | 1 |
| 147 | Cu | —SO$_2$—NH—CH$_2$—CH$_2$SO$_3$Li | 3 | —SO$_2$—NH—CH$_2$—CH$_2$—SO$_2$—NH—CH$_2$—CH(OH)—CH$_3$ | 1 |
| 148 | Cu | —SO$_2$—NH—CH$_2$—CH(CH$_3$)—SO$_3$Li | 3 | —SO$_2$NH—CH$_2$—CH$_2$—SO$_2$—NH—CH$_2$—CH$_2$—O—CH$_2$—CH$_2$—OH | 1 |
| 149 | Cu | —SO$_2$—NH—CH$_2$—CH(CH$_3$)—SO$_3$Li | 2 | —SO$_2$—NH—CH$_2$—CH$_2$—CH$_2$—CO—N(CH$_2$—CH$_2$—OH)$_2$ | 2 |
| 150 | Cu | —SO$_2$—NH—CH$_2$—CH$_2$—SO$_2$—NH—CH$_2$CH$_2$—COONa | 3 | —SO$_2$NH—CH(CH$_3$)—CH$_2$OH | 1 |
| 151 | Cu | ![phenyl with SO$_2$NH—CH$_2$—CH(OH)—SO$_3$Li and SO$_2$—NH] | 3 | —SO$_2$NH—CH$_2$—CH$_2$—O—CH$_2$—CH$_2$—OH | 1 |
| 152 | Cu | —SO$_2$—CH$_2$—CH(CH$_3$)—SO$_3$Li | 2.5 | —SO$_2$—CH$_2$—CH$_2$—O—CH$_2$—CH$_2$—OH | 1.5 |
| 153 | Cu | —SO$_2$—CH$_2$—CH(CH$_3$)—SO$_3$Na | 2 | —SO$_2$—CH$_2$—CH$_2$—CH$_2$—CO—N(CH$_2$—CH$_2$—OH)$_2$ | 2 |
| 154 | Cu | —SO$_2$—CH$_2$—CH$_2$—CH$_2$—SO$_3$Li | 3 | —SO$_2$—CH$_2$—CH$_2$—SO$_2$—NH—CH$_2$—CH(OH)—CH$_3$ | 1 |

-continued

| # | M | R1 | n1 | R2 | n2 |
|---|---|----|----|----|----|
| 155 | Cu | —SO₂—CH₂—CH₂—CH₂—COOK | 2 | —SO₂—CH₂—CH₂—CH₂—SO₂—NH—CH₂—CH(OH)—CH₂—COOK | 2 |
| 156 | Cu | —SO₂—CH₂—CH₂—CH₂—SO₃Li | 3 | —SO₂—CH₂—CH₂—SO₃Li | 1 |
| 157 | Cu | —SO₂—CH₂—CH₂—O—CH₂—CH₂—SO₃Li | 2 | —SO₂—CH₂—CH₂—CO₂—CH₂—CH₂—CH₂—COOK | 2 |
| 158 | Cu | —SO₂—CH₂—CH(OH)—CH₂—CH₂SO₃Li | 3 | —SO₂NH—CH₂—CH(OH)—CH₂—OH | 1 |
| 159 | Cu | —SO₂NHCH₂—CH₂—SO₃Li | 3 | —SO₂—CH₂—CH₂—CH₂—SO₂—NH—CH₂—CH(OH)—CH₃ | 1 |
| 160 | Cu | —SO₂—CH₂—CH₂—O—CH₂—CH₂—O—CH₂—CH₂—SO₃Na | 3 | —SO₂—CH₂—CH₂—CH₂—CO—NH—CH(CH₂—CH₂—COONa)—CH₂—COONa | 1 |
| 161 | Cu | —SO₂CH₂CH₂CH₂SO₃Li | 3 | —SO₂CH₂CH₂SO₂NHCH₂—CH(OH)—CH₂SO₃Li | 1 |
| 162 | Cu | —SO₂CH₂CH₂CH₂SO₃Li | 2 | —SO₂CH₂CH₂OCH₂CH₂OCH₂CH₂OH | 2 |
| 163 | Cu | —SO₂CH₂CH₂CH₂SO₃K | 3 | —SO₂CH₂CH₂SO₂NH—CH(CH₃)—CH₂—OH | 1 |
| 164 | Cu | —SO₂CH₂CH₂CH₂SO₃Li | 2 | —SO₂CH₂CH₂CH₂SO₂N(CH₂CH₂OH)₂ | 2 |
| 165 | Cu | —CO—NH—CH₂—CH₂—SO₃K | 3 | —CO—NH—CH₂—O—CH₂—CH₂—OH | 1 |
| 166 | Cu | —CO—NH—CH₂—CH₂—SO₂—NH—CH₂—CH₂—COONa | 3 | —CO—NH—CH(CH₃)—CH(OH)—CH₃ | 1 |
| 167 | Cu | —SO₂(CH₂)₃SO₂NHCH₂—CH(OH)—CH₂CO₂Li | 2.5 | —CO—NH—CH₂—CH₂—CO—N(CH₂—CH₂—OH)₂ | 1.5 |
| 168 | Cu | —CO₂—CH₂—CH(CH₃)—CH₂—SO₃Na | 2 | —CO—CH₂—CH₂—CH₂—CO—N(CH₂—CH₂—OH)₂ | 2 |

-continued

| # | M | R1 | n | R2 | m |
|---|---|---|---|---|---|
| 169 | Cu | —CO$_2$—CH$_2$—CH$_2$—SO$_3$Li | 3 | —CO$_2$—CH$_2$—CH$_2$—SO$_2$—NH—CH$_2$—CH(OH)—CH$_3$ | 1 |
| 170 | Cu | —CO$_2$—CH$_2$—CH$_2$—CH$_2$COOK | 2 | —CO$_2$—CH$_2$—CH$_2$—SO$_2$—NH—CH$_2$—CH(OH)—CH$_2$—CH$_2$—COOK | 2 |
| 171 | Cu | —CO$_2$—CH$_2$—CH$_2$—O—CH$_2$—CH$_2$—O—CH$_2$—CH$_2$—SO$_3$Na | 3 | —SO$_2$—CH$_2$—C$_6$H$_4$—SO$_2$NH—CH$_2$—CH(OH)—CH$_2$—OH | 1 |
| 172 | Cu | —SO$_2$CH$_2$CH$_2$OCH$_2$CH$_2$O—CH$_2$CH$_2$SO$_3$K | 2 | —CO$_2$—CH$_2$—CO$_2$—CH$_2$—CH$_2$—CH$_2$—COOK | 2 |
| 173 | Cu | —SO$_2$(CH$_2$)$_3$SO$_2$NHCH$_2$CHCH$_2$OH (OH) | 2 | —CO$_2$—CH$_2$—CH(OH)—CH$_2$—SO$_3$Li | 2 |
| 174 | Cu | —SO$_2$(CH$_2$)$_3$SO$_2$NHCH$_2$—CH(OH)—CH$_2$SO$_3$K | 3 | —CO$_2$—CH$_2$—CH$_2$—SO$_2$—NH—CH$_2$—CH(OH)—CH$_3$ | 1 |
| 175 | Cu | —SO$_2$(CH$_2$)$_3$SO$_2$NH(CH$_2$)$_3$N(CH$_2$CH$_2$OH)$_2$ | 2 | —CO$_2$—CH$_2$—CH$_2$—CO—NH—CH$_2$—CH$_2$—COOLi (CH$_2$—CH$_2$—COOLi) | 2 |
| 176 | Cu | —SO$_2$—CH$_2$—CH$_2$—SO$_2$—NH—CH$_2$—CH(OH)—CH$_3$ | 3 | —SO$_2$—CH$_2$—CH$_2$—SO$_2$—NH—CH(CH$_2$CH$_3$)—CH$_2$CH$_2$—CH$_2$CH$_3$ | 1 |
| 177 | Cu | —SO$_2$—CH$_2$—CH$_2$—O—CH$_2$—O—CH$_3$ | 2 | —SO$_2$—CH$_2$—CH$_2$—SO$_2$—NH—CH$_2$—CH(OH)—CH$_3$ | 1 |
| 178 | Cu | —SO$_2$—CH$_2$—CH$_2$—O—CH$_2$—O—CH$_2$—CH$_2$—OH | 3 | —SO$_2$—CH$_2$—CH$_2$—CO$_2$—CH$_2$—CH(CH$_2$CH$_3$)—CH$_2$CH$_2$—CH$_2$CH$_3$ | 1 |
| 179 | Cu | —SO$_2$—CH$_2$—CH(CH$_2$CH$_3$)—CH$_2$CH$_2$—CH$_2$CH$_3$ | 2 | —SO$_2$—CH$_2$—CH$_2$—CH$_2$—SO$_2$—NH—CH(OCH$_3$)—CH$_2$—CH$_3$ | 2 |

-continued

| | | | | | |
|---|---|---|---|---|---|
| 180 | Cu | —SO₂—CH₂—CH₂—SO₂—NH—CH₂—CH(O—CH₃)—CH₂—CH₃ | 3 | —SO₂NH—CH₂—CH₂—SO₂NH—CH₂—CH₂—O—CH₂—CH₂—OH | 1 |
| 181 | Cu | —SO₂—CH₂—CH₂—CO₂—NH—CH(CH₃)—CH₂—CH₃ | 3 | —SO₂—CH₂—CH₂—SO₂—NH—CH(CH₃)₂ | 1 |
| 182 | Cu | —SO₂—CH₂—CH₂—SO₂NH—CH₂—CH(OH)—CH₃ | 2.5 | —SO₂—CH₂—CH₂—CO₂—NH—CH(CH₃)—CH₂—CH₃ | 1.5 |
| 183 | Cu | —SO₂—CH₂—CH₂—CO₂—NH—CH(CH₃)—CH₂—CH₃ | 2 | —SO₂—CH₂—CH₂—SO₂—NH—(CH₂)₃—CH₂—O—CH₂CH₂—OH | 2 |
| 184 | Cu | —SO₂—CH₂—CH₂—SO₂—NH—CH(OH)—CH₂—CH₃ | 3 | —SO₂—CH₂—CH₂—O—CH₂—O—CH₃ | 1 |
| 185 | Cu | —SO₂—CH₂—CH₂—SO₂—NH—CH(OH)—CH₂—CH₃ | 3 | —SO₂—CH₂—CH₂—O—CH₂—CH₂—O—CH₃ | 1 |
| 186 | Cu | —SO₂—CH₂—CH₂—CO₂—NH—CH(CH₃)—CH₂—CH₃ | 3 | —SO₂—CH₂—CH₂—O—CH₂—CH₂—OH | 1 |
| 187 | Cu | —SO₂—CH₂—CH₂—SO₂—NH—CH(CH₃)₂ | 3 | —CO₂—CH₂—CH(CH₂CH₃)—CH₂—CH₂—CH₂CH₃ | 1 |
| 188 | Cu | —CO₂—CH₂—CH₂—CO₂—NH—CH(CH₃)—CH₂—CH₃ | 3 | —CO₂—CH₂—CH₂—O—CH₂—O—CH₃ | 1 |
| 189 | Cu | —CO—NH—CH₂—CH₂—SO₂—NH—CH(CH₃)₂ | 3 | —SO₂—NH—CH₂—CH(CH₂CH₃)—CH₂—CH₂—CH₃ | 1 |
| 190 | Cu | —CO—NH—CH₂—CH(CH₂CH₃)—CH₂—CH₂CH₃ | 3 | —CO—NH—CH₂—CH₂—O—CH₂—CH₂—O—CH₃ | 1 |

The structure of the phthalocyanine compound represented by M-Pc(Xp$_1$)m (Xp$_2$)n in Tables 8 to 11 is as follows.

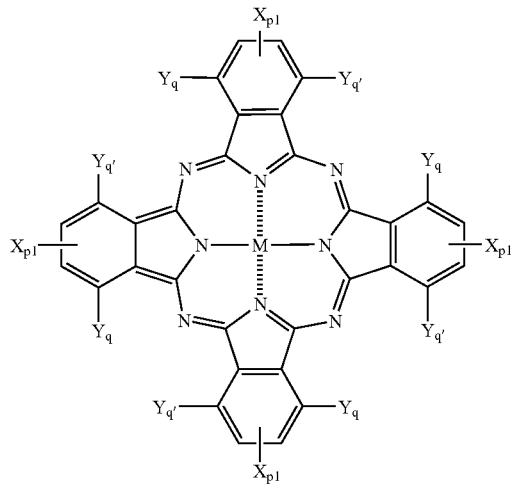

(X$_{p1}$'s each independently represent X$_{p1}$ or X$_{p2}$.)

The phthalocyanine dye represented by the formula (I) can be synthesized according to the patent cited above. The phthalocyanine dye represented by the formula (II) can be synthesized by the aforementioned method as well as the method disclosed in JP-A-2001-226275, JP-A-2001-96610, JP-A-2001-47013 and JP-A-2001-193638. The starting material, intermediate dye and synthesis route are not limited to those according to these methods.

The ink for ink jet recording of the present invention comprises the aforementioned phthalocyanine dye incorporation therein preferably in an amount of from 0.2 to 20% by weight, more preferably from 0.5 to 15% by weight.

The ink for ink jet recording of the present invention can be prepared by dissolving and/or dispersing the phthalocyanine dye in an aqueous medium. The term "aqueous medium" as used herein is meant to indicate water or a mixture of water and a water-miscible organic solvent optionally comprising additives such as wetting agent (preferably a surface active agent as dissolving aid or dispersing aid), stabilizer and preservative incorporated therein.

Examples of the water-miscible organic solvent employable herein include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycolmonoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylene diamine, diethylene triamine, triethylene tetramine, polyethyleneimine, tetramethylpropylenediamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of the water-miscible organic solvents may be used in combination.

The aforementioned phthalocyanine dye, if it is oil-soluble, may be emulsion-dispersed in an aqueous medium in the form of solution in a high boiling organic solvent to prepare the ink of the present invention.

The boiling point of the high boiling organic solvent to be used in the present invention is not lower than 150° C., preferably not lower than 170° C.

Examples of the high boiling organic solvent employable herein include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl)phthalate), phosphoric or phosphonic acid esters (e.g., diphenyl phosphate, triphenyl phosphate, tricresyl phosphate, 2-ethylhexyl diphenyl phosphate, dioctyl butyl phosphate, tricyclohexyl phosphate, tri-2-ethylhexyl phosphate, tridodecyl phosphate, di-2-ethylhexyl phenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecaneamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of from 10% to 80%), trimesic acid esters (e.g., tributyl trimesate), dodecyl benzene, diisopropylene naphthalene, phenols (e.g., 2,4-di-tert-amylphenol, 4-dodecyloxyphenol, 4-dodecyloxycarbonylphenol, 4-(4-dodecyloxy phenylsulfonyl)phenol), carboxylic acids (e.g., 2-(2,4-di-tert-amylphenoxybutyric acid, 2-ethoxyoctanedecanoic acid), and alkylphosphoric acids (e.g., di-2 (ethylhexyl) phosphoric acid, dipheylphosphoric acid).

The high boiling organic solvent may be used in an amount of from 0.01 to 3 times, preferably from 0.01 to 1.0 times that of the oil-soluble dye by weight.

These high boiling organic solvents may be used singly or in admixture of two or more thereof [e.g., tricresyl phosphate and dibutyl phthalate, trioctyl phosphate and di (2-ethylhexyl) sebacate, dibutyl phthalate and poly(N-t-butylacrylamide)].

For examples of compounds other than the aforementioned high boiling organic solvents to be used in the present invention and/or methods for the synthesis of these high boiling organic solvents, reference can be made to U.S. Pat. Nos. 2,322,027, 2,533,514, 2,772,163, 2,835,579, 3,594, 171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, European Patents 276, 319A, 286,253A, 289,820A, 309,158A, 309,159A, 309, 160A, 509,311A, 510,576A, East German Patents 147,009, 157,147, 159, 573, 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, and JP-A-4-346338.

In the present invention, the oil-soluble dye and the high boiling organic solvent are used in the form of emulsion dispersion in an aqueous medium. During emulsion dispersion, a low boiling organic solvent may be used in some cases from the standpoint of emulsifiability. As such a low boiling organic solvent there may be used an organic solvent having a boiling point of from about 30° C. to 150° C. at atmospheric pressure. Preferred examples of the organic solvent employable herein include esters (e.g., ethyl acetate, butyl acetate, ethyl propionate, β-ethoxyethyl acetate, methyl cellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone), and ethers (e.g., tetrahydrofurane, dioxane). However, the present invention is not limited to these organic solvents.

The emulsion dispersion is effected to disperse an oil phase having a dye dissolved in a high boiling organic solvent optionally mixed with a low boiling organic solvent in an aqueous phase mainly composed of water to make minute oil droplets of oil phase. During this procedure, additives such as surface active agent, wetting agent, dye stabilizer, emulsion stabilizer, preservative and antifungal agent described later may be added to either or both of the aqueous phase and the oil phase as necessary.

The emulsification is normally accomplished by adding the oil phase to the aqueous phase. Alternatively, a so-called emulsification method involving the dropwise addition of an aqueous phase to an oil phase is preferably used.

The emulsion dispersion may be effected with various surface active agents. Preferred examples of the surface active agents employable herein include anionic surface active agents such as aliphatic acid salt, alkylsulfuric acid ester, alkylbenzenesulfonate, alkylnaphthalenesulfonate, dialkylsulfosuccinate, alkylphosphoric acid esters, naphthalenesulfonic acid-formalin condensate and polyoxyethyleneakylsulfuric acid ester, and nonionic surface active agents such as polyoxyethylenealkyl ether, polyoxyethylenealkylallyl ether, polyoxyethylenealiphatic acid ester, sorbitanaliphatic acid ester, polyoxyethylenesorbitanaliphatic acid ester, polyoxyethylenealkylamine, glycerinaliphatic acid ester and oxyethyleneoxypropylene block copolymer. Alternatively, SURFYNOLS (produced by Air Products & Chemicals Inc.), which are acetylene-based polyoxyethylene oxide surface active agents, are preferably used as well. Further, amine oxide-based amphoteric surface active agents such as N,N-dimethyl-N-alkylamine oxide may be used. Those listed as surface active agents in JP-A-59-157, 636, pp. 37-38, and Research Disclosure No. 308119 (1989) may be used.

As the surface active agent to be used in emulsification there may be used the same kind of surface active agent as added to adjust the aforementioned liquid physical properties of the ink for ink jet recording, though differing in purpose. As a result, the surface active agent to be used for this purpose can perform a function of adjusting the physical properties of the ink.

For the purpose of stabilizing the ink shortly after emulsification, the aforementioned surface active agents may be used in combination with a water-soluble polymer. As such a water-soluble polymer there may be preferably used a polyvinyl alcohol, polyvinyl pyrrolidone, polyethylene oxide, polyacrylic acid, polyacrylamide or copolymer thereof. Further, natural water-soluble polymers such as polysaccharides, casein and gelatin may be preferably used.

For the purpose of stabilizing the dye dispersion, polyvinyls obtained by the polymerization of acrylic acid esters, methacrylic acid esters, vinyl esters, acrylamides, methacrylamides, olefins, styrenes, vinylethers or acrylonitriles, polyurethanes, polyesters, polyamides, polyureas, polycarbonates, etc., which are substantially insoluble in an aqueous medium, may be used. These polymers preferably have $-SO_3^-$ or $-COO^-$. In the case where these polymers substantially insoluble in an aqueous medium are used, they are preferably used in an amount of not greater than 20% by weight, preferably not greater than 10% by weight based on the amount of the high boiling organic solvent.

In the case where emulsion dispersion is effected to disperse the oil-soluble dye or high boiling organic solvent to make an aqueous ink, a particularly important factor is control over the particle size of the aqueous ink. In order to enhance the color purity or density during the formation of an image by ink ejection, it is essential to reduce the average particle size. The volume-average particle diameter of the aqueous ink is preferably not greater than 1 μm, more preferably from 5 nm to 100 nm.

The measurement of the volume-average particle diameter and the particle size distribution of the dispersed particles can be easily accomplished by any known method such as static light scattering method, dynamic light scattering method, centrifugal sedimentation method and method as disclosed in "Jikken Kagaku Koza (Institute of Experimental Chemistru)", 4th ed., pp. 417-418.

For example, measurement can be easily carried out by diluting the ink with distilled water such that the particle concentration in the ink reaches 0.1% to 1% by weight, and then subjecting the solution to measurement using a commercially available volume-average particle diameter measuring instrument (e.g., Microtrack UPA (produced by NIKKISO CO., LTD.). Further, dynamic light scattering method utilizing laser doppler effect is particularly preferred because it is capable of measuring even small particle size.

The term "volume-average particle diameter" as used herein is meant to indicate average particle diameter weighted with particle volume, which is obtained by dividing the sum of the product of the diameter and the volume of individual particles in the aggregate of particles by the total volume of the particles. For the details of volume-average particle diameter, reference can be made to Souichi Muroi, "Koubunshi Ratekkusuno Kagaku (Chemistry of Polymer Letexes)", Koubunshi Kankokai, page 119.

It was also made obvious that the presence of coarse particles has an extremely great effect on the printing properties. In other words, coarse particles clog the head nozzle. Even if coarse particles don't go so far as to clog the head nozzle, the ink cannot be ejected or can be deviated when ejected, giving a serious effect on the printing properties. In order to prevent this trouble, it is important to keep the number of particles having a diameter of not smaller than 5 μm and not smaller than 1 μm in the resulting ink to 10 or less and 1,000 or less, respectively.

The removal of these coarse particles can be accomplished by any known method such as centrifugal separation method and precision filtration method. The separation step may be effected shortly after emulsion dispersion or shortly before the filling of the emulsion dispersion comprising various additives such as wetting agent and surface active agent in the ink cartridge.

As an effective unit for reducing the average particle diameter of particles and eliminating coarse particles there may be used a mechanical emulsifier.

As such an emulsifier there may be used any known device such as simple stirrer, impeller type agitator, in-line agitator, mill type agitator (e.g., colloid mill) and ultrasonic agitator. The use of a high pressure homogenizer is particularly preferred.

For the details of the mechanism of high pressure homogenizer, reference can be made to U.S. Pat. No. 4,533,254, JP-A-6-47264, etc. Examples of commercially available high-pressure homogenizers include Gaulin homogenizer (produced by A. P. V GAULLN INC.), microfluidizer (produced by MICROFLUIDEX INC.) and altimizer (produced by SUGINO MACHINE LIMITED).

In recent years, a high pressure homogenizer having a mechanism for atomizing a material in a ultrahigh-pressure jet stream as disclosed in U.S. Pat. No. 5,720,551 is particularly useful in the emulsion dispersion of the present invention. An example of the emulsifier using a ultrahigh jet stream is De BEE2000 (produced by BEE INTERNATIONAL LTD.).

The pressure at which emulsion is carried out by a high pressure emulsion disperser is not lower than 50 MPa, preferably not lower than 60 MPa, more preferably not lower than 180 MPa.

For example, the combined use of two or more emulsifiers as in a method involving the emulsification by an agitated emulsifier followed by the passage through a high pressure homogenizer is particularly preferred. Alternatively, a method is preferably used which comprises effecting the emulsion of the material using such an emulsifier, adding additives such as wetting agent and surface active agent, and then passing the ink composition again through the high pressure homogenizer before being filled in the cartridge.

In the case where the dye composition comprises a low boiling organic solvent incorporated therein in addition to the high boiling organic solvent, it is preferred to remove the low boiling organic solvent from the standpoint of emulsion stability and safety/hygiene. The removal of the low boiling solvent can be accomplished by any known method such as evaporation method, vacuum evaporation method and ultrafiltration method depending on the solvent to be removed. The step of removing the low boiling organic solvent is preferably effected as rapidly as possible shortly after emulsification.

The ink of the present invention is characterized in that the conductivity thereof is from not lower than 0.1 S/m to not higher than 10 S/m. Preferred within this range of conductivity is from not lower than 0.5 S/m to not higher than 5 S/m. When the conductivity of the ink falls within the above defined range, the resulting ink exhibits excellent printing properties and fastness to heat, giving good results.

The measurement of conductivity can be accomplished by an electrode method using a commercially available saturated potassium chloride.

The conductivity of the ink can be controlled mainly by the concentration of ions in the aqueous solution. When the salt concentration (ion concentration) is high, desalting may be effected using an ultrafiltration membrane or the like. Alternatively, the conductivity of the ink can be adjusted by the addition of various organic salts or inorganic salts.

Examples of the aforementioned inorganic salt for adjusting the conductivity of the ink include inorganic compound salts such as potassium halide, sodium halide, sodium sulfate, potassium sulfate, sodium hydrogen sulfate, potassium hydrogen sulfate, sodium nitrate, sodium hydrogencarbonate, potassium hydrogencarbonate, sodium phosphate, dibasic sodium phosphate, sodium phosphate, potassium phosphate monobasic and sodium dihydrogenphosphate.

Examples of the organic salt include organic salts such as sodium acetate, potassium acetate, potassium tartrate, sodium tartrate, sodium benzoate, potassium benzoate, sodium p-toluenesulfonate, potassium saccharin, potassium phthalate and sodium picrate.

A surface active agent can be incorporated in the ink for ink jet recording of the present invention to adjust the liquid physical properties of the ink, making it possible to provide the ink with an enhanced ejection stability and hence excellent effects such as enhanced water resistance of image and prevention of running of ink printed.

Examples of the surface active agent employable herein include anionic surface active agents such as sodium dodecylsulfate, sodium dodecyloxysulfonate and sodium alkylbenzenesulfonate, cationic surface active agents such as cetyl pyridinium chloride, trimethyl cetyl ammonium chloride and tetrabutylammonium chloride, and nonionic surface active agents such as polyoxyethylene nonyl phenyl ether, polyoxyethylene naphthyl ether and polyoxy ethylene octyl phenyl ether. Particularly preferred among these surface active agents are nonionic surface active agents.

The content of the surface active agent is preferably from 0.001% to 15% by weight, more preferably from 0.005% to 10% by weight, even more preferably from 0.01% to 5% by weight based on the amount of the ink.

The ink for ink jet recording obtained in the present invention may comprise properly selected additives incorporated therein in a proper amount such as drying inhibitor for preventing the clogging of the ejection nozzle with dried ink, penetration accelerator for helping the ink to penetrate in the page, ultraviolet absorber, oxidation inhibitor, viscosity adjustor, surface tension adjustor, dispersant, dispersion stabilizer, antifungal agent, rust preventive, pH adjustor, anti-foaming agent and chelating agent.

As the drying inhibitor there is preferably used a water-soluble organic solvent having a lower vapor pressure than water. Specific examples of the water-soluble organic solvent include polyvalent alcohols such as ethylene glycol, propylene glycol, diethylene glycol, polyethylene glycol, thiodiglycol, dithiodigycol, 2-methyl-1,3-propanediol, 1,2,6-hexanetriol, acetylene glycol derivative, glycerin and trimethylolpropane, lower alkylethers of polyvalent alcohol such as ethylene glycol monomethyl (or ethyl) ether, diethylene glycol monomethyl (or ethyl) ether and triethylene glycol monoethyl(or butyl)ether, heterocyclic compounds such as 2-pyrrolidone, N-methyl-2-pyrrolidone, 1,3-dimethyl-2-imidazolidinone and N-ethylmorpholine, sulfur-containing compounds such as sulfolane, dimethylsulfoxide and 3-sulfolene, polyfunctional compounds such as diacetone alcohol and diethanolamine, and urea derivatives. Preferred among these water-soluble organic solvents are polyvalent alcohols such as glycerin and diethylene glycol. These drying inhibitors may be used singly or in combination of two or more thereof. These drying inhibitors are preferably incorporated in the ink in an amount of from 10% to 50% by weight.

Examples of the penetration accelerator employable in the present invention include alcohols such as ethanol, isopropanol, butanol, di(tri) ethylene glycol monobutyl ether and 1,2-hexanediol, sodium laurylsulfate, sodium oleate, and nonionic surface active agents. These penetration accelerators can exert a sufficient effect when incorporated in the ink in an amount of from 10% to 30% by weight. These penetration accelerators are preferably used in an amount such that no printing run or print through occurs.

Examples of the ultraviolet absorber to be used to enhance the preservability of the image in the present invention include benzotriazole-based compounds as disclosed in JP-A-58-185677, JP-A-61-190537, JP-A-2-782, JP-A-5-197075 and JP-A-9-34057, benzophenone-based compounds as disclosed in JP-A-46-2784, JP-A-5-194483 and U.S. Pat. No. 3,214,463, cinnamic acid-based compounds as disclosed in JP-B-48-30492, JP-A-56-21141 and JP-A-10-88106, triazine-based compounds as disclosed in JP-A-4-298503, JP-A-8-53427, JP-A-8-239368, JP-A-10-182621 and JP-T-8-50129, compounds as disclosed in Research Disclosure No. 24239, and compounds which absorb ultraviolet rays to emit fluorescence, i.e., so-called fluorescent brighteners, such as stilbene-based and benzoxazole-based compounds.

In the present invention, as the oxidation inhibitor to be used to enhance the image preservability there may be used any of various organic and metal complex-based discoloration inhibitors. Examples of the organic discoloration inhibitors include hydroquinones, alkoxyphenols, dialkoxyphenols, phenols, anilines, amines, indanes, chromans, alkoxyanilines, and heterocyclic compounds. Examples of the metal complex-based discoloration inhibitors include nickel complex, and zinc complex. Specific examples of these oxidation inhibitors include compounds listed in the patents cited in Research Disclosure No. 18716, Articles VI-I and J, Research Disclosure No. 15162, Research Disclosure No. 18716, left column, page 650, Research Disclosure No. 36544, page 527, Research Disclosure No. 307105, page 872, and Research Disclosure No. 15162, and compounds included in the formula and examples of representative compounds listed in JP-A-62-215272, pp. 127-137.

Examples of the antifungal agent to be incorporated in the present invention include sodium dehydroacetate, sodium benzoate, sodium pyridinethione-1-oxide, ethyl p-hydroxybenzoate, 1,2-benzoisothiazoline-3-one, and salts thereof. These antifungal agents are preferably incorporated in the ink in an amount of from 0.02% to 5.00% by weight.

For the details of these antifungal agents, reference can be made to "Bokin Bobizai Jiten (Dictionary of Anti-bacterial and Antifungal Agents)", compiled by Dictionary Compilation Committee of The Society for Antibacterial and Antifungal Agents, Japan.

Examples of the rust preventive employable herein include acidic sulfites, sodium thiosulfate, ammonium thioglycolate, diisopropylammonium nitrite, pentaerthyritol tetranitrate, dicyclohexylammonium nitrite, and benzotriazole. These rust preventives are preferably incorporated in the ink in an amount of from 0.02% to 5.00% by weight.

The ink for ink jet recording to be used in the present invention is characterized in that it has a static surface tension of from 25 to 50 mN/m, more preferably from 30 to 40 mN/m at 25° C. When the static surface tension of the ink exceeds 50 mN/m, the resulting ink exhibits a drastic deterioration in print quality such as ejection stability and resistance to running and whisker (e.g., when a black letter is printed on a cyan solid image, string-like running may extend from the black letter) during color mixing. On the contrary, when the static surface tension of the ink falls below 25 mN/m, the resulting ink can be attached to hard surface when ejected, causing defective printing.

Known examples of the static surface tension measuring method include capillary rise method, dropping method, and ring method. In the present invention, as the static surface tension measuring method there is used a perpendicular plate method. The principle of the perpendicular plate method will be described below.

When a thin glass or platinum plate is hanged partially dipped in a liquid, surface tension of the liquid acts downward along the length of the plate in contact with the liquid. The surface tension is measured by balancing this force by a upward force.

The dynamic surface tension of the ink to be used in the present invention is preferably from 25 to 50 mN/m, more preferably from 30 to 40 mN/m at 25° C. When the dynamic surface tension of the ink exceeds 50 mN/m, the resulting ink exhibits a drastic deterioration in print quality such as ejection stability and resistance to running and whisker during color mixing. On the contrary, when the dynamic surface tension of the ink falls below 25 mN/m, the resulting ink can be attached to hard surface when ejected, causing defective printing.

As the dynamic surface tension measuring methods there are known vibration jet method, meniscus dropping method and maximum bubble pressure method as disclosed in "Shinjikken Kagaku Koza (New Institute of Experimental Chemistry), 18th ed., Kaimen to Koroido (Interface and Colloid)", Maruzen, pp. 69-90 (1977). Further, a liquid film destruction method is known as disclosed in JP-A-3-2064. In the present invention, as the dynamic viscosity measuring method there is used a differential bubble pressure method. The principle and method of effecting this measuring method will be described hereinafter.

When bubbles are formed in a solution which has been stirred to uniformity, a new gas-liquid interface is produced. Surface active agent molecules in the solution then gather on the surface of water at a constant rate. The bubble rate (rate of formation of bubbles) is changed. As the formation rate decreases, more surface active agent components gather on the surface of bubbles, reducing the maximum bubble pressure shortly before the burst of bubbles. Thus, the maximum bubble pressure (surface tension) with respect to bubble rate can be detected. As a method for the measurement of dynamic surface tension there is preferably used a method which comprises forming bubbles in a solution using a large probe and a small probe, measuring the differential pressure of the two probes in the state of maximum bubble pressure, and then calculating the dynamic surface tension from the differential pressure.

The static surface tension and dynamic surface tension can be adjusted to the above defined range by using a surface tension adjustor.

As the surface tension adjustor there may be used a nonionic, cationic or anionic surface active agent. Examples of the anionic surface active agent include aliphatic acid salts, alkylsulfuric acid esters, alkylarylsulfonates (e.g., alkylbenzenesulfonate, petrosulfonate), dialkylsulfosuccinates, alkylphosphoric acid esters, naphthalenesulfonic acid-formalin condensates, and polyoxyethylenealkylsulfuric acid esters. Examples of the nonionic surface active agent include acetylene-based diols (e.g., 2,4,7,9-tetramethyl-5-decyne-4,7-diol), polyoxyethylenealkyl ethers (e.g., polyoxyethylene decyl ether, ethylene oxide adduct of acetylene-based diol), polyoxyethylenealiphatic acid esters, sorbitanaliphatic acid esters, polyoxyethylenesorbitanaliphatic acid esters, polyoxyethylenealkylamines, glycerinaliphatic acid esters, and oxyethyleneoxypropylene block copolymers.

Further, amine oxide-based amphoteric surface active agents such as N,N-dimethyl-N-alkylamine oxide may be used. Those listed as surface active agents in JP-A-59-157, 636, pp. 37-38, and Research Disclosure No. 308119 (1989) may be used.

An anionic surface active agent which has a two-chain hydrophobic moiety or a branched hydrophobic moiety, an anionic surface active agent having a hydrophilic group in the vicinity of center of hydrophobic moiety, a nonionic surface active agent which has a two-chain hydrophobic moiety or a branched hydrophobic moiety (e.g., one end ester-terminated polyoxide of 2-butyloctanoic acid, polyethylene oxide adduct of undecane-6-ol) or a nonionic surface active agent having a hydrophilic group in the vicinity of center of hydrophobic moiety (e.g., ethylene oxide adduct of acetylene-based diol (SURFYNOL Series (Air Products &Chemicals)) is preferred because they can be difficultly crystallized or separated and cause little foamation. Preferred among these surface active agents are those having a molecular weight of from not smaller than 200 to not greater than 1,000, more preferably from not smaller than 300 to not greater than 900, particularly from not smaller than 400 to not greater than 900.

Such a surface tension adjustor is used preferably in an amount of from 0.1 to 20% by weight, more preferably from 0.2 to 15% by weight based on the weight of the ink.

The ink for ink jet recording of the present invention preferably comprises a compound represented by the aforementioned formula (A) incorporated therein because the surface tension thereof can be controlled without raising the foamability thereof.

(A)

wherein $R^1$ and $R^2$ each independently represent a saturated hydrocarbon having from 2 to 20 carbon atoms (e.g., ethyl, n-butyl, i-butyl, n-hexyl, n-heptyl, n-octyl, n-nonyl, n-decyl, n-dodecyl, n-hexadecyl, n-octadecyl), preferably a saturated hydrocarbon having from 4 to 13 carbon atoms, more preferably a saturated hydrocarbon satisfying the requirement that the sum of the number of carbon atoms in $R^1$ and $R^2$ is from 8 to 18; and m represents an integer of from 2 to 40, preferably from 4 to 30, more preferably from 4 to 20.

The compound represented by the formula (A) can be obtained by the method described in Takehiko Fujimoto, "Shin Kaimen Kasseizai Nyumon (New Introduction to Surface Active Agents)", total edition, page 107, 1992, but it goes without saying that m in the formula (1) indicates an average value depending on the starting synthesis material and synthesis method. Two or more compounds (A) having different m values may be used. Alternatively, a mixture of these compounds may be used.

Specific examples of the compound represented by the formula (A) will be given, but the present invention is not limited thereto.

| Exemplary compound | $R^1$ | $R^2$ | m |
|---|---|---|---|
| 1 | $C_2H_5$ | $C_4H_9$ | 3 |
| 2 | $C_2H_5$ | $C_4H_9$ | 5 |

-continued

| Exemplary compound | $R^1$ | $R^2$ | m |
|---|---|---|---|
| 3 | $C_4H_9$ | $C_6H_{13}$ | 9.5 |
| 4 | $C_6H_{13}$ | $C_8H_{17}$ | 5 |
| 5 | $C_6H_{13}$ | $C_8H_{17}$ | 8 |
| 6 | $C_6H_{13}$ | $C_8H_{17}$ | 10 |
| 7 | $C_6H_{13}$ | $C_8H_{17}$ | 11.4 |
| 8 | $C_6H_{13}$ | $C_8H_{17}$ | 12.5 |
| 9 | $C_6H_{13}$ | $C_8H_{17}$ | 15 |
| 10 | $C_2H_5$ | $C_8H_{17}$ | 25 |
| 11 | $C_7H_{15}$ | $C_9H_{19}$ | 14 |
| 12 | $C_7H_{15}$ | $C_9H_{19}$ | 15 |
| 13 | $C_7H_{15}$ | $C_9H_{19}$ | 20 |
| 14 | $C_7H_{15}$ | $C_9H_{19}$ | 25 |
| 15 | $C_8H_{17}$ | $C_{10}H_{21}$ | 30 |
| 16 | $C_{10}H_{21}$ | $C_{12}H_{25}$ | 20 |
| 17 | $C_{10}H_{21}$ | $C_{12}H_{25}$ | 25 |
| 18 | $C_{10}H_{21}$ | $C_{13}H_{27}$ | 20 |
| 20 | $C_{10}H_{21}$ | $C_{13}H_{27}$ | 25 |
| 21 | $C_{10}H_{21}$ | $C_{13}H_{27}$ | 40 |

The compound represented by the formula (A) is incorporated in the ink preferably in an amount of from 0.1 to 20% by weight, more preferably from 0.2 to 15% by weight, even more preferably from 0.5 to 10% by weight.

The ink for ink jet recording of the present invention preferably comprises a compound represented by the aforementioned formula (B) incorporated therein.

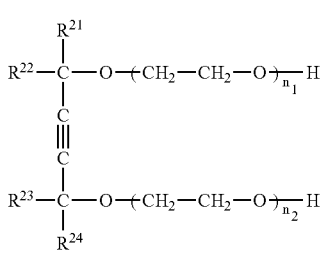

Formula (B)

wherein $R^{21}$, $R^{22}$, $R^{23}$ and $R^{24}$ each independently represent an alkyl group having from 1 to 6 carbon atoms; and $n_1$ and $n_2$ each represent a number satisfying the requirement that the sum of $n_1$ and $n_2$ is from 0 to 40.

The incorporation of the aforementioned compound makes it possible to control the surface tension without raising the formability of the ink, giving good results.

The content of the compound represented by the aforementioned formula (B) is preferably from 0.1 to 20% by weight, more preferably from 0.2 to 15% by weight based on the weight of the ink.

The ink of the present invention exhibits a viscosity of from 1 to 20 mPa·s, more preferably from 2 to 15 mPa·s, particularly from 2 to 10 mPa·s at 25° C. When the viscosity of the ink exceeds 30 mPa·s, the resulting recorded image can be fixed at a reduced rate. Further, the resulting ink exhibits a deteriorated ejectability. On the contrary, when the viscosity of the ink falls below 1 mPa·s, the resulting recorded image runs and thus exhibits a reduced quality.

For the details of the method for the measurement of viscosity of liquid, reference can be made to JIS Z8803. In practice, however, the viscosity of liquid can be simply measured using a commercially available viscometer. Examples of the rotary viscometer include Type B viscometer and Type E viscometer produced by Tokyo Keiki Kogyo K. K. In the present invention, a Type VM-100A-L vibration viscometer (produced by YAMAICHI ELECTRONICS CO., LTD.) was used to measure viscosity at 25° C. The unit of viscosity is Pa·s. In practice, however, mPa·s is used.

The adjustment of viscosity can be arbitrarily carried out by controlling the added amount of the ink solvent. Examples of the ink solvent employable herein include glycerin, diethylene glycol, triethanolamine, 2-pyrrolidone, diethylene glycol monobutyl ether, and triethylene glycol monobutyl ether.

The added amount of the ink solvent is preferably from 5 to 70% by weight, more preferably from 10 to 60% by weight based on the weight of the ink for ink jet recording. Two or more ink solvents may be used in combination.

Further, a viscosity adjustor may be used in the present invention. Examples of the viscosity adjustor employable herein include celluloses, water-soluble polymers such as polyvinylalcohol, and nonionic surface active agents. For the details of these viscosity adjustors, reference can be made to "Nendo Chousei Gijutsu (Technology for Preparation of Viscosity)", Gijutsu Joho Kyoukai, Article 9, 1999, and "Inku Jetto Purintayou Kemikaruzu (98 zouho)—Zairyou no Kaihatsu Doko/Tenbo Chousa (Chemicals for Ink Jet Printer (98 enlarged edition)—Research on Trend and View of Development of Materials)", CMC, pp. 162-174, 1997.

The ink of the present invention is characterized in that it shows viscosity change of not greater than 250% from at 25° C. to at 10° C. and a surface tension change of not greater than 130% from at 25° C. to at 10° C. When the viscosity change from at 25° C. to at 10° C. exceeds 250% or the surface tension change from at 25° C. to at 10° C. exceeds 130%, the resulting ink shows a drastically deteriorated ejection stability. In order to obtain stable ejection properties even in various atmospheres, it is very important that the change of physical properties of the ink is as small as possible. In particular, the viscosity and surface tension must be closely controlled.

The viscosity change from at 25° C. to at 10° C. is preferably not greater than 200%, more preferably not greater than 190%, and the surface tension change from at 25° C. to at 10° C. is preferably not greater than 125%, more preferably not greater than 120%.

In the present invention, for the calculation of the viscosity change from at 25° C. to at 10° C. and the surface tension change from at 25° C. to at 10° C., the following equations are used.

% Viscosity change from at 25° C. to at 10° C.= (Viscosity at 10° C./viscosity at 25° C.)×100 (%)

% Surface tension change from at 25° C. to at 10° C.=(Surface tension at 10° C./surface tension at 25° C.)×100 (%)

In the present invention, the change of viscosity or surface tension of the ink can be easily adjusted by adjusting the kind or amount of the water-miscible organic solvent and surface active agent to be incorporated. Alternatively, in order to adjust the change of viscosity or surface tension, the following viscosity adjustor or surface tension adjustor for adjusting viscosity or surface tension can be used.

For the details of the method for the measurement of viscosity of liquid, reference can be made to JIS Z8803. In practice, however, the viscosity of liquid can be simply measured using a commercially available viscometer. Examples of the rotary viscometer include Type B viscometer and Type E viscometer produced by Tokyo Keiki Kogyo K.K. In the present invention, a Type VM-100A-L vibration viscometer (produced by YAMAICHI ELECTRONICS CO., LTD.) was used to measure viscosity at 25° C. The unit of viscosity is Pa·s. In practice, however, mPa·s is used.

The ink of the present invention exhibits a viscosity of from 1 to 30 mPa·s, more preferably from 2 to 15 mPa·s, particularly from 2 to 10 mPa·s at 25° C. When the viscosity of the ink exceeds 30 mPa·s, the resulting recorded image can be fixed at a reduced rate. Further, the resulting ink exhibits a deteriorated ejectability. On the contrary, when the viscosity of the ink falls below 1 mPa·s, the resulting recorded image runs and thus exhibits a reduced quality.

The adjustment of viscosity can be arbitrarily carried out by controlling the added amount of the ink solvent. Examples of the ink solvent employable herein include glycerin, diethylene glycol, triethanolamine, 2-pyrrolidone, diethylene glycol monobutyl ether, and triethylene glycol monobutyl ether.

The added amount of the ink solvent for adjusting viscosity is preferably from 5 to 70% by weight, more preferably from 10 to 60% by weight based on the weight of the ink for ink jet recording. Two or more ink solvents may be used in combination.

Further, as other viscosity adjustors there may be used, e.g., celluloses, water-soluble polymers such as polyvinyl alcohol, and nonionic surface active agents. For the details of these viscosity adjustors, reference can be made to "Nendo Chousei Gijutsu (Technology for Preparation of Viscosity)", Gijutsu Joho Kyoukai, Article 9, 1999, and "Inku Jetto Purintayou Kemikaruzu (98 zouho)—Zairyou no Kaihatsu Doko/Tenbo Chousa (Chemicals for Ink Jet Printer (98 enlarged edition)—Research on Trend and View of Development of Materials)", CMC, pp. 162-174, 1997.

The ink of the present invention may comprise a pH adjustor incorporated therein. The pH value of the ink solution is preferably from 4 to 12, more preferably from 5 to 10, particularly from 6 to 9.

For the measurement of pH, a commercially available test paper may be used. Alternatively, the measurement of pH can be made by using an electrode method using saturated potassium chloride.

The adjustment of pH can be accomplished by the addition of a basic compound or acidic compound. In any case, both inorganic and organic compounds may be used.

Examples of the basic compounds employable herein include inorganic compounds such as sodium hydroxide, potassium hydroxide, sodium carbonate, potassium carbonate, sodium hydrogencarbonate, potassium hydrogencarbonate, sodium acetate, potassium acetate, sodium phosphate and sodium phosphate dibasic, and organic bases such as aqueous ammonia, methylamine, ethylamine, diethylamine, triethylamine, ethanolamine, diethanolamine, triethanolamine, ethylenediamine, piperidine, diazabicycloctane, diazabicycloudecene, pyridine, quinoline, picoline, lutidine and collidine.

Examples of the acidic compounds employable herein include inorganic compounds such as hydrochloric acid, sulfuric acid, phosphoric acid, boric acid, sodium hydrogensulfate, potassium hydrogensulfate, potassium dihydrogenphosphate and sodium dihydrogenphosphate, and organic compounds such as acetic acid, tartaric acid, benzoic acid, trifluoroacetic acid, methanesulfonic acid, ethanesulfonic acid, methanesulfonic acid, benzenesulfonic acid, p-toluenesulfonic acid, saccharinic acid, phthalic acid, picric acid and quinolinic acid.

In the present invention, as dispersant and dispersion stabilizer there may be used the aforementioned various cationic, anionic and nonionic surface active agents as necessary. As the anti-forming agent there may be used a fluorine-based or silicone-based compound or a chelating agent such as EDTA as necessary.

For the details of the method for the preparation of an aqueous ink for ink jet recording, reference can be made to JP-A-5-148436, JP-A-5-295312, JP-A-7-97541, JP-A-7-82515, JP-A-7-118584, Japanese Patent Application No. 2000-200780 and Japanese Patent Application No. 2000-249799. These methods can apply also to the preparation of the ink for ink jet recording of the present invention.

The process for the production of an ink for ink jet recording of the present invention comprises dissolving and/or dispersing at least one dye represented by the aforementioned formula (I) in a medium, characterized in that there is provided at least a step of applying ultrasonic vibration.

In the present invention, in order to prevent the ink from bubbling under pressure applied in the recording head, sound energy equal to or higher than the energy given in the recording head is applied at the step of producing ink to remove bubbles.

The ultrasonic vibration comprises an ultrasonic wave having a frequency of not smaller than 20 kHz, preferably not smaller than 40 kHz, more preferably 50 kHz. The energy which is applied to the solution by ultrasonic vibration is normally not smaller than $2 \times 10^7$ J/m$^3$, preferably not smaller than $5 \times 10^7$ J/m$^3$, more preferably not smaller than $1 \times 10^8$ J/m$^3$. The time during which ultrasonic vibration is given is normally from about 10 minutes to 1 hour.

The step of applying ultrasonic vibration may be effected at any time after the addition of dyes to the medium to exert desired effects. The desired effects can be exerted also when the ink thus completed is given ultrasonic vibration after storage. However, ultrasonic vibration is preferably applied during the dissolution and/or dispersion of dyes in the medium to exert a greater effect of removing bubbles and accelerate the dissolution and/or dispersion of the dyes in the medium.

In other words, the aforementioned step of applying at least ultrasonic vibration may be effected either during or after the step of dissolving and/or dispersing the dyes in the medium. In some detail, the step of applying at least ultrasonic vibration may be arbitrarily effected once or more times during the period between the preparation of the ink and the completion of the product.

In the present invention, the step of dissolving and/or dispersing the dyes in the medium preferably comprises a step of dissolving the dyes in a part of the medium and a step of mixing the solution with the remaining portion of the medium. More preferably, ultrasonic vibration is applied at at least one of the aforementioned steps. Even more preferably, at least ultrasonic vibration is applied at the step of dissolving the dyes in a part of the medium.

The aforementioned step of mixing the solution with the remaining portion of the medium may comprise a single step or a plurality of steps.

Further, heat deaeration or vacuum deaeration is preferably effected additionally in the ink production according to the present invention to enhance the effect of removing bubbles from the ink. The heat deaeration step or vacuum deaeration step is preferably effected at the same time with or after the step of mixing the solution with the remaining portion of the medium.

As a means of generating ultrasonic vibration at the step of applying ultrasonic vibration there may be used a known apparatus such as ultrasonic dispersing machine.

In the present invention, as the medium there is preferably used water or an aqueous medium which is a mixture of water and a water-miscible organic solvent.

In the process for the preparation of the ink of the present invention, it is important to effect a step of removing dust as solid content by filtration after the dissolution or dispersion of the phthalocyanine dye represented by the aforementioned formula (I) in the aqueous medium for the preparation of the ink. For this job, a filter is used. As such a filter there is used a filter having an effective pore diameter of not greater than 1 µm, preferably from not smaller than 0.05 µm to not greater than 0.3 µm, particularly from not smaller than 0.25 µm to not greater than 0.3 µm. As the filter material there may be used any of various known materials. In the case where a water-soluble dye ink is used, a filter prepared for aqueous solvent is preferably used. In particular, a filter made of a polymer material which can difficultly give dust is preferably used. Filtration may be accomplished by pumping the solution through the filter or may be effected under pressure or reduced pressure.

Filtration is often accompanied by the entrapment of air in the solution. Bubbles due to air thus entrapped can often cause disturbance in image in the ink jet recording. Thus, the deaeration step is preferably provided separately. Deaeration may be accomplished by allowing the solution thus filtered to stand or by the use of various methods such as ultrasonic deaeration and vacuum deaeration using a commercially available apparatus. The ultrasonic deaeration may be effected preferably for about 30 seconds to 2 hours, more preferably for about 5 minutes to 1 hour.

These jobs are preferably effected in a space such as clean room and clean bench to prevent the contamination by dust. In the present invention, these jobs are preferably effected in a space having a cleanness degree of not greater than 1,000 class. The term "cleanness degree" as used herein is meant to indicate the value measured by a dust counter.

The recording paper and recording film to be used in the ink jet recording method of the present invention will be described hereinafter. As the support in the recording paper or recording film there may be used one obtained by processing a chemical pulp such as LBKP and NBKP, a mechanical pulp such as GP, PGW, RMP, TMP, CTMP, CMP and CGP, used paper pulp such as DIP or the like, optionally mixed with known additives such as pigment, binder, sizing agent, fixing agent, cationic agent and paper strength improver, through various paper machines such as foundrinier paper machine and cylinder paper machine. As the support there may be used either a synthetic paper or plastic film sheet besides these support materials. The thickness of the support is preferably from 10 µm to 250 µm. The basis weight of the support is preferably from 10 to 250 g/m$^2$.

An image-receiving layer and a back coat layer may be provided on the support directly or with a size press or anchor coat layer of starch, polyvinyl alcohol or the like interposed therebetween to prepare an image-receiving material. The support may be further subjected to leveling using a calendering machine such as machine calender, TG calender and soft calender.

In the present invention, as the support there is preferably used a paper or plastic film laminated with a polyolefin (e.g., polyethylene, polystyrene, polybutene, copolymer thereof) or polyethylene terephthalate on both sides thereof. The polyolefin preferably comprises a white pigment (e.g., titanium oxide, zinc oxide) or a tinting dye (e.g., cobalt blue, ultramarine, neodymium oxide) incorporated therein.

The image-receiving layer to be provided on the support comprises a porous material or aqueous binder incorporated therein. The image-receiving layer also preferably comprises a pigment incorporated therein. As such a pigment there is preferably used a white pigment. Examples of the white pigment employable herein include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfate and zinc carbonate, and organic pigments such as styrene-based pigment, acrylic pigment, urea resin and melamine resin. Particularly preferred among these pigments are porous inorganic white pigments. In particular, synthetic amorphous silica having a large pore area, etc. are preferred. As the synthetic amorphous silica there may be also used anhydrous silicate obtained by dry method (gas phase method) or hydrous silicate obtained by wet method.

Specific examples of the recording paper comprising the aforementioned pigments incorporated in the image-receiving layer include those disclosed in JP-A-10-81064, JP-A-10-119423, JP-A-10-157277, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-2093, JP-A-174992, JP-A-11-192777, and JP-A-2001-301314.

Examples of the aqueous binder to be incorporated in the image-receiving layer include water-soluble polymers such as polyvinyl alcohol, silanol-modified polyvinyl alcohol, starch, cationated starch, casein, gelatin, carboxymethyl cellulose, hydroxyethyl cellulose, polyvinyl pyrrolidone, polyalkylene oxide and polyalkylene oxide derivative, and water-dispersible polymers such as styrene butadiene latex and acryl emulsion. These aqueous binders may be used singly or in combination of two or more thereof. In the present invention, particularly preferred among these aqueous binders are polyvinyl alcohol and silanol-modified polyvinyl alcohol from the standpoint of adhesion to pigment and exfoliation resistance of ink-receiving layer.

The ink-receiving layer may comprise a mordant, a waterproofing agent, a light-resistance improver, a gas resistance improver, a surface active agent, a film hardener and other additives incorporated therein besides the pigments and aqueous binders.

The mordant to be incorporated in the image-receiving layer is preferably passivated. To this end, a polymer mordant is preferably used.

For the details of the polymer mordant, reference can be made to JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548, 564, 3, 148,061, 3,309,690, 4,115,124, 4,124,386, 4,193,800, 4,273,853, 4,282,305 and 4,450,224. An image-receiving material containing a polymer mordant disclosed in JP-A-1-161236, pp. 212 to 215 is particularly preferred. The use of the polymer mordant disclosed in the above cited patent makes it possible to obtain an image having an excellent quality and hence improve the light-resistance of the image.

The waterproofing agent can be used to render the image waterproof. As such a waterproofing agent there is preferably used a cationic resin in particular. Examples of such a cationic resin include polyamide polyamine epichlorohydrin, polyethylenimine, polyamine sulfone, dimethyl diallyl ammonium chloride polymer, and cation polyacrylamide. The content of such a cationic resin is preferably from 1% to 15% by weight, particularly from 3% to 10% by weight based on the total solid content of the ink-receiving layer.

Examples of the light-resistance improver and gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinic acid compounds, saccharides, water-soluble reducing compounds, organic acids, inorganic acids, hydroxyl-containing organic acids, benzotriazole compounds, benzophenone compounds, triazine compounds, heterocyclic compounds, water-soluble metal salts, organic metal compounds, and metal complexes.

Specific examples of these compounds include those disclosed in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258, and JP-A-11-321090.

The surface active agent acts as a coating aid, releasability improver, slipperiness improver or antistat. For the details of the surface active agent, reference can be made to JP-A-62-173463 and JP-A-62-183457.

An organic fluoro-compounds may be used instead of the surface active agent. The organic fluoro-compound is preferably hydrophobic. Examples of the organic fluoro-compound include fluorine-based surface active agents, oil-based fluorine compounds (e.g., fluorine-based oil), and solid fluorine-based compound resins (e.g., tetrafluoroethylene resin). For the details of the organic fluoro-compound, reference can be made to JP-B-57-9053 (8th to 17th columns), JP-A-61-20994, and JP-A-62-135826.

As the film hardener there may be used any of materials disclosed in JP-A-1-161236, page 222, JP-A-9-263036, JP-A-10-119423, and JP-A-2001-310547.

Other examples of additives to be incorporated in the image-receiving layer include pigment dispersants, thickening agents, antifoaming agents, dyes, fluorescent brighteners, preservatives, pH adjustors, matting agents, and film hardeners. There may be provided one or two ink-receiving layers.

The recording paper and recording film may comprise a back coat layer provided thereon. Examples of the components which can be incorporated in the back coat layer include white pigments, aqueous binders, and other components.

Examples of the white pigments to be incorporated in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, hydrated halloysite, magnesium carbonate and magnesium hydroxide, and organic pigments such as styrene-based plastic pigment, acrylic plastic pigment, polyethylene, microcapsule, urea resin and melamine resin.

Examples of the aqueous binder to be incorporated in the back coat layer include water-soluble polymers such as styrene/maleate copolymer, styrene/acrylate copolymer, polyvinyl alcohol, silanol-modified polyvinyl alcohol, starch, cationated starch, casein, gelatin, carboxymethyl cellulose, hydroxyethyl cellulose and polyvinylpyrrolidone, and water-dispersible polymers such as styrenebutadiene latex and acryl emulsion. Examples of other components to be incorporated in the back coat layer include antifoaming agents, foaming inhibitors, dyes, fluorescent brightening agents, preservatives, and waterproofing agents.

The layers (including back layer) constituting the ink jet recording paper and film may comprise a fine dispersion of polymer incorporated therein. The fine dispersion of polymer is used for the purpose of improving physical properties of film, e.g., stabilizing dimension, inhibiting curling, adhesion and film cracking. For the details of the fine dispersion of polymer, reference can be made to JP-A-62-245258, JP-A-62-1316648, and JP-A-62-110066. The incorporation of a fine dispersion of polymer having a glass transition temperature as low as not higher than 40° C. in a layer containing a mordant makes it possible to prevent the cracking or curling of the layer. The incorporation of a fine dispersion of polymer having a high glass transition temperature, too, in the back layer makes it possible to prevent the curling of the back layer.

In the present invention, the ink jet recording method is not limited. The ink of the present invention may be used in any known recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink.

EXAMPLE

The present invention will be further described in the following examples, but the present invention is not limited thereto.

Examples of viscosity:

Examples 1 to 3

Example 1

To the following components was added deionized water to make 1 l. The mixture was then heated to a temperature of from 30° C. to 40° C. with stirring for 1 hour. Thereafter, the solution was adjusted to pH 9 with a 10 mol/l KOH, closely adjusted to a viscosity of 6 mPa·sec with glycerin and water, and then filtered through a microfilter having an average pore diameter of 0.25 μm under reduced pressure to prepare a light cyan ink solution.

| | |
|---|---|
| Cyan dye of the present invention (Exemplary Compound 154) | 17.5 g/l |
| Diethylene glycol | 164 g/l |
| Glycerin | 123 g/l |
| Triethylene glycol monobutyl ether | 119 g/l |
| Triethanolamine | 6.5 g/l |
| Benzotriazole | 0.07 g/l |
| PROXEL XL2 | 3.5 g/l |
| Surface active agent (w-1) | 10 g/l |

Further, cyan, light magenta, magenta, yellow and black inks were prepared in the same manner as used in the light cyan ink except that the dye additive was changed and the viscosity of the inks were uniformly adjusted to 6 mPa·sec by close adjustment of the amount of glycerin and water. The ink set 101 shown in Table 1 was thus prepared.

TABLE 1

| | Light cyan | Cyan | Light magenta | Magenta | Yellow | Black |
|---|---|---|---|---|---|---|
| Dye (g/l) | 154 | 154 | A-1 | A-1 | A-4 | A-5 |
| | 17.5 | 68.0 | 10.2 | 30.8 | 28.0 | 20.0 |
| | | | | | | A-6 |
| | | | | | | 39.0 |
| | | | | | | A-7 |
| | | | | | | 17.0 |
| | | | | | | A-3 |
| | | | | | | 20.0 |
| Diethylene gyclol (g/l) | 164 | 107 | 150 | 110 | 160 | 20 |
| Urea (g/l) | — | — | 37 | 46 | — | — |
| Glycerin (g/l) | 123 | 110 | 130 | 160 | 150 | 120 |
| Triethylene glycol monobutyl ether (g/l) | 119 | 127 | 130 | 140 | 130 | — |
| Diethylene glycol monobutyl ether (g/l) | — | — | — | — | — | 230 |
| 2-Pyrrolidone (g/l) | — | 20 | 40 | — | — | 80 |
| Surface active agent (g/l) | 10 | 10 | 6 | 12 | 3 | 5 |
| Triethanolamine (g/l) | 6.5 | 10 | 7 | 7 | 1 | 18 |

TABLE 1-continued
|  | Light cyan | Cyan | Light magenta | Magenta | Yellow | Black |
|---|---|---|---|---|---|---|
| Benzotriazole (g/l) | 0.07 | 0.09 | 0.07 | 0.08 | 0.06 | 0.08 |
| Proxel XL2 (g/l) | 1.0 | 4.0 | 5.0 | 4.5 | 3 | 4 |
| Deionized water added to make 1 l | | | | | | |
A-1
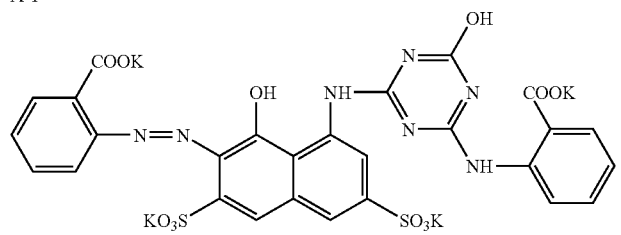
A-2
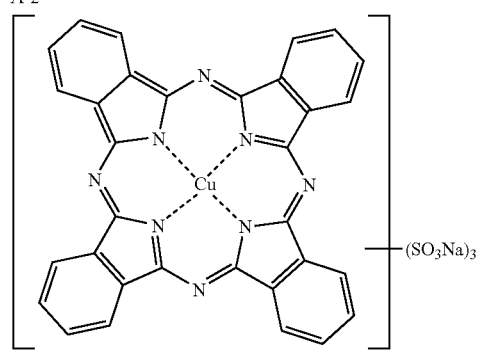
A-3
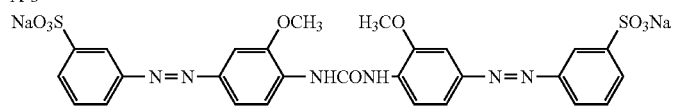
A-4
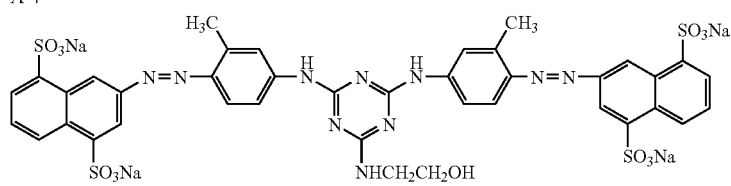
A-5
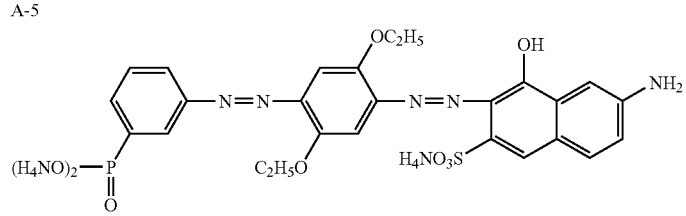
A-6
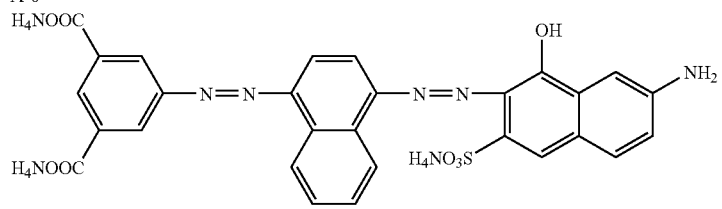

TABLE 1-continued

| | Light cyan | Cyan | Light magenta | Magenta | Yellow | Black |
|---|---|---|---|---|---|---|
| A-7 | | | | | | |

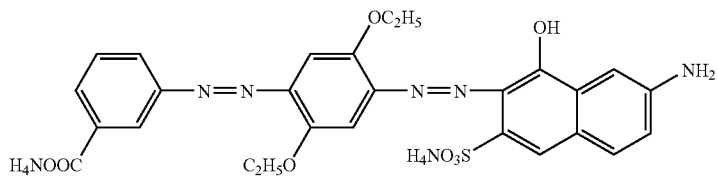

As a surface active agent there was used W-1 as shown below.

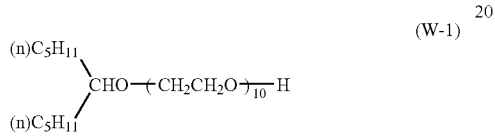

Ink sets 102 to 109 were then prepared in the same manner as in the ink set 101 except that the kind of dyes incorporated in the light cyan and cyan inks were changed and the viscosity of these inks were changed as set forth in Table 2 with glycerin and water. The light magenta, magenta, yellow and black inks incorporated in the ink sets 102 to 109 comprised the same kind of dyes as in the ink set 101 and had the same viscosity as in the ink set 101.

TABLE 2

| Ink set | | Light cyan | Cyan | Remarks |
|---|---|---|---|---|
| 101 | Dye | 154 | 154 | Inventive |
| | Viscosity | 6 mPa · sec | 6 mPa · sec | |
| 102 | Dye | 154 | 154 | Inventive |
| | Viscosity | 6 mPa · sec | 6 mPa · sec | |
| 103 | Dye | 154 | 154 | Inventive |
| | Viscosity | 4 mPa · sec | 6 mPa · sec | |
| 104 | Dye | 154 | 154 | Inventive |
| | Viscosity | 10 mPa · sec | 6 mPa · sec | |
| 105 | Dye | 154 | 154 | Inventive |
| | Viscosity | 5 mPa · sec | 10 mPa · sec | |
| 106 | Dye | 154 | 154 | Comparative |
| | Viscosity | 30 mPa · sec | 4 mPa · sec | |
| 107 | Dye | 154 | 154 | Comparative |
| | Viscosity | 30 mPa · sec | 30 mPa · sec | |
| 108 | Dye | 154 | 154 | Comparative |
| | Viscosity | 0.8 mPa · sec | 0.8 mPa · sec | |
| 109 | Dye | A-2 | A-2 | Comparative |
| | Viscosity | 6 mPa · sec | 6 mPa · sec | |

Subsequently, the foregoing ink sets 101 to 109 were each packed in the cartridge of a Type PM800C ink jet printer (produced by EPSON CO., LTD.) by which an image was then printed on a Type EX ink jet photographic gloss paper (produced by Fuji Photo Film Co., Ltd.) to evaluate the following properties.

For the evaluation of "printing property (1)", the cartridge was mounted on the printer. The ejection of ink from all the nozzles was then confirmed. Printing was then made on 20 sheets of A4 size paper. The print was then evaluated for disturbance.

A: No print disturbance during the period between the beginning and the end of printing;

B: Occurrence of output with print disturbance;

C: Print disturbance during the period between the beginning and the end of printing.

For the evaluation of "printing properties (2)", the cartridge was allowed to stand at 60° C. for 2 days. The print was then evaluated for disturbance in the same manner as in "printing properties (1)".

For the evaluation of "dryability", the print was immediately touched with a finger which was then visually observed for stain.

Referring to running of fine line, fine line patterns were printed with yellow, magenta, cyan and black inks, respectively. These fine line patterns were each then visually evaluated for "running of fine line (1)". For the evaluation of black ink, a fine line was printed with a black ink on a solid print of magenta ink. "Running of fine line (2)" due to contact of two color inks was evaluated as well.

For the evaluation of "water resistance", the image thus obtained was dipped in deionized water for 10 seconds, and then evaluated for running.

For the evaluation of image preservability, a solid cyan image print sample was prepared. The sample was then evaluated as follows.

For the evaluation of "light-fastness", the print which had been made was immediately measured for image density $C_i$ by means of a reflection densitometer (X-Rite 310TR), irradiated with light from a xenon lamp (85,000 lux) using a weatherometer produced by Atlas Electric Devices, Inc. for 7 days, and then again measured for image density $C_f$ to determine the dye remaining ratio ($C_f/C_i \times 100$). The dye remaining ratio was measured at three points of reflection density (1, 1.5, 2). Those showing a dye remaining ratio of not smaller than 85% at any of the three density points were defined as A, those showing a dye remaining ratio of smaller than 85% at two of the three points were defined as B, and those showing a dye remaining ratio of smaller than 85% at all the three density points were defined as C.

For the evaluation of heat fastness, the sample was stored under conditions of from 80° C. and 70% RH for 7 days. The sample was measured for density using a reflection densitometer (Type X-rite 310TR) before and after storage to determine the dye remaining ratio which was then evaluated. The dye remaining ratio was then evaluated at three reflection density points, i.e., 1, 1.5 and 2. Those showing a dye remaining ratio of not smaller than 90% at any of the three density points were defined as A. Those showing a dye remaining ratio of less than 90% at two of the three density points were defined as B. Those showing a dye remaining ratio of less than 90% at all the density points were defined as C.

For the evaluation of "ozone resistance", the sample was stored under 80° C. heated conditions open to the atmosphere for 7 days. The sample was measured for density using a reflection densitometer (Type X-rite 310TR) before and after storage to determine the dye remaining ratio which was then evaluated. The dye remaining ratio was then evaluated at three reflection density points, i.e., 1, 1.5 and 2. Those showing a dye remaining ratio of not smaller than 90% at any of the three density points were defined as A. Those showing a dye remaining ratio of less than 90% at two of the three density points were defined as B. Those showing a dye remaining ratio of less than 90% at all the density points were defined as C.

The results thus obtained are set forth in Tables 3 and 4.

TABLE 3

| Ink set | Printing properties 1 | Printing properties 2 | Dryability | Running of fine line 1 | Running of fine line 2 | Water resistance |
| --- | --- | --- | --- | --- | --- | --- |
| 101 | A | A | G (good) | G | G | G |
| 102 | A | A | G | G | G | G |
| 103 | A | A | G | G | G | G |
| 104 | A | A | G | G | G | G |
| 105 | A | A | G | G | G | G |
| 106 | B | A | G | G | G | G |
| 107 | C | A | P (poor) | G | G | F |
| 108 | C | C | G | P | F (fair) | G |
| 109 | A | B | G | G | G | G |

TABLE 4

| Ink set | Light-fastness | Heat fastness | Gas resistance | Remarks |
| --- | --- | --- | --- | --- |
| 101 | A | A | A | Inventive |
| 102 | A | A | A | Inventive |
| 103 | A | A | A | Inventive |
| 104 | A | A | A | Inventive |
| 105 | A | A | A | Inventive |
| 106 | A | A | A | Comparative |
| 107 | A | A | A | Comparative |
| 108 | A | A | A | Comparative |
| 109 | B | B | C | Comparative |

It is made obvious that when the inks of the present invention are used, an excellent ejection stability can be obtained because they are excellent in printing properties (1) and (2). It is made obvious that the inks of the present invention are excellent also in water resistance, light-fastness and heat fastness. Further, the inks of the present invention show good running of a fine line with no bleeding.

Even when the image-receiving paper to be used in the present invention is changed to PM photographic gloss paper produced by EPSON CO., LTD. or PR101, produced by Canon Inc., effects similar to the aforementioned results can be exerted.

Example 2

The inks prepared in Example 1 were each packed in the cartridge of a Type BJ-F850 ink jet printer (produced by Canon Inc.) by which an image was then printed on a Type EX ink jet photographic gloss paper (produced by Fuji Photo Film Co., Ltd.) to effect evaluation in the same manner as in Example 1. Results similar to that of Example 1 were obtained. Even when the image-receiving paper was changed to PM photographic gloss paper produced by EPSON CO., LTD. or PR101, produced by Canon Inc., effects similar to the aforementioned results were exerted.

Example 3

7 g of a dye (Exemplary Compound 189) and 4 g of sodium dioctylsulfosuccinate were dissolved in a mixture of 6 g of a high boiling solvent (s-1), 10 g of a high boiling organic solvent (s-2) and 50 ml of ethyl acetate at 70° C. To the solution was then added 500 ml of deionized water with stirring by a magnetic stirrer to prepare an oil-in-water type coarse dispersion.

Subsequently, the coarse dispersion was passed through a microfluidizer (MICROFLUIDX INC.) at a pressure of 60 MPa five times to undergo atomization. The emulsion thus prepared was then subjected to desolvation using a rotary evaporator until it was free of odor of ethyl acetate.

To the fine emulsion of oil-soluble dye thus obtained were then added 140 g of diethylene glycol, 64 g of glycerin, 13 g of a surface active agent (w-1), and additives such as urea. To the mixture was then added 900 ml of deionized water. The solution was then adjusted to pH9 with a 10 mol/l KOH. The viscosity of the solution was then adjusted by adjusting the amount of glycerin and water to prepare a light cyan ink according to Table 16. The emulsion-dispersed ink thus obtained was then measured for volume-average particle size using a Type UPA microtrack (NIKKISO CO., LTD.). The result was 58 nm.

Further, magenta, light magenta, cyan, yellow and black inks of the ink set 201 set forth in Table 5 were prepared in the same manner as described above except that the kind of dyes and high boiling organic solvents to be used were changed.

TABLE 5
|  | Light cyan | Cyan | Light magenta | Magenta | Yellow | Black |
|---|---|---|---|---|---|---|
| Dye (g/l) | 189 | 189 | M-1 | M-1 | Y-3 | C-2 |
|  | 7.0 | 35.0 | 5.0 | 20.0 | 28.0 | 19.0 |
|  |  |  |  |  |  | M-1 |
|  |  |  |  |  |  | 10.0 |
|  |  |  |  |  |  | Y-3 |
|  |  |  |  |  |  | 14.0 |
| High boiling organic solvent (g/l) | S-1 6.0 | 25.0 | 4.0 | 14.0 | 20.0 | 30.0 |
|  | S-2 10.0 | 45.0 | 6.0 | 25.0 | 35.0 | 53.0 |
| Sodium dioctylsulfo-succinate (g/l) | 4.0 | 30.0 | 6.2 | 23.0 | 35.0 | 52.0 |
| Diethylene gyclol (g/l) | 140 | 140 | 130 | 140 | 130 | 120 |
| Urea (g/l) | 46.0 | 46.0 | 46.0 | 46.0 | 46.0 | 46.0 |
| Glycerin (g/l) | 64.0 | 64.0 | 64.0 | 64.0 | 64.0 | 64.0 |
| Triethanol-amine (g/l) | 10 | 10 | 10 | 10 | 10 | 10 |
| Benzotriazole (g/l) | 0.08 | 0.08 | 0.08 | 0.08 | 0.08 | 0.08 |
| Surface active agent W-1 (g/l) | 13 | 13 | 13 | 13 | 13 | 13 |
| Proxel XL2 (g/l) Deionized water added to make 1 l | 3.5 | 3.5 | 3.5 | 3.5 | 3.5 | 3.5 |
| Volume average particle size | 58 nm | 65 nm | 50 nm | 55 nm | 60 nm | 70 nm |
M-1
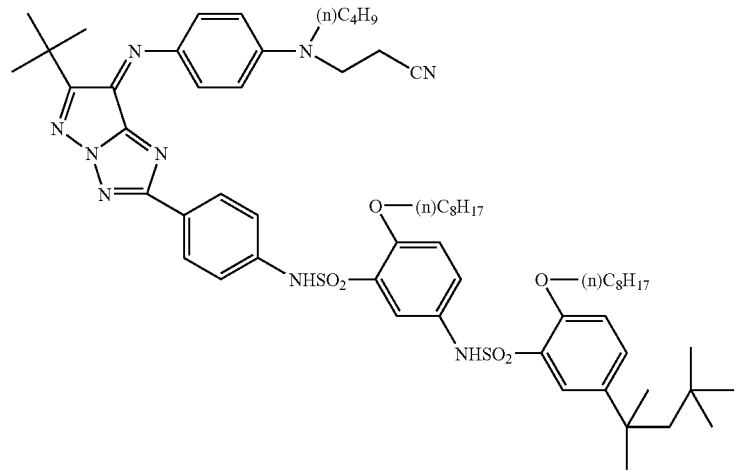
C-2
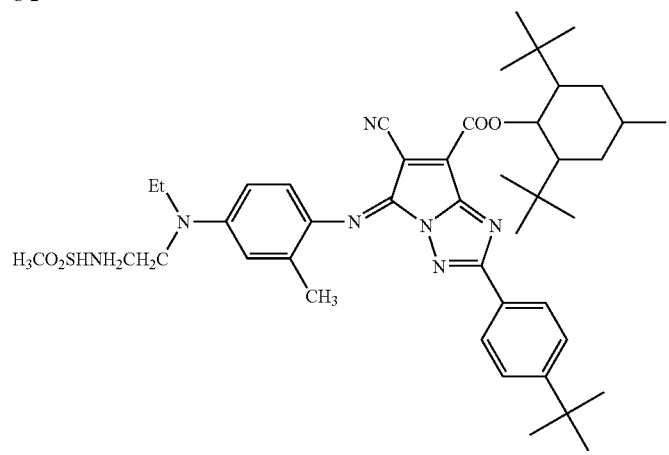

TABLE 5-continued

| | Light cyan | Cyan | Light magenta | Magenta | Yellow | Black |
|---|---|---|---|---|---|---|

Y-3

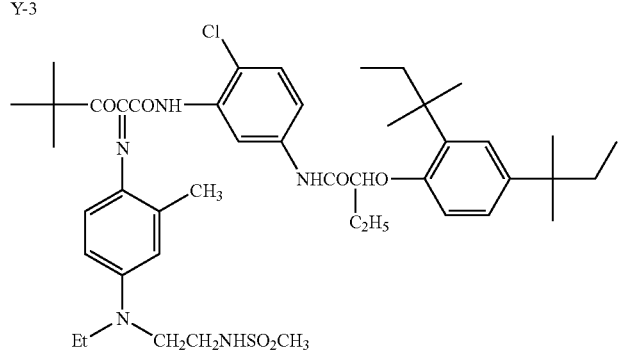

S-1

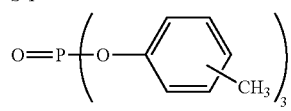

S-2

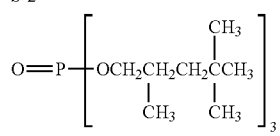

Ink sets 202 to 208 were similarly prepared according to Table 17 without changing the formulation of magenta, light magenta, yellow and black inks.

The added amount of the compound of the present invention was 2.0% by weight each for the various inks.

A comparative ink set 209 was then prepared in the same manner as the ink set 201 except that the kind of dye was changed to C-2. Subsequently, these ink sets 201 to 209 were each packed in the cartridge of a Type PM770C ink jet printer (produced by EPSON CO., LTD.) by which an image was then printed on a Type EX ink jet photographic gloss paper (produced by Fuji Photo Film Co., Ltd.) to effect evaluation in the same manner as in Example 1. The results thus obtained are set forth in Table 6.

It is made obvious that the inks of the present invention have an excellent ejection stability and good weathering resistance (light-fastness and heat fastness, ozone resistance) and water resistance and thus can provide a recorded image free of running from fine line.

Example of conductivity:

Example 4

To the following components was added deionized water to make 1 l. The mixture was then heated to a temperature of from 30° C. to 40° C. with stirring for 1 hour. Thereafter, the solution was adjusted to pH 7.6 with potassium hydrox-

TABLE 6

| Ink set | Dye | Viscosity mPa · sec | Ejection stability | Light-fastness | Gas resistance | Water resistance | Running of fine line (1) | Running of fine line (2) | Remarks |
|---|---|---|---|---|---|---|---|---|---|
| 201 | 189 | 5 | A | A | A | A | G (good) | G | Inventive |
| 202 | 189 | 3 | A | A | A | A | G | G | Inventive |
| 203 | 189 | 10 | A | A | A | A | G | G | Inventive |
| 204 | 182 | 4 | A | A | A | A | G | G | Inventive |
| 205 | 180 | 4 | A | A | A | A | G | G | Inventive |
| 206 | 187 | 5 | A | A | A | A | G | G | Inventive |
| 207 | 189 | 30 | B | A | A | A | G | G | Comparative |
| 208 | 189 | 0.8 | C | A | A | A | P (poor) | F (fair) | Comparative |
| 209 | C-2 | 5 | A | A | B | A | G | G | Comparative | ide, and then filtered through a microfilter having an average pore diameter of 0.25 μm under reduced pressure to prepare a light cyan ink solution.

(Components of Light Cyan Ink)

| | |
|---|---|
| Cyan dye of the present invention (Exemplary Compound 154) | 17.5 g/l |
| Diethylene glycol | 150 g/l |
| Urea | 37 g/l |
| Glycerin | 130 g/l |
| Triethylene glycol monobutyl ether | 130 g/l |
| Triethanolamine | 6.9 g/l |
| Benzotriazole | 0.08 g/l |
| PROXEL KL2 | 3.5 g/l |
| Surfynol STG | 10 g/l |

Further, to the aforementioned formulation was added 68 g of the cyan dye (Exemplary Compound 154) to prepare a cyan ink solution. Inks (Ink Nos. 101 to 106) were prepared by adjusting the conductivity of the cyan and light cyan inks by the change of the amount of solvents (glycerin, triethylene glycol monobutyl ether, diethylene glycol) and the use of lithium chloride. Further, inks (Ink Nos. 107 to 109) were prepared by adjusting the conductivity of cyan and light cyan inks of PM-950C produced by EPOSON CO., LTD. The conductivity of these inks are set forth in Table 7.

TABLE 7

| Ink No. | Conductivity of light cyan ink (S/m) | Conductivity of cyan ink (S/m) |
|---|---|---|
| 101 (comparative) | 0.009 | 0.009 |
| 102 (inventive) | 0.027 | 0.026 |
| 103 (inventive) | 0.452 | 0.542 |
| 104 (inventive) | 0.886 | 0.941 |
| 105 (inventive) | 1.23 | 1.11 |
| 106 (comparative) | 11.6 | 12.3 |
| 107 (comparative) | 0.319 | 0.432 |
| 108 (comparative) | 0.852 | 0.839 |
| 109 (comparative) | 1.01 | 1.33 |
| 110 (comparative) | 12.5 | 11.9 |

Subsequently, these Ink Nos. 101 to 110 were each packed in the cyan/light cyan portion of the cartridge of a Type PM770C ink jet printer (produced by EPSON CO., LTD.) by which an image was then printed on a Type EX ink jet photographic gloss paper (produced by Fuji Photo Film Co., Ltd.) to evaluate ejection stability and image preservability.

For ejection stability, the following printing properties (1) and (2) were evaluated.
1) For the evaluation of printing properties (1), the cartridge was mounted on the printer. The ejection of ink from all the nozzles was then confirmed. Printing was then made on 20 sheets of A4 size paper. The print was then evaluated for disturbance.
   A: No print disturbance during the period between the beginning and the end of printing;
   B: Occurrence of output with print disturbance;
   C: Print disturbance during the period between the beginning and the end of printing.
2) For the evaluation of printing properties (2), the cartridge was allowed to stand at 60° C. for 2 days. The print was then evaluated for disturbance in the same manner as in "printing properties (1)".

For the evaluation of image preservability, a solid cyan image print sample was prepared. The sample was then evaluated as follows.

(1) Light-Fastness:

For the evaluation of light-fastness, the print which had been made was immediately measured for image density Ci by means of X-Rite 310, irradiated with light from a xenon lamp (85,000 lux) using a weatherometer produced by Atlas Electric Devices, Inc. for 10 days, and then again measured for image density Cf to determine the dye remaining ratio [Cf/Ci]×100. The dye remaining ratio was measured at three points of reflection density (1, 1.5, 2). Those showing a dye remaining ratio of not smaller than 70% at any of the three density points were defined as A, those showing a dye remaining ratio of smaller than 70% at two of the three points were defined as B, and those showing a dye remaining ratio of smaller than 70% at all the three density points were defined as C.

(2) Heat Fastness:

For the evaluation of heat fastness, the sample was stored under conditions of 80° C. and 70% RH for 10 days. The sample was measured for density using X-rite 310 before and after storage to determine the dye remaining ratio which was then evaluated. The dye remaining ratio was then evaluated at three reflection density points, i.e., 1, 1.5 and 2. Those showing a dye remaining ratio of not smaller than 90% at any of the three density points were defined as A. Those showing a dye remaining ratio of less than 90% at two of the three density points were defined as B. Those showing a dye remaining ratio of less than 90% at all the density points were defined as C. Those showing recognized discoloration were defined as D.

(3) Ozone Resistance:

For the evaluation of ozone resistance, the aforementioned photographic gloss paper on which an image had been formed was allowed to stand in a box the ozone gas concentration of which had been adjusted to 0.5 ppm for 7 days. The photographic gloss paper was measured for image density using a reflection densitometer (X-Rite 310TR) before and after aging to determine the dye remaining ratio which was then evaluated. The reflection density was measured at three density points, i.e., 1, 1.5 and 2.0. The ozone gas concentration in the box was adjusted by the use of an ozone gas monitor (OZG-EM-01) produced by APPLICS CO., LTD.

The measurements were then evaluated according to the following three-step criterion. Those showing a dye remaining ratio of not smaller than 80% at any density were ranked A. Those showing a dye remaining ratio of less than 80% at one or two density points were ranked B. Those showing a dye remaining ratio of less than 70% at all density points were ranked C.

The results thus obtained are set forth in Table 8.

TABLE 8

| Ink No. | Printing properties (1) | Printing properties (2) | Light-fastness | Heat fastness | Ozone fastness |
|---|---|---|---|---|---|
| 101 (Comparative) | B | B | A | D | A |
| 102 (Inventive) | A | A | A | A | A |
| 103 (Inventive) | A | A | A | A | A |
| 104 (Inventive) | A | A | A | A | A |
| 105 (Inventive) | A | A | A | A | A |

TABLE 8-continued

| Ink No. | Printing properties (1) | Printing properties (2) | Light-fastness | Heat fastness | Ozone fastness |
|---|---|---|---|---|---|
| 106 (Comparative) | B | B | A | D | A |
| 107 (Comparative) | A | A | A | A | C |
| 108 (Comparative) | A | A | A | A | C |
| 109 (Comparative) | A | A | A | A | C |
| 110 (Comparative) | B | B | A | A | C |

From the results set forth in Table 8, the following facts were made obvious.

The inks of the present invention have a good ejection stability and are excellent all in weathering resistance (light-fastness, heat fastness, and ozone fastness), and their conductivity have a remarkable effect, particularly on heat fastness.

Example of viscosity change and surface tension change: Examples 5-6

Example 5

(Preparation of Ink Solution)

To the following components was added deionized water to make 1 l. The mixture was then heated to a temperature of from 30° C. to 40° C. with stirring for 1 hour. Thereafter, the solution was filtered through a microfilter having an average pore diameter of 0.25 µm under reduced pressure to prepare a light cyan ink solution.

(Components of Light Cyan Ink Solution)

| | |
|---|---|
| Cyan dye of the present invention [Compound No. 154] | 17.5 g |
| Diethylene glycol | 167 g |
| Glycerin | 164 g |
| Triethylene glycol monobutyl ether | 125 g |
| Triethanolamine | 6.5 g |
| Benzotriazole | 0.07 g |
| PROXEL XL2 [Zeneca Group Plc.] | 3.5 g |
| Surface active agent (w-1) | 10 g |

Cyan, magenta, light magenta, cyan, yellow, dark yellow and black inks were prepared in the same manner as used in the light cyan ink except that the kind of dyes and the additives were changed. The ink set 101 shown in Table 9 was thus prepared.

The viscosity of the ink was measured by means of a Type VM-100A-L vibration viscometer (produced by YAMAICHI ELECTRONICS CO., LTD.). Further, the static surface tension of the ink was measured by means of a Type CBVP-A3 automatic surface tensiometer (produced by Kyowa Interface Science Co., LTD.). These measurements were then processed according to the aforementioned equations to calculate the change of viscosity and surface tension from at 25° C. to at 10° C.

The temperature dependence of viscosity and surface tension of cyan and light cyan inks of the ink set 101 are shown in FIGS. 1 and 2.

TABLE 9

| | Light cyan | Cyan | Light magenta | Magenta | Yellow | Dark yellow | Black |
|---|---|---|---|---|---|---|---|
| Dye (g/l) | 154 | 154 | A-1 | A-1 | A-3 | A-3 | A-5 |
| | 17.5 | 68.0 | 10.2 | 30.8 | 14.0 | 10.0 | 20.0 |
| | | | | | A-4 | A-4 | A-6 |
| | | | | | 14.0 | 10.0 | 39.0 |
| | | | | | | A-2 | A-7 |
| | | | | | | 13.0 | 17.0 |
| | | | | | | | A-3 |
| | | | | | | | 20.0 |
| Diethylene glycol (g/l) | 167 | 110 | 47 | 76 | 85 | — | 20 |
| Urea (g/l) | — | — | 37 | 46 | — | — | — |
| Glycerin (g/l) | 164 | 148 | 198 | 150 | 154 | 147 | 120 |
| Triethylene glycol monobutyl ether (g/l) | 125 | 132 | 105 | 107 | 130 | 127 | — |
| Diethylene glycol monobutyl ether (g/l) | — | — | — | — | — | — | 230 |
| 2-Pyrrolidone (g/l) | — | 20 | 40 | — | — | — | 80 |
| Surface active agent (g/l) | 10 | 10 | 6 | 12 | 3 | 3 | 5 |
| Triethanolamine (g/l) | 6.5 | 10 | 7 | 7 | 1 | 1 | 18 |
| Benzotriazole (g/l) | 0.07 | 0.09 | 0.07 | 0.08 | 0.06 | 0.08 | 0.08 |

TABLE 9-continued

| | Light cyan | Cyan | Light magenta | Magenta | Yellow | Dark yellow | Black |
|---|---|---|---|---|---|---|---|
| Proxel XL2 (g/l) | 3.5 | 4.0 | 5.0 | 4.5 | 3 | 5 | 4 |
| Change ratio from 25 C. to 10 C. Viscosity | 180 | 183 | 190 | 188 | 183 | 188 | 192 |
| Surface tension | 107 | 105 | 108 | 105 | 106 | 109 | 108 |

Deionized water added to make 1 l

Subsequently, ink sets 102 to 106 were prepared in the same manner as described above except that the kind of dyes in the light cyan and cyan inks of the ink set 101 were changed and the added amount of the water-miscible organic solvent and surface active agent were changed to change the change of viscosity and surface tension from at 25° C. to at 10° C. as set forth in Table 10 below.

TABLE 10

| Ink set | Dye | | Change of viscosity | Change of static surface tension | Remarks |
|---|---|---|---|---|---|
| 101 | Light cyan | 154 | 180 | 107 | Inventive |
| | Cyan | 154 | 183 | 105 | |
| 102 | Light cyan | 154 | 157 | 106 | Inventive |
| | Cyan | 154 | 155 | 108 | |
| 103 | Light cyan | 108 | 177 | 107 | Inventive |
| | Cyan | 108 | 169 | 106 | |
| 104 | Light cyan | 154 | 260 | 109 | Comparative |
| | Cyan | 154 | 255 | 108 | |
| 105 | Light cyan | 154 | 265 | 135 | Comparative |
| | Cyan | 154 | 262 | 132 | |
| 106 | Light cyan | A-2 | 185 | 106 | Comparative |
| | Cyan | A-2 | 183 | 107 | |

(Ink jet recording)

The ink sets 101 to 107 thus prepared were each packed in the cartridge of a Type PM920C ink jet printer (produced by EPSON CO., LTD.) by which an image was then printed on a Type EX ink jet photographic gloss paper (produced by Fuji Photo Film Co., Ltd.) to evaluate the following properties. The results are set forth in Table 11.

(1) Printing Properties 1

For the evaluation of printing properties 1, the cartridge was mounted on the printer. The ejection of ink from all the nozzles was then confirmed. The printer was then allowed to stand in an atmosphere of 25° C. Printing was then made on 20 sheets of A4 size paper. The print was then evaluated for disturbance.

A: No print disturbance during the period between the beginning and the end of printing;
B: Occurrence of output with print disturbance;
C: Print disturbance during the period between the beginning and the end of printing.

(2) Printing Properties 2

For the evaluation of printing properties 2, the cartridge was allowed to stand at 10° C. for 2 days. The print was then evaluated for disturbance in the same manner as in printing properties (1).

(3) Hue

The image was visually evaluated in the following manner.

G: Good level
F: Slightly poor level
P: Poor level.

For the evaluation of the following image preservability, yellow, magenta, cyan and black print samples were prepared. These samples were then evaluated for the following properties.

(4) Light-Fastness

For the evaluation of light-fastness, the print which had been made was immediately measured for image density Ci by means of a reflection densitometer (X-Rite 310TR), irradiated with light from a xenon lamp (85,000 lux) using a weatherometer produced by Atlas Electric Devices, Inc. for 7 days, and then again measured for image density Cf to determine the dye remaining ratio (Cf/Ci×100). The dye remaining ratio was measured at three points of reflection density(1, 1.5, 2). Those showing a dye remaining ratio of not smaller than 85% at any of the three density points were defined as A, those showing a dye remaining ratio of smaller than 85% at two of the three points were defined as B, and those showing a dye remaining ratio of smaller than 85% at all the three density points were defined as C.

5) Heat Fastness

For the evaluation of heat fastness, the sample was stored under conditions of from 80° C. and 70% RH for 7 days. The sample was measured for density using a reflection densitometer (Type X-rite 310TR) before and after storage to determine the dye remaining ratio which was then evaluated. The dye remaining ratio was then evaluated at three reflection density points, i.e., 1, 1.5 and 2. Those showing a dye remaining ratio of not smaller than 90% at any of the three density points were defined as A. Those showing a dye remaining ratio of less than 90% at two of the three density points were defined as B. Those showing a dye remaining ratio of less than 90% at all the density points were defined as C.

(6) Ozone Resistance

For the evaluation of ozone resistance, the sample was stored under 80° C. heated conditions open to the atmosphere for 7 days. The sample was measured for density using a reflection densitometer (Type X-rite 310TR) before and after storage to determine the dye remaining ratio which was then evaluated. The dye remaining ratio was then evaluated at three reflection density points, i.e., 1, 1.5 and 2. Those showing a dye remaining ratio of not smaller than 90% at any of the three density points were defined as A. Those showing a dye remaining ratio of less than 90% at two of the three density points were defined as B. Those showing a dye remaining ratio of less than 90% at all the density points were defined as C.

The results thus obtained are set forth in Table 11.

TABLE 11

| Ink set | Printing properties 1 | Priting properties 2 | Light-fastness | Heat fastness | Ozone resistance | Hue | Remarks |
|---|---|---|---|---|---|---|---|
| 101 | A | A | A | A | A | G | Inventive |
| 102 | A | A | A | A | A | G | Inventive |
| 103 | A | A | A | A | A | G | Inventive |
| 104 | C | B | A | A | A | G | Comparative |
| 105 | C | B | A | A | A | G | Comparative |
| 106 | A | A | B | B | C | G | Comparative |

As can be seen in the results set forth in Table 11, when the inks of the present invention are used in ink jet recording, an excellent ejection stability and an excellent fastness are given.

Even when the image-receiving paper to be used in the present invention is changed to PM photographic gloss paper produced by EPSON Co., LTD. or PR101, produced by Canon Inc., effects similar to the aforementioned results can be exerted.

Example 6

The inks prepared in Example 1 were each packed in the cartridge of a Type BJ-F850 ink jet printer (produced by Canon Inc.) by which an image was then printed on a Type EX ink jet photographic gloss paper (produced by Fuji Photo Film Co., Ltd.) to effect evaluation in the same manner as in Example 1. Results similar to that of Example 1 were obtained. Even when the image-receiving paper was changed to PM photographic gloss paper produced by EPSON CO., LTD. or PR101, produced by Canon Inc., effects similar to the aforementioned results were exerted.

In accordance with the aforementioned example, an ink for ink jet recording and an ink jet recording method which allow ejection with a high stability and give an image having an excellent hue and preservability and a high quality can be provided.

Example of surface tension:

Example 7

(Preparation of Ink Solution)

To the following components was added deionized water to make 1.1. The mixture was then heated to a temperature of from 30° C. to 40° C. with stirring for 1 hour. Thereafter, the solution was filtered through a microfilter having an average pore diameter of 0.25 μm under reduced pressure to prepare a light cyan ink solution.

(Components of Light Cyan Ink Solution)

| | |
|---|---|
| Cyan dye of the present invention [Compound No. 154] | 17.5 g |
| Triethylene glycol monobutyl ether | 119.0 g |
| Glycerin | 123.0 g |
| Diethylene glycol | 164.0 g |
| Triethanolamine | 6.5 g |
| PROXEL XL2 [Zeneca Group Plc.] | 1.0 g |
| Benzotriazole | 0.07 g |
| 2-Butyloctanoic acid ester terminated by polyethylene glycol (average number of repetition of ethylene oxide) at one end thereof | 10.0 g |

Magenta, light magenta, cyan, yellow, dark yellow and black inks were then prepared in the same manner as described above except that a magenta dye (a-36), yellow dyes (A-3, A-4), and black dyes (A-5, A-6, A-7) were used as dyes instead of the cyan dye and the additives were changed. These inks were then used to prepare an ink set 101 set forth in Table 12.

TABLE 12

| | Light magenta | Magenta | Light cyan | Cyan | Yellow | Dark yellow | Black |
|---|---|---|---|---|---|---|---|
| Dye (g/l) | (a-36) | (a-36) | (154) | (154) | A-3 | A-3 | A-5 |
| | 10.2 | 30.8 | 17.5 | 68.0 | 14.7 | 10.3 | 20.0 |
| | | | | | A-4 | A-4 | A-6 |
| | | | | | 14.0 | 9.8 | 39.0 |
| | | | | | | (154) | A-7 |
| | | | | | | 13.6 | 17.0 |
| | | | | | | | A-3 |
| | | | | | | | 20.0 |
| Triethylene glcyol monobutyl ether (g/l) | 130 | 140 | 119 | 127 | 130 | 130 | — |
| Diethylene glycol monobutyl etehr (g/l) | — | — | — | — | — | — | 230 |
| Glycerin (g/l) | 130 | 160 | 123 | 110 | 150 | 138 | 120 |

TABLE 12-continued

| | Light magenta | Magenta | Light cyan | Cyan | Yellow | Dark yellow | Black |
|---|---|---|---|---|---|---|---|
| Diethylene glycol (g/l) | 150 | 110 | 164 | 107 | 160 | 144 | 20 |
| Triethanolamine (g/l) | 7 | 7 | 6.5 | 10 | 1 | 4 | 18 |
| Urea (g/l) | 37 | 46 | — | — | — | — | — |
| 2-Pyrrolidone (g/l) | 40 | — | — | 20 | — | — | 80 |
| PROXEL XL II (g/l) | 5.0 | 4.5 | 1.0 | 4.0 | 3.0 | 3.0 | 4.0 |
| Benzotriazole (g/l) | 0.07 | 0.08 | 0.07 | 0.09 | 0.06 | 0.07 | 0.08 |
| 2-Butyloctanoic acid ester terminated by polyethyelne glycol at one end (g/l) | 6 | 12 | 10 | 10 | 3 | 5 | 5 | a-36

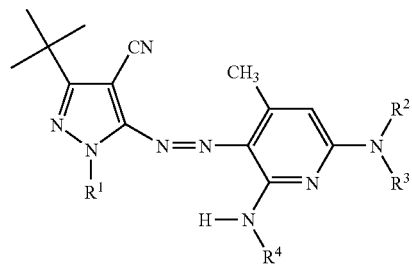

$R^1$, $R^2$:

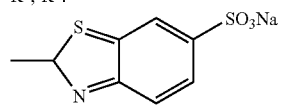

$R^3$, $R^4$:

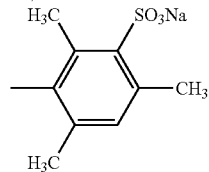

Subsequently, ink sets 102 to 107 were in the same manner as described above except that the kind of dyes, the amount of surface active agent which is a surface tension adjustor and the kind and amount of organic solvents in the light cyan and cyan inks of the ink set 101 were changed as set forth in Table 13 below. The static surface tension of these inks was measured by means of a Type CBVP-A3 automatic surface tensiometer (produced by Kyowa Interface Science Co., LTD.) Further, the dynamic surface tension of these inks was measured by means of a Type BP-D3 automatic surface tensiometer (produced by Kyowa Interface Science Co., LTD.)

The unit of the amount of the various solvents in Table 13 is g/l.

TABLE 13

| Ink set | | Light cyan | Cyan | Static surface tension Light cyan | Dynamic surface tension Light cyan | Static surface tension Cyan | Dynamic surface tension Cyan | Remarks |
|---|---|---|---|---|---|---|---|---|
| 101 | Dye | (154) | (154) | 32.5 mN/m | 33.9 mN/m | 32.6 mN/m | 33.4 mN/m | Inventive |
| | Surface active agent | 10 | 10 | | | | | |
| | Diethylene glycol | 164 | 107 | | | | | |
| | Glycerin | 123 | 110 | | | | | |

TABLE 13-continued

| Ink set | | Light cyan | Cyan | Static surface tension Light cyan | Dynamic surface tension Light cyan | Static surface tension Cyan | Dynamic surface tension Cyan | Remarks |
|---|---|---|---|---|---|---|---|---|
| | Triethylene glycol monobutyl ether | 119 | 127 | | | | | |
| 102 | Dye | (154) | (154) | 32.9 | 34.9 | 32.4 | 33.3 | Inventive |
| | Surface active agent | 10 | 10 | | | | | |
| | Diethylene glycol | 30 | 35 | | | | | |
| | Glycerin | 5 | 8 | | | | | |
| | Triethylene glycol monobutyl ether | 50 | 47 | | | | | |
| 103 | Dye | (154) | (154) | 33.1 | 35.2 | 32.0 | 32.5 | Inventive |
| | Surface active agent | 10 | 10 | | | | | |
| | Diethylene glycol | 30 | 35 | | | | | |
| | Glycerin | 5 | 8 | | | | | |
| | Triethylene glycol monobutyl ether | — | — | | | | | |
| 104 | Dye | (154) | (154) | 36.7 | 37.8 | 37.4 | 37.4 | Inventive |
| | Surface active agent | 10 | 10 | | | | | |
| | Diethylene glycol | 150 | 110 | | | | | |
| | Glycerin | 130 | 130 | | | | | |
| | Triethylene glycol monobutyl ether | 130 | 140 | | | | | |
| 105 | Dye | (154) | (154) | 51.2 | 50.4 | 51.5 | 50.7 | Comparative |
| | Surface active agent | — | — | | | | | |
| | Diethylene glycol | 30 | 35 | | | | | |
| | Glycerin | 5 | 8 | | | | | |
| | Triethylene glycol monobutyl ether | — | — | | | | | |
| 106 | Dye | (154) | (154) | 23.4 | 23.9 | 23.7 | 23.7 | Comparative |
| | Surface active agent | 10 | 10 | | | | | |
| | Diethylene glycol | 150 | 110 | | | | | |
| | Glycerin | 130 | 130 | | | | | |
| | Triethylene glycol monobutyl ether | 160 | 170 | | | | | |
| 107 | Dye | (191) | (191) | 32.2 | 33.6 | 32.0 | 32.8 | Comparative |
| | Surface active agent | 10 | 10 | | | | | |
| | Diethylene glycol | 164 | 107 | | | | | |

TABLE 13-continued

| Ink set | Light cyan | Cyan | Static surface tension Light cyan | Dynamic surface tension Light cyan | Static surface tension Cyan | Dynamic surface tension Cyan | Remarks |
|---|---|---|---|---|---|---|---|
| Glycerin | 123 | 110 | | | | | |
| Triethylene glycol monobutyl ether | 119 | 127 | | | | | |

(191)

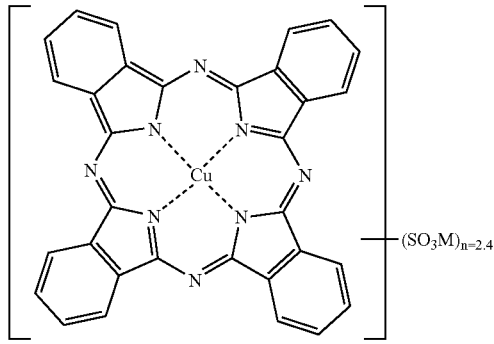

$-(SO_3M)_{n=2.4}$ (Ink Jet Recording)

The ink sets 101 to 107 thus prepared were each packed in the cartridge of a Type PM920C ink jet printer (produced by EPSON Co., LTD.) by which an image was then printed on a Type EX ink jet photographic gloss paper (produced by Fuji Photo Film Co., Ltd.) to evaluate the following properties. The results are set forth in Tables 14 and 15.

(1) Printing Properties (1)

For the evaluation of printing properties (1), the cartridge was mounted on the printer. The ejection of ink from all the nozzles was then confirmed. Printing was then made on 20 sheets of A4 size paper. The print was then evaluated for disturbance.

A: No print disturbance during the period between the beginning and the end of printing;
B: Occurrence of output with print disturbance;
C: Print disturbance during the period between the beginning and the end of printing;

(2) Printing Properties (2)

For the evaluation of printing properties (2), the cartridge was allowed to stand at 60° C. for 2 days. The print was then evaluated for disturbance in the same manner as in printing properties (1).

(3) Dryability

For the evaluation of dryability, the print was immediately touched with a finger which was then visually observed for stain.

(4) Running of Fine Line (1)

Fine line patterns were printed with yellow, magenta, cyan and black inks, respectively. These fine line patterns were each then visually evaluated for "running of fine line (1)".

G: Good
F: Slight running
P: Running.

(5) Running of Fine Line (2)

A fine line was printed with a black ink on a solid print of cyan ink. The fine line was then evaluated for running of fine line due to contact of two color inks.

(6) Water Resistance

The image thus obtained was dipped in deionized water for 5 seconds, and then evaluated for running.

For the evaluation of image preservability, yellow, magenta, cyan and black print samples were prepared. These samples were then evaluated as follows.

(7) Light-Fastness

For the evaluation of light-fastness, the print which had been made was immediately measured for image density Ci by means of X-Rite 310, irradiated with light from a xenon lamp (85,000 lux) using a weatherometer produced by Atlas Electric Devices, Inc. for 6 days, and then again measured for image density Cf to determine the dye remaining ratio [Cf/Ci]×100. The dye remaining ratio was measured at three points of reflection density (1, 1.5, 2). Those showing a dye remaining ratio of not smaller than 80% at any of the three density points were defined as A, those showing a dye remaining ratio of smaller than 80% at two of the three points were defined as B, and those showing a dye remaining ratio of smaller than 80% at all the three density points were defined as C.

(2) Moist Heat Fastness

For the evaluation of heat fastness, the sample was stored under conditions of 80° C. and 70% RH for 5 days. The sample was measured for density using X-rite 310 before and after storage to determine the dye remaining ratio which was then evaluated. The dye remaining ratio was then evaluated at three reflection, density points, i.e., 1, 1.5 and 2. Those showing a dye remaining ratio of not smaller than 90% at any of the three density points were defined as A. Those showing a dye remaining ratio of less than 90% at two of the three density points were defined as B. Those showing a dye remaining ratio of less than 90% at all the density points were defined as C.

TABLE 14

| Ink set | Printing properties 1 | Printing properties 2 | Dryability | Running of fine line 1 | Running of fine line 2 | Water resistance |
|---|---|---|---|---|---|---|
| 101 | A | A | G (good) | G | G | G |
| 102 | A | A | G | G | G | G |
| 103 | A | A | G | G | G | G |
| 104 | A | A | G | F | F | G |
| 105 | B | C | G | P | P | G |
| 106 | C | C | G | P | P | G |
| 107 | A | A | G | G | G | G |

TABLE 15

| Ink set | Light fastness | | | | Moist heat fastness | | | |
|---|---|---|---|---|---|---|---|---|
| | Yellow | Magenta | Cyan | Black | Yellow | Magenta | Cyan | Black |
| 101 | A | A | A | A | A | A | A | A |
| 102 | A | A | A | A | A | A | A | A |
| 103 | A | A | A | A | A | A | A | A |
| 104 | A | A | A | A | A | A | A | A |
| 105 | A | A | A | A | A | A | A | A |
| 106 | A | A | A | A | A | A | A | A |
| 107 | A | A | B | A | A | A | A | A |

From the results set forth in Tables 14 and 15, the following facts are made obvious.

When the inks of the present invention are used in ink jet recording, an excellent ejection stability can be obtained. The image thus recorded exhibits excellent properties in water resistance and fastness. Further, when the inks of the present invention are used, fine lines free of running can be outputted, making it possible to obtain an excellent image.

Even when the image-receiving paper to be used in the present invention was changed to PM photographic gloss paper produced by EPSON CO., LTD. or PR101, produced by Canon Inc., effects similar to the aforementioned results were exerted.

In accordance with the aforementioned example, an ink for ink jet recording and an ink jet recording method which allow ejection with a high stability and give an image having an excellent hue and preservability (weathering resistance, water resistance) and a high quality can be provided.

Example of ultrasonic vibration:

Example 8

(Preparation of Ink Solution)

To 17.5 g of a cyan dye [154] was added 150 cc of deionized water. The dye was then stirred with the application of ultrasonic vibration using an ultrasonic cleaner (2510J-DTH, produced by BRANSON, 43 kHz, 125 W) for 10 minutes to undergo dissolution (first step). To the dye solution were then added the following components. To the dye solution was then added deionized water to make 1 l. The dye solution was then heated to a temperature of from 30° C. to 40° C. with stirring for 1 hour (second step). The mixture was then filtered through a microfilter having an average pore diameter of 0.25 μm under reduced pressure to prepare a light cyan ink solution.

| | |
|---|---|
| Triethylene glycol monobutyl ether | 119.0 g |
| Glycerin | 123.0 g |
| Diethylene glycol | 164.0 g |
| Triethanolamine | 6.5 g |
| PROXEL XL2 [Zeneca Group Plc.] | 1.0 g |
| Benzotriazole | 0.07 g |
| Surface active agent (2-Butyloctanoic acid ester terminated by polyethylene glycol (average number of repetition of ethylene oxide) at one end thereof) | 6.0 g |

To 68.0 g of a cyan dye [154] was added 500 cc of deionized water. The dye was then stirred with the application of ultrasonic vibration using the aforementioned ultrasonic cleaner for 10 minutes to undergo dissolution. To the dye solution were then added the following components. To the dye solution was then added deionized water to make 1 l. The dye solution was then heated to a temperature of from 30° C. to 40° C. with stirring for 1 hour. The mixture was then filtered through a microfilter having an average pore diameter of 0.25 μm under reduced pressure to prepare a light cyan ink solution.

| | |
|---|---|
| Triethylene glycol monobutyl ether | 127.0 g |
| Glycerin | 110.0 g |
| Diethylene glycol | 107.0 g |
| Triethanolamine | 10.0 g |
| PROXEL XL2 [Zeneca Group Plc.] | 4.0 g |
| Benzotriazole | 0.09 g |
| Surface active agent (2-Butyloctanoic acid ester terminated by polyethylene glycol (average number of repetition of ethylene oxide) at one end thereof) | 10.0 g |

Example 9

Light cyan and cyan ink solutions were prepared in the same manner as in Example 1 except that the addition of deionized water to the cyan dye followed by dissolution with stirring for 1 hour was not assisted by ultrasonic vibration and the addition of the remaining components to the aqueous solution of dye followed by heating to a temperature of from 30° C. to 40° C. with stirring for 30 minutes was assisted by ultrasonic vibration.

Comparative Example 1

Light cyan and cyan ink solutions were prepared in the same manner as in Example 8 except that as the cyan dye there was used (C-1).

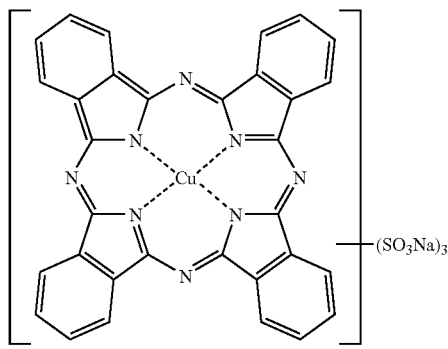

C-1

Comparative Example 2

Light cyan and cyan ink solutions were prepared in the same manner as in Example 8 except that the preparation of the ink solution was not assisted by ultrasonic vibration at all.

Example 10

Ink solutions were prepared in the same manner as in Comparative Example 2. Using an ultrasonic cleaner, ultrasonic vibration was then applied to these ink solutions to prepare light cyan and cyan ink solutions.

(Ink Jet Recording)

The light cyan and cyan inks thus prepared were each packed in the cartridge of a Type PM920C ink jet printer (produced by EPSON CO., LTD.) by which an image was then printed on a Type EX ink jet photographic gloss paper (produced by Fuji Photo Film Co., Ltd.) to evaluate the following properties. The results are set forth in Table 16.

(1) For the evaluation of ejection stability, the cartridge was mounted on the printer by which the ink was then subjected to continuous ejection test through nozzles.
  G: Stable
  F: Slightly stable
  P: Unstable.

(2) For the evaluation of image preservability, a solid cyan image print sample was prepared. The sample was then evaluated for the following properties.

For the evaluation of light-fastness, the print which had been made was immediately measured for image density Ci by means of a reflection densitometer (X-Rite 310TR), irradiated with light from a xenon lamp (85,000 lux) using a weatherometer produced by Atlas Electric Devices, Inc. for 6 days, and then again measured for image density Cf to determine the dye remaining ratio (100×Cf/Ci). The dye remaining ratio was measured at three points of reflection density (1, 1.5, 2). Those showing a dye remaining ratio of not smaller than 80% at any of the three density points were defined as A, those showing a dye remaining ratio of smaller than 80% at two of the three points were defined as B, and those showing a dye remaining ratio of smaller than 80% at all the three density points were defined as C.

For the evaluation of heat fastness, the sample was stored under conditions of 80° C. and 70% RH for 5 days. The sample was measured for density using a reflection densitometer (Type X-rite 310TR) before and after storage to determine the dye remaining ratio which was then evaluated. The dye remaining ratio was then evaluated at three reflection density points, i.e., 1, 1.5 and 2. Those showing a dye remaining ratio of not smaller than 90% at any of the three density points were defined as A. Those showing a dye remaining ratio of less than 90% at two of the three density points were defined as B. Those showing a dye remaining ratio of less than 90% at all the density points were defined as C.

For the evaluation of ozone resistance, the sample was stored under 80° C. heated conditions open to the atmosphere for 7 days. The sample was measured for density using a reflection densitometer (Type X-rite 310TR) before and after storage to determine the dye remaining ratio which was then evaluated. The dye remaining ratio was then evaluated at three reflection density points, i.e., 1, 1.5 and 2. Those showing a dye remaining ratio of not smaller than 90% at any of the three density points were defined as A. Those showing a dye remaining ratio of less than 90% at two of the three density points were defined as B. Those showing a dye remaining ratio of less than 90% at all the density points were defined as C.

TABLE 16

| Ink | Dye | Ultrasonic vibration | Ejection stability | Light-fastness | Heat fastness | Ozone resistance |
| --- | --- | --- | --- | --- | --- | --- |
| Example 8 | (154) | Applied at first step | G | A | A | A |
| Example 9 | (154) | Applied at second step | G | A | A | A |
| Comparative Example 1 | (C-1) | Applied at first step | G | C | A | C |

TABLE 16-continued

| Ink | Dye | Ultrasonic vibration | Ejection stability | Light-fastness | Heat fastness | Ozone resistance |
|---|---|---|---|---|---|---|
| Comparative Example 2 | (154) | Not applied | P | A | A | A |
| Example 10 | (154) | Applied after preparation of ink | F | A | A | A |

It is made obvious that when the inks obtained according to the present invention are used, an excellent ejection stability can be obtained. It is also made obvious that the inks of the present invention exhibit excellent properties in fastness as well.

Further, the inks of the present invention exhibited hues similar to that of Comparative Example 1.

Moreover, inks of the present invention prepared in the same manner as in the aforementioned example except that other water-soluble dyes represented by the formula (I) were used instead of the cyan dye (154) had the same effect on weathering resistance, ejection stability and hue as in the aforementioned example.

Even when the image-receiving paper was changed to PM photographic gloss paper produced by EPSON CO., LTD. or PR101, produced by Canon Inc., effects similar to the aforementioned results were exerted.

In accordance with the aforementioned example, an ink set for ink jet recording comprising an aqueous ink advantageous in handleability, odor, safety, etc. which allows ejection with a high stability and gives a recorded image having a good hue and an excellent weathering resistance and water resistance and good running of fine line can be provided.

Example of filtration and defoaming:

Example 11

(Preparation of Ink Solution)

To the following components was added deionized water to make 1 l. The mixture was then heated to a temperature of from 30° C. to 40° C. with stirring for 1 hour. Thus, a light cyan ink solution (LC-101) was prepared.

[Formulation of Light Cyan Ink LC-101]

(Solid Content)

| Cyan dye of the present invention (154) | 17.5 g/l |
|---|---|
| PROXEL | 3.5 g/l |

(Liquid Content)

| Diethylene glycol | 150 g/l |
|---|---|
| Glycerin | 130 g/l |
| Triethylene glycol monobutyl ether | 130 g/l |
| [Triethanolamine] | 6.9 g/l |
| Surfynol STG | 10 g/l |
| Triethanolamine (TEA) | 6.9 g/l |
| Surfynol STG (SW) | 10 g/l |

A cyan ink solution C-101 was then prepared according to the aforementioned formulation except that the added amount of the cyan dye (154) was raised to 68 g.

[Formulation of Light Cyan Ink C-101]

(Solid Content)

| Cyan dye of the present invention (154) | 68 g/l |
|---|---|
| PROXEL | 3.5 g/l |

(Liquid Content)

| Diethylene glycol | 150 g/l |
|---|---|
| Glycerin | 130 g/l |
| Triethylene glycol monobutyl ether | 130 g/l |
| Triethanolamine | 6.9 g/l |
| Surfynol STG | 10 g/l |

These inks thus prepared were each filtered through a filter, and then subjected to defoaming using an ultrasonic defoamer for 10 minutes.

Thereafter, these inks were packed in the cyan ink and light cyan ink cartridges of a Type PM-950C ink jet printer (produced by EPSON CO., LTD.), respectively. As the other color inks there were used the inks dedicated to PM-950C. A chromatic magenta image was then printed. The image was printed on a Type EX ink jet photographic gloss paper (produced by Fuji Photo Film Co., Ltd.) as an image-receiving sheet. Thus, ejection stability was evaluated.

The packing of ink was effected in the same manner as described above except that the step of filtering through a filter, the step of performing defoaming by means of an ultrasonic defoamer for 10 minutes and the cleanness of the step were changed as set forth in Table 17 below.

TABLE 17

| Experiment No. | Filtered ? | Filter diameter | Ultrasonically defoamed ? | cleanness* |
|---|---|---|---|---|
| 101 (comparative) | No | — | No | 100,000 |
| 102 (comparative) | Yes | 250 nm | No | 100,000 |
| 103 (inventive) | Yes | 250 nm | Yes | 100,000 |
| 104 (comparative) | Yes | 50,000 nm | Yes | 100,000 |
| 105 (comparative) | Yes | 50,000 nm | No | 800 |
| 106 (comparative) | Yes | 250 nm | No | 800 |
| 107 (inventive) | Yes | 50,000 nm | Yes | 800 |
| 108 (inventive) | Yes | 250 nm | Yes | 800 |
| 109 (inventive) | Yes | 100 nm | Yes | 800 |
| 110 (inventive) | Yes | 500 nm | Yes | 800 |

*Cleanness indicates a value measured by a duster counter

The evaluation of ejectability was effected as follows.

(Evaluation Experiment)

For the evaluation of ejection stability, the cartridge was mounted on the printer. The ejection of the inks from all the nozzles was then confirmed. Printing was then made on 100 sheets of A4 size paper. Evaluation was made according to the following criterion.

A: No print disturbance during the period between the beginning and the end of printing;
B: Occurrence of output with print disturbance;
C: Print disturbance during the period between the beginning and the end of printing.

The results thus obtained were set forth in Table 18.

TABLE 18

| Experiment No. | Ejection stability |
| --- | --- |
| 101 (Comparative) | C |
| 102 (Comparative) | B |
| 103 (Inventive) | B |
| 104 (Comparative) | C |
| 105 (Comparative) | B |
| 106 (Comparative) | B |
| 107 (Comparative) | B |
| 108 (Inventive) | A |
| 109 (Inventive) | A |
| 110 (Inventive) | A |

As can be seen in the results of Table 18, the systems 103 and 108 to 110, which comprise inks prepared according to the process of the present invention, exhibit a good ejection stability. In particular, when filtration and defoaming are effected in a space having a cleanness of not greater than 1,000, the ejection stability of the ink can be enhanced.

(Advantage of the Present Invention)

In accordance with the present invention, an ink for ink jet recording comprising an aqueous ink advantageous in handleability, odor, safety, etc. which allows ejection with a high stability and gives a high quality recorded image having a good hue and an excellent weathering resistance and water resistance, a process for the production thereof and an ink jet recording process can be provided.

INDUSTRIAL APPLICABILITY

The ink jet recording process to which the ink of the present invention is applied is not limited. The ink set of the present invention may be used in any known recording process such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording process include a process which comprises ejecting many portions of an ink having a low concentration called photoink in a small volume, a process which comprises using a plurality of inks having substantially the same hue but different densities to improve the image quality, and a process involving the use of a colorless transparent ink.

The invention claimed is:

1. An ink for ink jet recording, comprising an aqueous medium and a phthalocyanine dye represented by the following formula (I) dissolved or dispersed in the aqueous medium, wherein the phthalocyanine dye has an oxidation potential of more positive than 1.0 V and the ink has a conductivity of 0.01 S/m to 10 S/m:

(I)

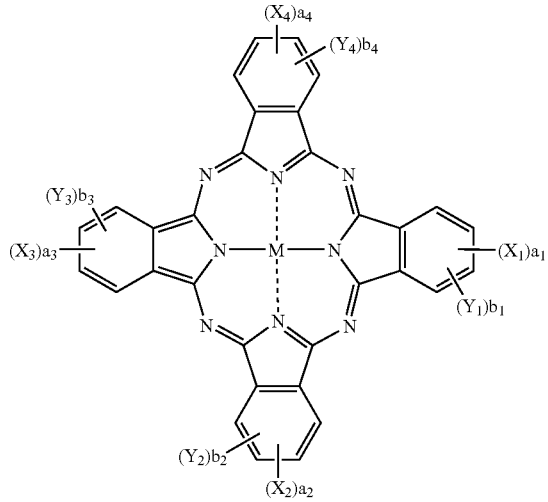

wherein $X_1$, $X_2$, $X_3$ and $X_4$ each independently represent —SO-Z, —SO$_2$-Z, —SO$_2$NR$_1$R$_2$, a sulfo group, —CONR$_1$R$_2$ or —CO$_2$R$_1$; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R_1$ and $R_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; and when there are a plurality of Z's, they may be the same or different;

$Y_1$, $Y_2$, $Y_3$ and $Y_4$ each independently represent a monovalent substituent; and when there are a plurality of any of $X_1$ to $X_4$ and $Y_1$ to $Y_4$, they may be the same or different;

$a_1$ to $a_4$ and $b_1$ to $b_4$ represent the number of substituents $X_1$ to $X_4$ and $Y_1$ to $Y_4$, respectively; $a_1$ to $a_4$ each independently represent an integer of from 0 to 4 and are not 0 at the same time; and $b_1$ to $b_4$ each independently represent an integer of 0 to 4;

M represents a hydrogen atom, metal atom or oxide, hydroxide or halide thereof and the phthalocyanine structure has at least one of —SO$_2$-Z and —SO$_2$NR$_1$R$_2$ at a beta-position thereof.

2. The ink for ink jet recording according to claim 1, which has a viscosity of 1 to 20 mPa·sec at 25° C.

3. The ink for ink jet recording according to claim 1, which has a static surface tension of 25 to 50 mN/m at 25° C.

4. The ink for ink jet recording according to claim 2, wherein a viscosity of the ink has a viscosity ratio of not greater than 250% from at 25° C. to at 10° C., and a static surface tension has a static surface tension ratio of not greater than 130% from at 25° C. to at 10° C.

5. The ink for ink jet recording according to claim 1, which has a pH value of 4 to 12 at 25° C.

6. The ink for ink jet recording according to claim 1, which has a dye remaining ratio of not smaller than 60% after 24 hours of storage in an atmosphere of 5 ppm ozone in a monochromatic area that is obtained by printing with a monochromatic ink in such a manner a cyan reflection density through a status A filter is from 0.9 to 1.1.

7. The ink for ink jet recording according to claim 1, wherein the ink has Cu ions that are eluted with water in an amount of not greater than 20% of a total amount of the dye after 24 hours of storage in an atmosphere of 5 ppm ozone in a monochromatic area that is obtained by printing with a monochromatic ink in such a manner a cyan reflection density through a status A filter is from 0.9 to 1.1.

8. The ink for ink jet recording according to claim 1, wherein the phthalocyanine dye is a water-soluble dye having an electron-withdrawing group at β-position of a benzene ring in the phthalocyanine.

9. The ink for ink jet recording according to claim 1, wherein the phthalocyanine dye is a water-soluble dye that is produced by a process which doesn't pass through a sulfonation of an unsubstituted phthalocyanine.

10. The ink for ink jet recording according to claim 1, wherein the dye represented by the formula (I) is a dye represented by the following formula (II):

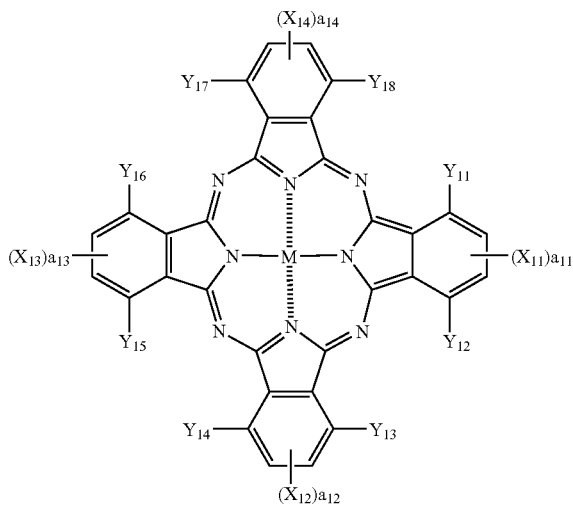

(II)

wherein $X_{11}$ to $X_{14}$ and M have the same meaning as $X_1$ to $X_4$ and M in formula (I), respectively, provided that at least one of $X_{11}$ to $X_{14}$ represents —$SO_2$-Z or —$SO_2NR_1R_2$; $Y_{11}$ to $Y_{18}$ each independently represents a hydrogen atom, a halogen atom, an alkyl group, an aryl group, a cyano group, an alkoxy group, an amide group, a ureido group, a sulfonamide group, a carbamoyl group, a sulfamoyl group, an alkoxycarbonyl group, a carboxyl group or a sulfo group; when there are a plurality of $X_{11}$ to $X_{14}$, they may be the same or different; $a_{11}$ to $a_{14}$ represent the number of substituents $X_{11}$ to $X_{14}$, respectively, and each independently represents an integer of 1 or 2.

11. A method for ink jet recording, comprising using the ink for ink jet recording according to claim 1.

12. A method for recording an image on an image-receiving material, comprising ejecting an ink droplet onto the image-receiving material including an image-receiving layer containing an inorganic white particulate pigment on a support according to a record signal, wherein the ink droplet comprises the ink for ink jet recording according to claim 1.

13. A method for producing the ink for ink jet recording according to claim 1, which comprises at least applying an ultrasonic vibration.

14. A method for producing the ink for ink jet recording according to claim 1, wherein the ink for ink jet recording prepared is filtered through a filter having pores of an effective diameter of not greater than 1 μm and defoamed before use.

15. The ink for ink jet recording according to claim 1, wherein the ink contains the phthalocyanine dye in an amount of 0.2 to 20% by weight.

16. The ink for ink jet recording according to claim 10, wherein $X_{11}$ to $X_{18}$ each represents a hydrogen atom.

* * * * *